US009485206B2

(12) United States Patent

Day, II et al.

(10) Patent No.: US 9,485,206 B2

(45) Date of Patent: Nov. 1, 2016

(54) DEVICES AND METHODS FOR IMPROVING WEB SAFETY AND DETERRENCE OF CYBERBULLYING

(71) Applicant: WebSafety, Inc., Newport Beach, CA (US)

(72) Inventors: Rowland W. Day, II, Newport Beach, CA (US); Eric Wise, Los Angeles, CA (US); Steven Sigler, Torrance, CA (US); Jacquez Partha Roarke, Los Angeles, CA (US)

(73) Assignee: WebSafety, Inc., Newport Beach, CA (US)

( * ) Notice: Subject to any disclaimer, the term of this patent is extended or adjusted under 35 U.S.C. 154(b) by 0 days.

(21) Appl. No.: 14/576,065

(22) Filed: Dec. 18, 2014

(65) Prior Publication Data

US 2015/0180746 A1 Jun. 25, 2015

Related U.S. Application Data

(60) Provisional application No. 61/918,607, filed on Dec. 19, 2013, provisional application No. 61/019,828, filed on Jul. 1, 2014, provisional application No. 62/058,599, filed on Oct. 1, 2014.

(51) Int. Cl.

*H04M 11/00* (2006.01)

*H04L 12/58* (2006.01)

(52) U.S. Cl.

CPC .................................... *H04L 51/16* (2013.01)

(58) Field of Classification Search

CPC ............................... H04H 20/57; H04L 51/16

USPC ......... 455/414.2, 456.1, 41.2, 466, 557, 411, 455/418

See application file for complete search history.

(56) References Cited

U.S. PATENT DOCUMENTS

| | | | |
|---|---|---|---|
| 6,353,778 | B1 | 3/2002 | Brown |
| 6,795,856 | B1 | 9/2004 | Bunch |
| 7,046,139 | B2 | 5/2006 | Kuhn et al. |
| 7,110,753 | B2 | 9/2006 | Campen |
| 7,206,569 | B2 | 4/2007 | Erskine et al. |
| 7,231,218 | B2 | 6/2007 | Diacakis et al. |
| 7,280,816 | B2 | 10/2007 | Fratti et al. |

(Continued)

OTHER PUBLICATIONS

U.S. Appl. No. 29/504,071, filed Oct. 1, 2014, Day, II et al.

(Continued)

*Primary Examiner* — Joseph Arevalo

(74) *Attorney, Agent, or Firm* — Knobbe, Martens, Olson & Bear, LLP

(57) ABSTRACT

Devices, systems, and methods for allowing parents to view and track smart phone activities of their children can include one or more child software modules. The module can be installed on each child's smart phone. The module can access and extract data from or about more than one of the smart phone's other software applications, including at least two of the following: a texting application, a social media application, an image application that facilitates transmission or reception of images, and a web browser application. The module can further send the extracted data to an analysis server. The module can also monitor location data. Moreover, the system can include an analysis server that can identify potentially harmful language, images, and websites. Further, the system can include a parent portal. The parent portal can receive results from the analysis server.

17 Claims, 73 Drawing Sheets

(56) References Cited

U.S. PATENT DOCUMENTS 7,302,272 B2 11/2007 Ackley
7,397,365 B2 7/2008 Wang
7,493,651 B2 2/2009 Vanska et al.
7,516,219 B2 4/2009 Moghaddam et al.
7,594,019 B2 9/2009 Clapper
7,643,834 B2 1/2010 Ioppe et al.
7,720,463 B2 5/2010 Marsico
7,739,707 B2 6/2010 Sie et al.
7,801,512 B1 9/2010 Myr
7,809,797 B2 10/2010 Cooley et al.
7,970,388 B2 6/2011 Pfeffer et al.
7,996,005 B2 8/2011 Lotter et al.
8,000,695 B2 8/2011 Florkey et al.
8,005,913 B1 8/2011 Carlander
8,027,662 B1 9/2011 Miller et al.
8,079,044 B1 12/2011 Craner
8,095,124 B2 1/2012 Balia
8,107,670 B2 1/2012 Songhurst
8,116,726 B2 2/2012 Richardson et al.
8,131,763 B2 3/2012 Tuscano et al.
8,190,754 B2 5/2012 Strickland
8,204,494 B2 6/2012 Weinzier
8,204,649 B2 6/2012 Zhou et al.
8,225,380 B2 7/2012 Moshir et al.
8,229,669 B2 7/2012 Roumeliotis et al.
8,248,223 B2 8/2012 Periwal
8,265,618 B2 9/2012 MacNaughtan et al.
8,280,438 B2 10/2012 Barbera
8,285,264 B2 10/2012 Murata et al.
8,290,515 B2 10/2012 Staton et al.
8,307,029 B2 11/2012 Davis et al.
8,347,362 B2 1/2013 Cai et al.
8,353,050 B2 1/2013 Klassen et al.
8,355,737 B2 1/2013 MacNaughtan et al.
8,358,846 B2 1/2013 Gibbs
8,359,044 B2 1/2013 MacNaughtan et al.
8,380,176 B2 2/2013 Adler et al.
8,412,191 B2 4/2013 Radhakrishnan et al.
8,413,217 B2 4/2013 Bhatia
8,418,223 B1 4/2013 Smith et al.
8,434,126 B1 4/2013 Schepis et al.
8,437,771 B1 5/2013 Coverstone
8,443,436 B1 5/2013 Sankruthi
8,478,734 B2 7/2013 Niejadlik
8,490,176 B2 7/2013 Book et al.
8,538,458 B2 9/2013 Haney
8,548,244 B2 10/2013 Conradt et al.
8,548,443 B2 10/2013 Anson
8,548,452 B2 10/2013 Coskun et al.
8,565,820 B2 10/2013 Riemer et al.
8,566,407 B2 10/2013 Lee et al.
8,571,538 B2 10/2013 Sprigg et al.
8,583,112 B2 11/2013 Booth et al.
8,595,336 B1 11/2013 Tsern et al.
8,611,928 B1 12/2013 Bill
8,640,190 B1 1/2014 Banerjee
8,699,998 B2 4/2014 Sprigg et al.
8,712,429 B2 4/2014 Nagorniak
8,718,633 B2 5/2014 Sprigg et al.
8,725,109 B1 5/2014 Baker et al.
8,744,417 B2 6/2014 Adler et al.
8,781,457 B2 7/2014 Randazzo et al.
8,793,207 B1 7/2014 Ledenev et al.
8,831,624 B2 9/2014 Chandrasekaran
8,838,077 B2 9/2014 Felt et al.
8,843,953 B1 9/2014 Dang et al.
8,868,741 B2 10/2014 Vignisson et al.
8,880,107 B2 11/2014 Movsesyan et al.
8,885,803 B2 11/2014 Kent et al.
8,892,084 B2 11/2014 Jung et al.
8,918,840 B2 12/2014 Dean et al.
8,918,901 B2 12/2014 Mandava et al.
8,923,810 B2 12/2014 Leemet et al.
8,949,928 B2 2/2015 Perez Martinez et al.
9,043,455 B1 5/2015 Kashanian
9,043,462 B2 5/2015 Badiee et al.
9,043,826 B1 5/2015 Patil et al.
9,043,928 B1 5/2015 Paczkowski et al.
9,049,305 B2 6/2015 Carney et al.
9,060,004 B1 6/2015 Tracy et al.
9,069,458 B2 6/2015 Brewer
9,071,958 B2 6/2015 Mullins
9,076,020 B2 7/2015 Ahlstrom et al.
9,078,043 B2 7/2015 Pandey et al.
9,088,861 B2 7/2015 Prakash et al.
9,113,497 B2 8/2015 Smith, II et al.
9,143,530 B2 9/2015 Qureshi et al.
9,148,762 B2 9/2015 Taylor
9,154,901 B2 10/2015 Hernandez et al.
9,172,705 B1 10/2015 Kong et al.
9,203,647 B2 12/2015 Appelman et al.
9,203,845 B2 12/2015 Webber et al.
9,204,193 B2 12/2015 Luong
9,245,098 B2 1/2016 Yerli
9,247,294 B2 1/2016 Belz et al.
2003/0033582 A1 2/2003 Klein et al.
2003/0125083 A1* 7/2003 Iwasaki ............... H04L 63/0853 455/558
2003/0233447 A1 12/2003 Fellenstein et al.
2004/0002305 A1* 1/2004 Byman-Kivivuori ............ G06Q 20/353 455/41.2
2004/0180648 A1 9/2004 Hymel et al.
2005/0015612 A1 1/2005 You et al.
2005/0043036 A1 2/2005 Ioppe et al.
2005/0043037 A1 2/2005 Ioppe et al.
2005/0130633 A1 6/2005 Hill et al.
2006/0099940 A1 5/2006 Pfleging et al.
2006/0148490 A1 7/2006 Bates et al.
2006/0293057 A1 12/2006 Mazerski et al.
2007/0026850 A1 2/2007 Keohane et al.
2007/0072553 A1 3/2007 Barbera
2007/0150918 A1 6/2007 Carpenter et al.
2008/0005325 A1 1/2008 Wynn et al.
2008/0020803 A1 1/2008 Rios et al.
2008/0276311 A1 11/2008 Kassovic
2008/0300967 A1 12/2008 Buckley et al.
2009/0002147 A1 1/2009 Bloebaum et al.
2009/0011779 A1 1/2009 MacNaughtan et al.
2009/0047973 A1 2/2009 MacNaughtan et al.
2009/0064314 A1 3/2009 Lee
2009/0075651 A1 3/2009 MacNaughtan et al.
2009/0131038 A1 5/2009 MacNaughtan et al.
2009/0135730 A1 5/2009 Scott et al.
2009/0149205 A1 6/2009 Heredia et al.
2009/0171577 A1 7/2009 Roumeliotis et al.
2009/0215387 A1 8/2009 Brennan et al.
2009/0215465 A1 8/2009 MacNaughtan et al.
2009/0215466 A1 8/2009 Ahl et al.
2009/0254656 A1 10/2009 Vignisson et al.
2009/0275281 A1 11/2009 Rosen
2009/0298505 A1 12/2009 Drane et al.
2009/0312038 A1 12/2009 Gildea
2009/0325602 A1* 12/2009 Higgins .................. H04W 4/02 455/456.2
2010/0014497 A1 1/2010 Aggarwal et al.
2010/0087194 A1 4/2010 MacNaughtan et al.
2010/0223673 A1 9/2010 Scott et al.
2010/0248640 A1 9/2010 MacNaughtan et al.
2010/0291907 A1 11/2010 MacNaughtan et al.
2011/0034179 A1 2/2011 David et al.
2011/0034242 A1 2/2011 Aronzon et al.
2011/0045811 A1 2/2011 Kemery
2011/0167342 A1 7/2011 de la Pena et al.
2011/0219080 A1 9/2011 McWithey et al.
2011/0227730 A1 9/2011 Stevenson et al.
2011/0292938 A1 12/2011 Harp et al.
2012/0002557 A1* 1/2012 Sedlar ................. H04L 41/0836 370/252
2012/0023548 A1 1/2012 Alfano et al.
2012/0028624 A1 2/2012 Jedlicka et al.
2012/0084349 A1 4/2012 Lee et al.
2012/0094696 A1 4/2012 Ahn et al.
2012/0135705 A1 5/2012 Thaker

(56) References Cited

U.S. PATENT DOCUMENTS

| | | | | |
|---|---|---|---|---|
| 2012/0184285 | A1* | 7/2012 | Sampath | G01S 5/0236 455/456.1 |
| 2012/0311673 | A1 | 12/2012 | Sodah | |
| 2013/0013705 | A1 | 1/2013 | White et al. | |
| 2013/0061260 | A1 | 3/2013 | Maskatia et al. | |
| 2013/0097261 | A1 | 4/2013 | Baer et al. | |
| 2013/0104246 | A1 | 4/2013 | Bear et al. | |
| 2013/0157655 | A1 | 6/2013 | Smith, II et al. | |
| 2013/0178151 | A1 | 7/2013 | Itzhaki | |
| 2013/0263001 | A1 | 10/2013 | Doronichev et al. | |
| 2013/0267207 | A1* | 10/2013 | Hao | H04L 67/306 455/414.1 |
| 2013/0283388 | A1 | 10/2013 | Ashok et al. | |
| 2013/0283401 | A1 | 10/2013 | Pabla et al. | |
| 2013/0305384 | A1 | 11/2013 | Weiss | |
| 2013/0318628 | A1 | 11/2013 | Dunko | |
| 2014/0096180 | A1 | 4/2014 | Negi et al. | |
| 2014/0136607 | A1 | 5/2014 | Ou et al. | |
| 2014/0180438 | A1 | 6/2014 | Hodges et al. | |
| 2014/0256305 | A1 | 9/2014 | Ginis | |
| 2014/0280944 | A1 | 9/2014 | Montgomery et al. | |
| 2014/0359124 | A1 | 12/2014 | Adimatyam et al. | |
| 2015/0032887 | A1 | 1/2015 | Pesek et al. | |
| 2015/0050922 | A1 | 2/2015 | Ramalingam et al. | |
| 2015/0111555 | A1 | 4/2015 | Adler et al. | |
| 2015/0169853 | A1 | 6/2015 | Singh et al. | |
| 2015/0249584 | A1 | 9/2015 | Cherifi et al. | |
| 2015/0288802 | A1 | 10/2015 | Medina | |
| 2015/0317465 | A1 | 11/2015 | McCarty et al. | |

OTHER PUBLICATIONS

Amato, et al., "*Detection of Images with Adult Content for Parental Control on Mobile Devices*," Conference: Proceedings of the 6th International Conference on Mobile Technology, Applications, and Systems, Mobility Conference 2009, Nice, France, Sep. 2-4, 2009 in 5 pages.

International Search Report and Written Opinion in PCT/US2014/071281 dated Apr. 24, 2015 in 15 pages.

May O. Lwin et al., "Protecting children's privacy online: How parental mediation strategies affect website safeguard effectiveness," Journal of Retailing, 2008, vol. 84, Issue 2, pp. 205-217, see abstract and pp. 207-210.

Final Office Action for U.S. Appl. No. 12/040,581; published as U.S. Appl. No. 2009-0215466; 13 pgs.

International Preliminary Report on Patentability and Written Opinion for Application No. PCT/US2014/071281, dated Jun. 21, 2016 in 11 pages.

"The Canary Project—A safe driving app for iPhone and Android," dated Jan. 25, 2013 in 10 pages.

Komando, Kim; USA Today, "Let Technology Help You Keep Track of Your Kids," CyberSpeak, http://usatoday30.usatoday.com/tech/columnist/kimkomando/2005-12-29-tracking-kids_x.htm, Dec. 29, 2005 in 2 pages.

Morales, Tatiana; CBS News, "GPS Keeps Track of Teen Drivers," http://www.cbsnews.com/news/gps-keeps-track-of-teen-drivers/, Jul. 1, 2004 in 4 pages.

Privat, Ludovic; GPS Business News, "IntelliOne Acquires Teen Arrive Alive," http://www.gpsbusinessnews.com/IntelliOne-Acquires-Teen-Arrive-Alive_a245.html, Jul. 3, 2007 in 2 pages.

Teen Arrive Alive, "FAQ," https://web.archive.org/web/20041211232414/http://www.teenarrivealive.com/faq.htm, as viewed Dec. 11, 2004 in 5 pages.

Teen Arrive Alive, https://web.archive.org/web/20041211101559/http://teenarrivealive.com/, as viewed Dec. 11, 2004 in 1 page.

Teen Safe, "FAQ," https://web.archive.org/web/20040903012725/http://www.teensafe.com/faq.htm, as viewed Sep. 3, 2004 in 5 pages.

Teen Safe, "GPS Program: How the TAA Program Works," https://web.archive.org/web/20040903013134/http://www.teensafe.com/gpsprogram.htm, as viewed Sep. 3, 2004 in 2 pages.

Teen Safe, "GPS Show: Know Where They Are . . . ," https://web.archive.org/web/20040907142354/http://www.teensafe.com/gpsshow.htm, as viewed Sep. 7, 2004 in 1 pages.

Teen Safe, "Why Teen Arrive Alive Works," https://web.archive.org/web/20040911235449/http://www.teensafe.com/taaworks.htm, as viewed Sep. 11, 2004 in 2 pages.

* cited by examiner

FIG. 3B
336
334
332
WebSafety
Limited Time Offer
Close
Sign In

FIG. 3F
374
370
Protected
WebSafety.
This device is currently being protected
372
WebSafety
Password

FIG. 30
3000
WebSafety.Blog
Learn about WebSafety.com
Sign In
Sign Up
Greg Murray
This is a short bio of Greg Murray. Cogo Indoles neque nostrud. Validus populus feugiat in melior in hendrerit gravis quis nunc ratis. Secundum luctus autem rusticus tation eu adipiscing huic. Similis odio usitas ut esca iusto
image zoom
image
How to protect the lives of our children in today's world
How to protect the lives of our children in today's world
1 of 10
Search Blog
Most Popular
How to protect the lives of our children in today's world
This is another headline that goes onto two lines
This is another headline that goes onto two lines
Blog Roll
Greg Murray
Eric Wise
Steve Sigler
Jane Smith
John Smith

FIG. 42
Notifications
Today
Yesterday

4200

FIG. 44
4400
4420
4412
Billy's Current Apps
Mostly talks to:

5000

5010

5300

DEVICES AND METHODS FOR IMPROVING WEB SAFETY AND DETERRENCE OF CYBERBULLYING

PRIORITY AND INCORPORATION

Any and all applications for which a foreign or domestic priority claim is identified in the Application Data Sheet as filed with the present application are hereby incorporated by reference under 37 CFR 1.57. In particular, the present application claims priority benefit under 35 U.S.C. §119(e) to: U.S. Provisional Patent Application Ser. No. 61/918,607, filed Dec. 19, 2013; to U.S. Provisional Patent Application Ser. No. 62/019,828, filed Jul. 1, 2014; and to U.S. Provisional Patent Application Ser. No. 62/058,599, filed Oct. 1, 2014; each titled "DEVICES AND METHODS FOR IMPROVING WEB SAFETY AND DETERRENCE OF CYBERBULLYING." The entire disclosure of each of the above items—including each appendix thereof, such as U.S. design patent application No. 29/504,071, filed Oct. 1, 2014, which is included as an appendix to the provisional application filed on that same date—is hereby made part of this specification as if set forth fully herein and incorporated by reference for all purposes, for all that they contain.

BACKGROUND

As technology and web access becomes more pervasive and accessible to younger users, it can sometimes affect child safety and well-being. For example, smart phones and other devices can expose children to content unapproved by parents. Moreover, the historical problem of physical bullying in the schoolyard is increasingly being eclipsed by social and physical threats, vulgarity, and similar problems perpetrated by the cyber bully. Impressive new electronic devices and social media platforms can unfortunately amplify the harmful actions of the cyber bully. Cyberbullying can include tormenting, threatening, harassing, humiliating, embarrassing or otherwise targeting an individual using information or communication devices. It can be particularly pervasive among juveniles.

SUMMARY

Example embodiments described herein have several features, no single one of which is indispensable or solely responsible for their desirable attributes. Without limiting the scope of the claims, some of the advantageous features will now be summarized. Methods and systems are disclosed for controlling and monitoring aspects of user systems, which may include mobile electronic devices.

In some embodiments, a system and apparatus for allowing parents to view and track smart phone activities of their children can include one or more child software modules. The module can be installed on each child's smart phone. The module can access and extract data from or about more than one of the smart phone's other software applications, including at least two of the following: a texting application, a social media application, an image application that facilitates transmission or reception of images, and a web browser application. The module can further send the extracted data to an analysis server. Moreover, the system can include an analysis server that can identify potentially harmful language, images, and websites by comparing the extracted data to existing databases of harmful words, harmful images or image types, harmful websites, and harmful applications. Further, the system can include a parent portal. The parent portal can receive results from the analysis server. In some embodiments, the parent portion can display the results organized by child. The parent portal can also provide both generalized smart phone usage data for each child and visual warnings when harmful results have been found by the analysis server, along with the specific underlying data that triggered the warning. Furthermore, the parent portal can provide an interface for receiving input from a parent. The input can include selections of which child's data to view and/or selections of which types and how much of the data and analysis results to view for each child.

A system and apparatus for allowing parents to view and track smart phone activities of their children can also include the following features: each child software module can be configured to access and extract data sufficient to allow the analysis server to report which new applications are downloaded to each child's smart phone, and that information can be automatically recorded in a computer memory and displayed promptly through the parent portal. A system and apparatus for allowing parents to view and track smart phone activities of their children can also include the following features: each child software module can be configured to access and extract data sufficient to allow the analysis server to report each of the following: which websites were visited using each child's smart phone; and content and timing of each child's posts to social networks. That information can be automatically recorded in a computer memory and displayed promptly through the parent portal.

A system and apparatus for allowing parents to view and track smart phone activities of their children can also include the following features: each child software module can be further configured to access and extract data sufficient to allow the analysis server to report each of the following: the location of the smart phone at periodic intervals throughout the day; and usage of the smart phone that occurs outside of geographic constraints that can be set through the parent portal. That location and usage information can be automatically recorded in a computer memory and displayed promptly through the parent portal. A system and apparatus for allowing parents to view and track smart phone activities of their children can also include the following features: each child software module can be further configured to access and extract data sufficient to allow the analysis server to report usage of the smart phone that occurs during curfew periods, and that information can be automatically recorded in a computer memory and displayed promptly through the parent portal.

A system and apparatus for allowing parents to view and track smart phone activities of their children can also include the following features: for each child, the parent portal can be configured to display the following information on the same daily feed screen: identities of people with whom that child communicates most often, including a visual indication ranking those people by frequency or amount of communication; and a daily feed of the child's activities, organized to be sortable chronologically. The child's activities can comprise: any smart phone applications downloaded; content of any SMS text messages sent or received; identity of any websites visited; content of any social network posts created, viewed, or sent; and a visual warning incorporated into the daily feed. The visual warning can include one or more (or each) of the following: cursing or bullying terms; questionable website visits; and breaking curfew. The system can include the following features: for each child, the parent portal can be further configured to display the following information on the same current applications screen:

a list of all applications currently installed on that child's phone, a visual warning identifying applications that are identified as potentially harmful based on information in the analysis server, and a description of the functions of each of the applications in the list. The system can also include the following features: for each child, the parent portal can be configured to display the following information on the same usage screen: a color chart indicating which applications were used by the child that day, and how much time was spent using those applications. A system and apparatus for allowing parents to view and track smart phone activities of their children can also include the following features: for each child, the parent portal can be configured to display the following: text messages sent and received, with curse words and bullying terms highlighted; a list of most commonly used curse words and bullying terms; and an interface allowing a user of the parent portal to control if text conversations should be flagged automatically, and how many curse words or bullying terms should be allowed before a flag is automatically applied.

A system and apparatus for allowing parents to view and track smart phone activities of their children can also include the following features: for each child, the parent portal can be configured to display the following web access information and controls: a whitelist mode that triggers warnings if the child visits any website domain that is not listed as specifically allowed; or a blacklist mode that triggers warnings for only website domains that that are flagged by a user of the parent portal or by the existing database of harmful websites accessible from the analysis server. A system and apparatus for allowing parents to view and track smart phone activities of their children can also include an embedded map feature visible in the parent portal that indicates where each child has traveled during the day and provides a warning if the child leaves a given geographical radius.

A system and apparatus for allowing parents to view and track smart phone activities of their children can also include a curfew feature comprising: a control interface in the parent portal configured to allow a user of the parent portal to select restricted times that a child's smart phone may not be used; and an active restriction feature in the child software module configured to completely disable the child smart phone during the restricted times, except for emergency phone calls.

A system and apparatus for allowing parents to view and track smart phone activities of their children can also include the following features: the parent portal can be further configured provide an interface for receiving input from a parent, the input comprising selections of which types of harmful material should be identified, and what level of scrutiny to apply in determining harmful material.

A system and apparatus for allowing parents to view and track smart phone activities of their children can also include the following features: a computer that periodically analyzes the selections from many parents regarding types of harmful material and level of scrutiny, analyzes those selections statistically, and incorporates the statistical results in setting default settings and recommendations for future users.

A system and apparatus for allowing parents to view and track smart phone activities of their children can also include an analysis server configured to automatically identify patterns of harmful content for which helpful works of authorship have previously been created and stored in an electronic library, and provide immediate access to those works of authorship to parents by transmitting an electronic copy thereof or a link thereto to the parent portal for display adjacent to a warning based on harmful content that underlies those patterns of harmful content.

A computing device can comprise: a communications module; a location determining module; a memory device comprising a mobile safety module stored thereon as computer-executable instructions; and a hardware processor configured to implement the mobile safety module by executing the computer-executable instructions. Implementation can occur by at least accomplishing the following: retrieve computing device data from the computing device; send computing device data to a control system; and receive a command from the control system based in part on analysis of the sent computing device data. Computing device data can comprise at least one of the following: receiving incoming messages using the communications module of the computing device; retrieving outgoing messages sent using the communications module of the computing device; and determining a location of the computing device using the location determining module. Computing can comprise one or more of the following: activating the location determining module; disabling the location determining module; disabling the communications module; activating the communications module; and selectively deactivating one or more features of the computing device for a predetermined time period.

A system for monitoring one or more computing devices can comprise: a memory device comprising a controller module stored thereon as computer-executable instructions; a hardware processor configured to implement the controller module by executing the computer-executable instructions. These can be executed to at least: receive communications data from one or more controlled computing devices; analyze received communications data; and transmit notification data to one or more controlling computing devices based on the received communications data.

A system for monitoring one or more computing devices can comprise: a memory device comprising a controller module stored thereon as computer-executable instructions; and a hardware processor configured to implement the controller module by executing the computer-executable instructions. This implementation can at least: receive location data from one or more controlled computing devices; analyze received location data; and transmit notification data to one or more controlling computing devices based on the received communications data.

A computing device can comprise: a communications module; a memory device comprising a mobile safety module stored thereon as computer-executable instructions; and a hardware processor configured to implement the mobile safety module by executing the computer-executable instructions. Implementation can at least: select notification settings; receive notification data based on the selected notification settings; and send command data to control an operation of a controlled computing device.

In some embodiments, a computing system can access one or more databases in substantially real-time in response to input from a parent provided in an interactive user interface in order to determine information related to a user system and provide the determined information to the parent in the interactive user interface. The computing system can include a network interface coupled to a data network for receiving and transmitting one or more packet flows, a computer processor, and a computer readable storage medium storing program instructions configured for execution by the computer processor in order to cause the computing system to generate user interface data for rendering the interactive user interface on a computing device, the interactive user interface including an indication of a first controlled device associated with a first child of the parent, wherein the indication of the first controlled device is selectable by the parent in order to initiate analysis of usage pattern of the first controlled device and provide results of the analysis to the parent in substantially real-time. The programmed instructions can further include transmit the user interface data to the computing device. In some embodiments, the programmed instructions can include receiving an identification of a selection by the parent of a second controlled device associated with a second child of the parent in the interactive user interface. The programmed instructions can also include accessing a database storing analysis data for the second controlled device associated with the second child of the parent. Further, the programmed instructions can include updating the user interface data such that the interactive user interface includes indications of at least a subset of determined high frequency contacts. The program instructions can include transmitting the updated user interface data to the computing device.

BRIEF DESCRIPTION OF THE DRAWINGS

Embodiments disclosed herein are described below with reference to the drawings. The following drawings and the associated descriptions are provided to illustrate embodiments of the present disclosure and do not limit the scope of the claims.

DETAILED DESCRIPTION

Figure 1:
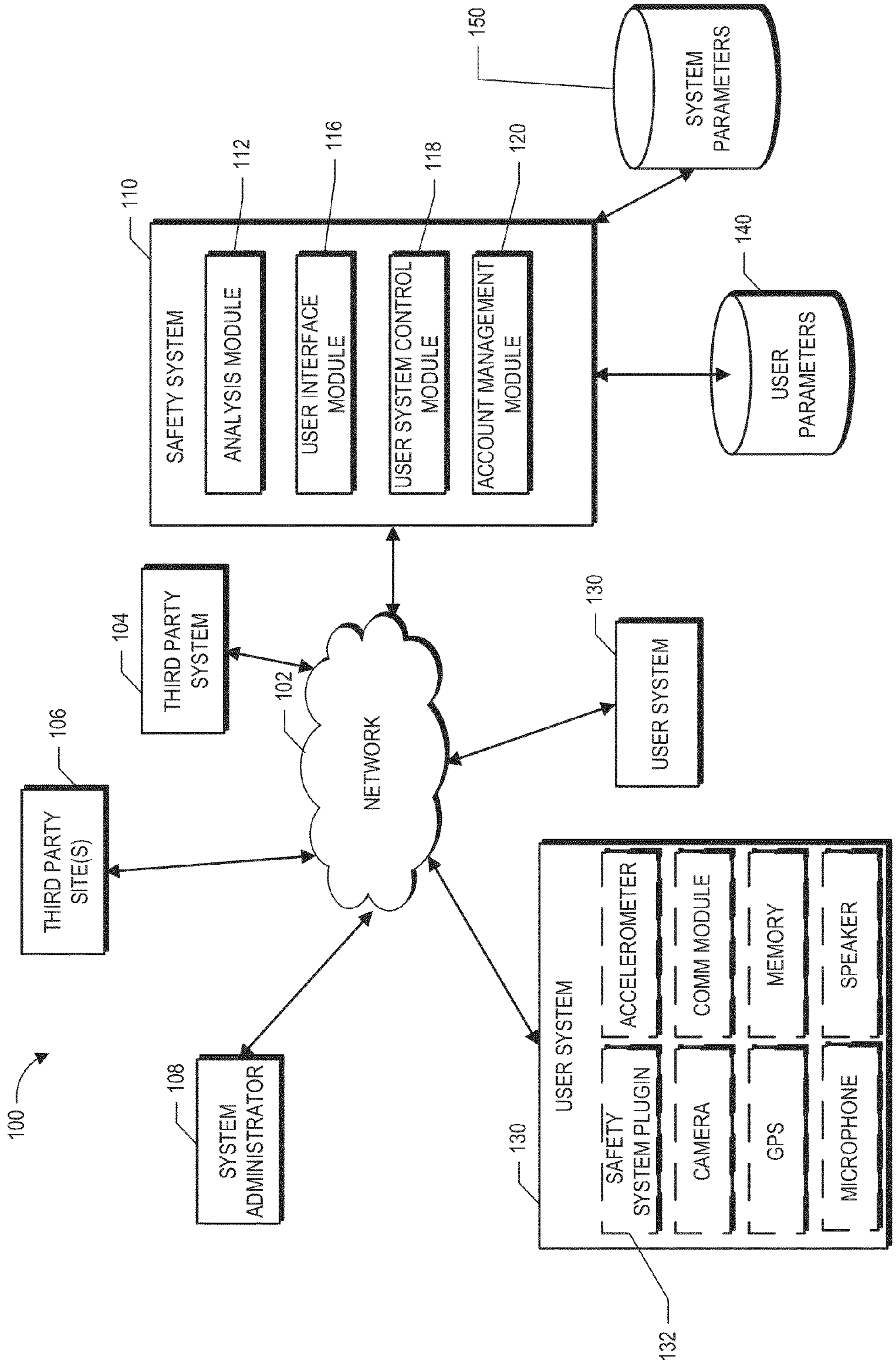
FIG. 1 illustrates a computing environment including a safety system that can help deter cyberbullying.

Although certain preferred embodiments and examples are disclosed below, inventive subject matter extends beyond the, for example, specifically disclosed embodiments to other alternative embodiments and/or uses and to modifications and equivalents thereof. Thus, the scope of any claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Details regarding several illustrative embodiments for implementing the systems and methods described herein are described below with reference to the figures. At times, features of certain embodiments are described below in accordance with that which will be understood or appreciated by a person of ordinary skill in the art to which the system and method described herein pertain.

The system and method described herein can advantageously be implemented using computer software, hardware, firmware, or any combination of software, hardware, and firmware. In some embodiments, the system is implemented as a number of software modules that comprise computer executable code for performing the functions described herein. In some embodiments, the computer-executable code is executed on one or more general purpose or specialized computers. However, any module that can be implemented using software to be executed on a general purpose or specialized computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. Similarly, a number of databases are described herein. Any two or more databases can be combined into one database and that any one database can be divided into multiple databases. Multiple distributed computing devices can be substituted for any one computing device illustrated herein. In such distributed embodiments, the functions of the one computing device are distributed such that some functions are performed on each of the distributed computing devices.

The foregoing and other variations understood by a person of ordinary skill in the art can be made to the embodiments described herein without departing from the inventions disclosed herein. With the understanding therefore, that the described embodiments are illustrative and that the invention is not limited to the described embodiments, certain embodiments are described below with reference to the drawings.

I. Introduction

More children now than ever before have access to mobile computing devices (often smart phones), especially at an early age. Accordingly, phone safety is becoming increasingly more important for parents as they want to monitor and control their children's activity on these devices. In addition, children also need protection from cyberbullying. Many states have enacted cyberbullying laws. Cyberbullying is generally defined as bullying that takes place using electronic technology. Electronic technology can include devices and equipment such as cell phones, computers, and tablets as well as communication tools including social media sites, text messages, chat services, and websites. Phone safety can also include reducing or preventing use of a phone while driving.

This disclosure describes embodiments of safety systems that can protect vulnerable mobile device users, in particular children. Safety systems can assist parents in monitoring and controlling their children's mobile devices, including, for example, the content stored on them or accessed by them, messages received and transmitted by them, etc. Parents can track location of the their children through mobile devices and set up virtual location "fences" as described more in detail below. Safety systems can mine data in text messages (or other communications), filter, and send reports to parents. In some embodiments, a report may be sent to a law enforcement agency or other services, depending on the nature of the messages. Safety systems can also analyze non-written communications, including pictures and videos.

The features of the systems and methods described herein can also be implemented for mobile safety of groups other than children. For example, employers or caregivers may want to monitor or control mobile devices of their employees or patients.

II. Example General System Components

Web safety systems can include the following components that can work together or independently. First, an analysis engine that uses filters and search logic. This can comprise a web based crawler and back-end logic designed to continuously or periodically search, filter, or "crawl" social network accounts and flag conversations with illicit content (for example, undesirable content as may be defined or determined by a user). With respect to FIG. 1, one or more aspects of such a crawler or back-end logic can be located on a server and accessible through the web or a network 102, and the analysis engine can be part of or accessible by the analysis module 112 of the safety system 110. Such an analysis engine may also be at least partially included in a safety system plugin 132 that may be located on or close to a user system 130. The analysis engine or analysis module 112 can be distributed between various processors, including one or more of the following: a processor in a user system 130, a processor in the "cloud" or accessible from the network 102, a third party system 104, and/or a processor in a computer or device having access to a parent portal. A parent can input user parameters 140 using a user system control module 118 to help select and determine what the back-end logic or crawler delivers to the parent through a user interface module 116.

Second, a system can include a mobile application with various social monitoring and safety related features such as GPS/geolocation-based monitoring (for example, monitoring a child's location for safety purposes), mobile web filtering/blocking, parental notification (for example, alerts regarding keywords, new application installation, application usage, etc.), and SMS/Text message monitoring or blocking, call blocking, and/or phone lockout (for example, inhibition of functionality while driving). In the context of FIG. 1, these functions can be accomplished through a safety system plugin 132 that can be installed on a user system 130, for example. In some cases, raw data can be gathered locally at a user system 130 (e.g., using a camera, a GPS, a microphone, an accelerometer, from its memory, from other software applications, etc.) and either partially processed by a safety system plugin 132 or sent directly over the network using a communications module for analysis (or further analysis) by an analysis module 112 of a safety system 110. A safety system plugin 132 can be especially helpful in controlling the local functionality of a user system 130.

Third, a website interface (for example, an administration portal, user community, etc.) to allow users (for example, parents) to review reports and details of protected individual's (for example, their children's) activities, subscribe or contribute to services such as crowd-sourced website black lists or white lists, and/or modify various parameters of the monitoring software. In the context of FIG. 1, this website interface can be a user interface module 116 and/or an account management module 120, and it can be accessible via the network 102, for example.

Fourth, back-end data hardware and software that can store, process, use, index, recall, and send (for example, for display) the information for use by the supporting systems for the functions listed above. In the context of FIG. 1, this back-end can be included in the analysis module 112; it can be located remotely and accessible through the network 102; it may contribute the system parameters 150 and be administered by a system administrator 108.

The described systems can incorporate and expand on the technical information and teachings in U.S. Pat. No. 8,380,176; its entire disclosure is incorporated by reference herein for all that it contains and is made part of this specification for all purposes.

III. Example Safety System

FIG. 1 illustrates an embodiment of a computing environment 100 including a safety system 110 that can monitor and control a user system 130. In some embodiments, a safety system is not limited to those items in the box 110 but also includes one or more of the other illustrated elements in the environment 100. For example, a server, a home computer, and a mobile device can act in concert, each having some locally-installed software and communicating with each other through the web or a network.

User system 130 is illustrated as a single item for convenience but represents one or more user systems 130. In general, the user systems 130 can include any type of computing device capable of executing one or more applications and/or accessing network resources. For example, the user systems 130 can be one or more desktops, laptops, netbooks, tablet computers, smartphones, PDAs (personal digital assistants), servers, smartwatches, computerized eyewear, smart augmented-reality wear, e-book readers, video game platforms, television set-top boxes (or simply a television with computing capability), a kiosk, combinations of the same, or the like. The user systems 130 can include software and/or hardware 132 for accessing the safety system 110, such as a browser or other client software (including an "app"). In some embodiments, some or all of the modules of the safety system 110 can be installed as application software on the user system 130.

The safety system 110 can control and/or monitor user systems 130 via one or more modules of the user system 130. In a first example, the user systems 130 can include a communication module (not shown) having an antenna for receiving and sending communications data. The user system control module 118 of the safety system 110 can block access to or disable the communications module. Accordingly, the user system control module 118 can prevent user systems 130 from transmitting or receiving communications.

In addition to using a communications module of a user system 130, the user system control module 118 can also control the user system 130 through various other technical channels. For example, even though the control module 118 may monitor a communication module (e.g., as radio frequency transmissions are prepared or transferred to or from an antenna within the user system 130), the control module 118 may use a separate channel to exert control over the system 130. Thus, as a result of monitored communications, a user interface may be controlled, locked, blocked, etc. Thus, passive monitoring and active control can be relatively independent as a technical matter, but the two functions can be related through logic or programming within the safety system 110. This can allow greater flexibility in effectuating control and control can be asserted through multiple channels simultaneously or in a contingency arrangement. Thus, if a mobile phone user is able to defeat the efforts of a control module 118 to control a communication module of the user system 130, the control module can revert to a mode that instead controls an interface of the system 130, thereby achieving the same ultimate goal through a different technical channel. This control redundancy can make the safety system 110 more robust because it can defeat efforts to circumvent its controls. That is, if a child attempts to avoid parental controls in one channel, another channel may allow the parental controls to nevertheless prevail. Moreover, some operating systems may be more difficult to interface with. Accordingly, by allowing a safety system 110 to work through multiple channels to control user systems 130, one or more of those channels may be more feasible to implement as the safety system 110 is configured to work with a more closely-guarded underlying operating system. Monitoring and control directed by a user system control module 118 can occur at one or more of the root level, a middle level, or a superficial level of a user system 130. In a second example of how a safety system 110 can control and/or monitor user systems 130, the user system control module 118 can intercept or otherwise access and analyze image or video feeds from or to the camera module of the user systems 130. For example, the analysis module 112 of the safety system 110 can intercept and analyze live capture of images or a video feed and determine whether it is appropriate for storage in the memory of the user system 130 or for transmission. Based on the determination, the user system control module 118 can block storage or transmission of the images or video feed. Thus, it can prevent, inhibit, deter, or monitor the taking or receiving inappropriate pictures.

In a third example of how a safety system 110 can control and/or monitor user systems 130, the user system control module 118 can, in some circumstances, turn on the camera module of the user system 110. This may be useful to identify the location of the user system 110 or determine if the child is in danger. The safety system 110 can use a microphone of the user system 130 to receive an audio signal and further determine safety of the child based on parsing the audio. The safety system 110 can monitor for certain words (like "help") or sounds (like "crying" or "screaming"). In some instances, the safety system 110 can use the communications module of the user system 130 to send alerts (for example, to parents or authorities) based on analyzed image, video, or audio. The safety system 110 can use the speaker of the user system 130 to output an alarm in an event of danger. In a fourth example of how a safety system 110 can control and/or monitor user systems 130, the user system control module 118 can receive information from a GPS module and/or an accelerometer module of the user system 130. Based on the received information, the user system control module 118 can identify the location and/or calculate speed of the user system 130. In some embodiments, the analysis module 112 can supplement with accelerometer data when the GPS data is not available to determine motion of the user system 130. In some embodiments, speed, acceleration, and/or relative location data can be collected, analyzed and/or used using the information in U.S. Pat. No. 8,380,176; its entire disclosure is incorporated by reference herein for all that it contains and is made part of this specification. Further, the speed may be monitored with respect to other conditions for accuracy. For example, the safety system 110 can measure heart rate of a user and track speed of the user device concurrently to avoid false positives such as when the user is exercising or walking. The safety system 110 can also access accelerometer data from the user system 130 to determine that a person is running instead of driving.

The third and fourth examples provided above are examples of how a safety system 110 can control and/or monitor user systems 130. These demonstrate how a mobile device can become a valuable tool to gather and potentially transmitting information, acting as like an airliner's "black box," a homing beacon, a child tracking device, and/or as a distress signal in various situations. In some modes, software on a mobile phone can allow a child, for example, to activate a distress signal that will record and/or transmit location information, sounds, pictures, etc. without alerting a would-be kidnapper to the transmissions. To save battery, some embodiments may transmit such emergency information in periodic spurts, for short amounts of time, to enable a longer emergency operation mode. Such an emergency mode can be activated readily, or it can require a password or other verification to avoid improper or inadvertent uses. Thus, the systems described herein can deter or assist in resolving not only cyber-bullying, but also help remediate other more drastic and immediate physical dangers such as kidnapping. In order to more effectively monitor and/or control aspects of the user system 130, one or more software portions of the safety system 110 can be installed locally on the user system 130. For example, it may be inefficient to monitor radio transmissions, image or video feeds, or location information remotely if the user system 130 is a mobile device. Thus, the safety system can comprise an application that accomplishes many monitoring and control functions locally, while still accepting input and control from a separate user system. Thus, a parent may be able to log in to a user system control module 118 or account management module 120 and configure settings for the safety system 110, but those settings can be implemented through software or other modules that are locally present on a child's mobile device, which can be a user system 130. The safety system 110 can facilitate safe communication (e.g., through encryption) between the locally-installed software and the web-accessible account management module 110 (which can act as a parental settings/monitoring portal). Thus, a parent may be able to select and input user parameters 140, to decide levels of scrutiny and filtering that should be applied to a child's device (which can be a user system 130).

In some embodiments, the safety system 110 can be integrated with the third party tools through a plug-in or an API (application programming interface). The third party tools may come pre-installed with a plug-in to the safety system 110. In other embodiments, a plugin to the safety system 110 may be installed on to a third party tool. For example, a third party tool can include text/SMS client, an email client, a web browser, a social networking client (for example Facebook, Twitter, etc.), an image capture client, etc.

The safety system 110 can be implemented in computer hardware and/or software. The safety system 110 can execute on one or more computing devices, such as one or more physical server computers. In implementations where the safety system 110 is implemented on multiple servers, these servers can be co-located or can be geographically separate (such as in separate data centers). In addition, the safety system 110 can be implemented in one or more virtual machines that execute on a physical server or group of servers. Further, the safety system 110 can be hosted in a cloud computing environment, such as in the Amazon Web Services (AWS) Elastic Computer Cloud (EC2) or the Microsoft® Windows® Azure Platform.

The user systems 130 can remotely access some or all of the safety system 110 on these servers through the network 102. The user systems 130 can include thick or thin client software that can access the safety system 110 on the one or more servers through the network 102. The network 102 may be a local area network (LAN), a wide area network (WAN), such as the Internet, combinations of the same, or the like. For example, the network 102 can include any combination of associated computer hardware, switches, etc. (for example, an organization's private intranet, the public Internet, and/or a combination of the same). In some embodiments, the user software on the user system 130 can be a browser software or other application software. The user system 130 can access the safety system 110 through the browser software. In certain embodiments, some or all of the safety system 110's functionality can be implemented on the user systems 130.

A safety system plugin 132 can be part of a user system 130. This plugin 132 can periodically communicate through a network 102 with a safety system 110 using, for example, a communications module of a user system 130. This arrangement can allow for a safety system 110 to offload intensive processing to a server rather than a user system 130 if that system 130 is a smart phone, for example. Thus, if any filtering algorithms, image analysis, etc. would tend to bog down a mobile processor or make the safety system 110 less transparent or more intrusive to operation of a user system 130, this can be mitigated by instead feeding raw data to a server or a home computer that is also part of or accessible by the safety system 110.

FIG. 1 shows various components of a computing environment 100. A network 102 can facilitate communication between components of the system. For example, a system administrator 108 can use the network 102 to confirm that safety systems 110 (e.g., as used and overseen by parents) are properly monitoring and controlling user systems 130 (e.g., as used by their children). A system administrator 108 can also provide system parameters 150 to the safety system 110. A safety system 110 can effectively interpose its filters between a user system 130 and various ways in which that user system interacts with the world, whether through any network 102 (including the world wide web) or otherwise. Thus, a safety system (in conjunction with parental interactions) can form a protective shield for transmissions to or from a camera, a communications module, a memory, a microphone, and/or a speaker of the user system 130. Even the user systems 130 attempts to access third party sites 106 or third party systems 104 can be monitored and/or controlled.

IV. User System Monitor and Control

As described above, the safety system 110, which may include one or more modules, can control and/or monitor the user systems 130. In some embodiments, the safety system 110 can monitor, filter, and/or block communications.

A. Communications Monitoring, Filtering, Blocking, and Alerting

Figure 2:
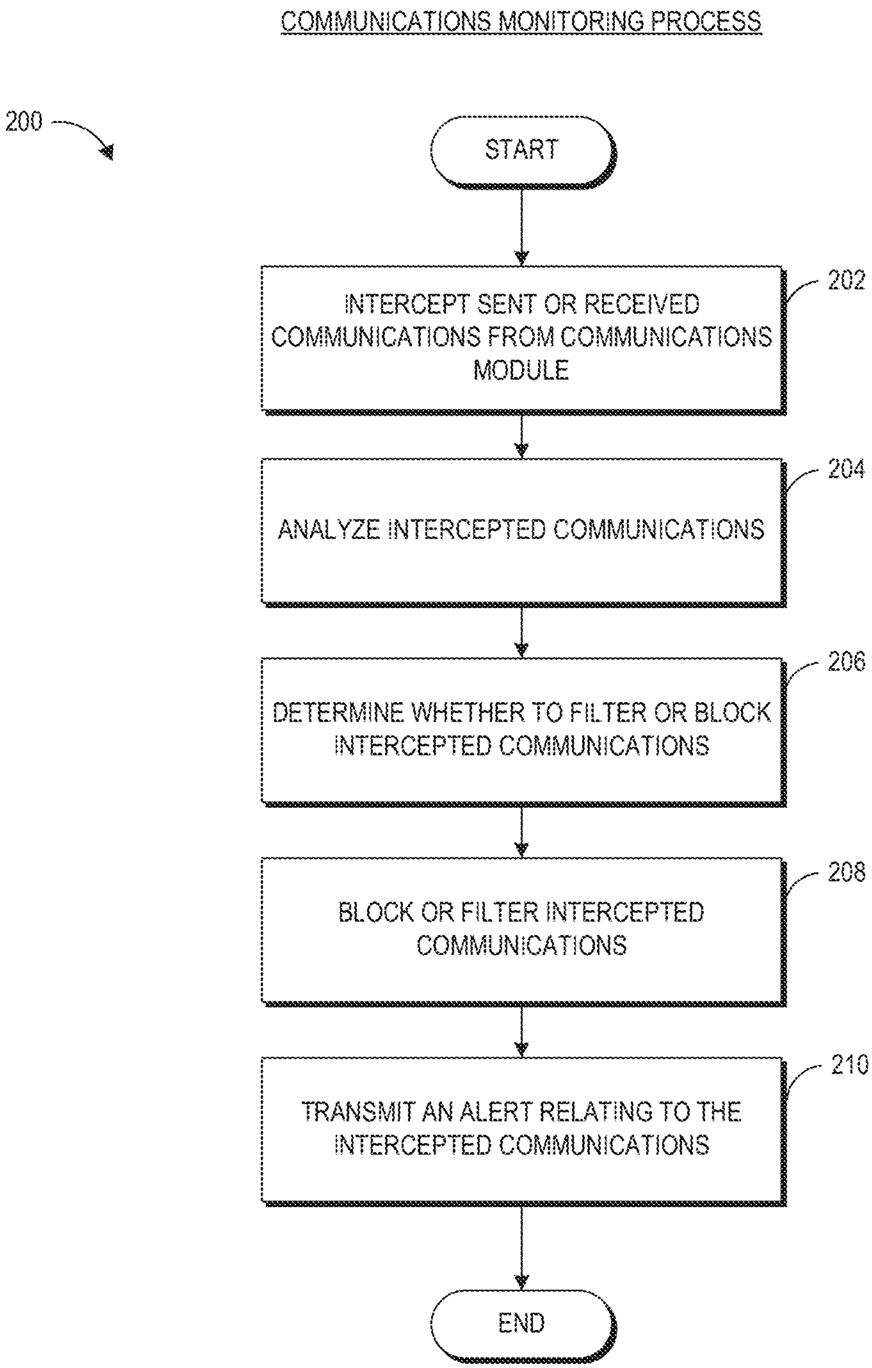
FIG. 2 illustrates a communications monitoring process.

FIG. 2 illustrates an embodiment of a communication monitoring process 200 for monitoring, filtering, and/or blocking communications sent or received at user systems 130. The communications monitoring process 200 can be implemented by any of the system described above. For illustrative purposes, the process 200 will be described as being implemented by components of the computing environment 100 of FIG. 1. The process 200 depicts an example overview of monitoring and filtering communications. In some embodiments, communications monitoring may also be implemented as described herein with respect to SMS Agent.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those of ordinary skill in the art.

The process 200 (some or all of which can be cycled and repeated in parallel or serially) begins at block 202 when the communications module of the user system 130 receives or is in the process of sending a communication. The communication may include, without limitation, a text/SMS message, a chat message, an audio message, a video message, a multi-media message (MIMS), an e-mail, etc. The user systems controls module 118 can intercept the communications. The communications can be intercepted using the following hardware and technical protocols, for example. In some embodiments, the safety system 110 can capture packets received at the communications module of the user system 130. The safety system 110 can detect whether these packets include messages, for example, Whatsapp message, SnapChat messages, Facebook messages, etc. The intercepted messages can be stored in a data store 140 and analyzed as described herein.

These communications can then be analyzed by the analysis module 112 at step 204. Some or all of this analysis can occur either onboard a user system 130, on a server accessible through the network 102, and/or within a safety system 110 that may be installed on a personal computer of a parent for example. The analysis module 112 can review the content and source of the communications and determine, for example, whether the communications contain content that should be blocked or filtered, as indicated at step 206. This analysis can use external or internal sources (e.g., a dynamic dictionary of regional terminology, dictionaries of urban slang, a database maintained by a system administrator 108, one or more databases updatable by a community of users, specific language or country resources, etc.) against which to compare this content. For example, the communication may contain illicit content such as profanity or inappropriate images. An analysis process can include comparison of words and word groups to identify not only explicit language but also aggressive language, explicit and implicit threats, etc. Analysis can also review frequency (harassing or distracting rapidity of test messages, for example) to determine if a perpetrator is hounding a child with frequent messages or transmissions. Analysis can review metadata for attachments to determine if they are named in a manner that indicates danger or indicates provenance from or association with pornographic websites for example. Communications can also be analyzed to identify moods, such as neutral, or happy or sad or depressing. Mood analysis can be a function of keyword search and/or machine learning. Certain words such as "kill" or "depress" or "sad" can be used to identify moods. The safety system 110 can generate alerts based on the identified mood of the messages (or social media communications) sent or received by the users. Accordingly, the safety system 110 can identify and trigger alerts for depression or suicide. Alerts may be received via postcard notifications on iOS or Android devices.

Figure 15:
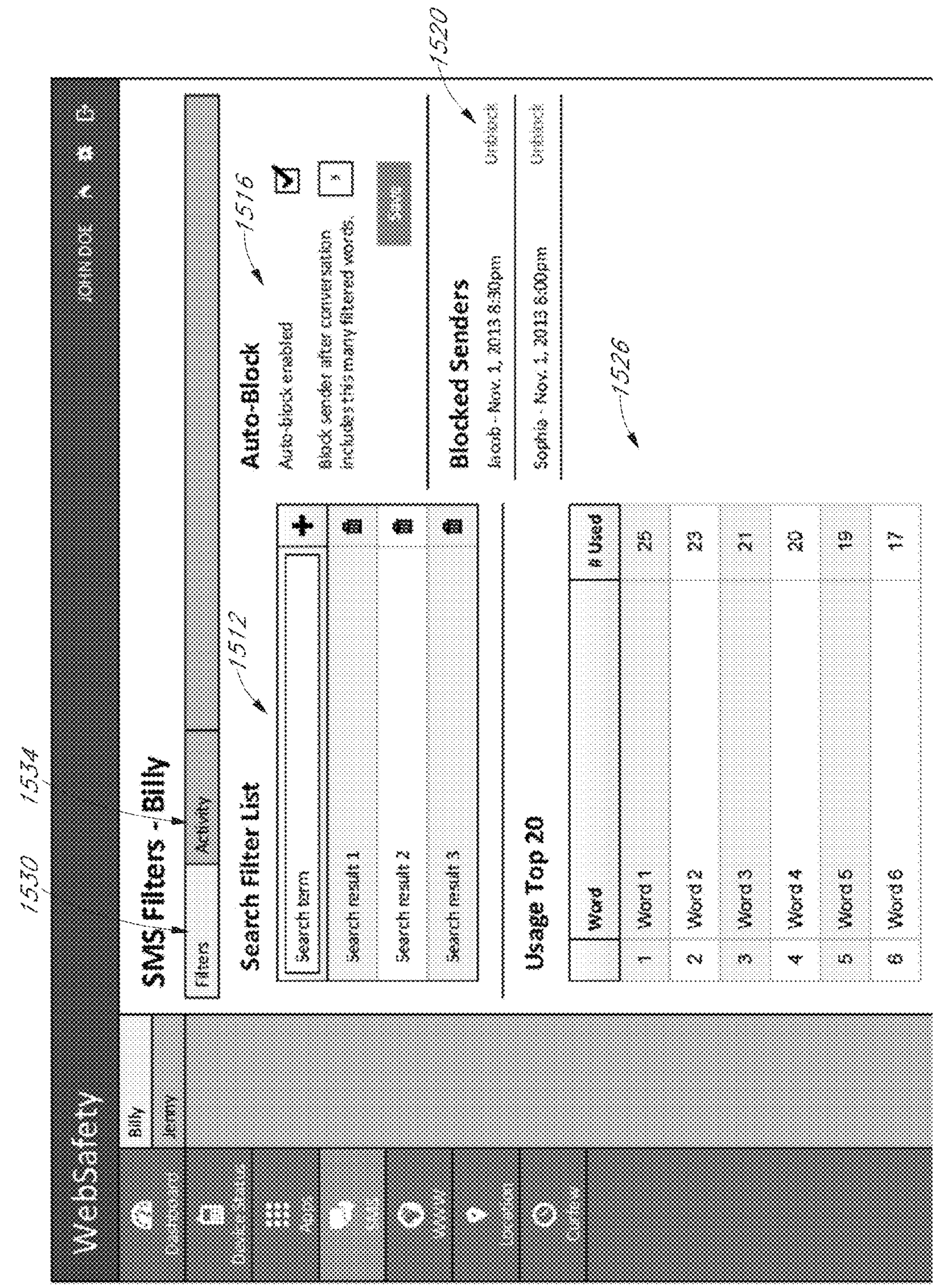
FIG. 15 shows a Filters view of a set of SMS (or short message service) screens.

In an example, intercepted communications can be analyzed—and a safety system 110 can perform SMS filtering and searching to achieve the views shown in FIG. 15, 16, 46, and/or 47, for example—using the following technical protocols. In some embodiments, the safety system 110 can call operating system hooks to access SMS messages or other social media data. Operating system hooks can include Android App Managers such as SMS Receiver. The safety system 110 can call these hooks over a periodic time interval. The safety system 110 can continuously monitor the communications, however, that might drain the battery of the user system 110. Accordingly, the period may be balanced with respect to battery life conditions. In some instances, the safety system 110 can poll for data every 15 minutes. The safety system 110 can send polled data to server for storage and analysis. In some embodiments, the safety system 110 can capture video or snapshots of the display of the user device 130 to track and analyze data. The safety system 110 can also modify the user system 130 on the firmware level. Accordingly, in some instances, the safety system 110 can operate at a lower level than the operating systems to interface directly with the hardware modules.

The user system control module 118 can accordingly block or filter the intercepted communications (or take another alternative or additional action such as alerting a user) at step 208 based on the determination from the analysis module 112. Blocking can include any one of the following operations: not storing the communication in the user system's memory, preventing the communications module from transmitting the communications, not showing the intercepted communications in the user interface of the user system, deleting, responding with a message that indicates the message was not received and the future messages will also be blocked, re-routing the message to another destination (such as a parent portal or school administrator), responding with an automatically-generated kind and conciliatory message, automatically responding with a reference to reporting, potential legal action, etc. Alerting a user can include passively recording events or items so that a user can look them up later, or it can include actively sending a notification message to a user. Filtering can include removing some or all content of the communication. In some embodiments, filtering can include substituting some content of the communication such as words (for example substituting the word "shucks" for the word "crap"). Certain images may also be blocked, redacted, censored and/or substituted. Filtering can include completely deleting harmful or bullying messages from a user system 130, and/or filtering can include re-routing those messages to a parent that may access the system through a user interface module 116.

In some embodiments, communications may be blocked or filtered depending on the sender or recipient. Certain senders or recipients may be on a block list. The block list may be created by users (for example, parents) through an administrative portal through an account management module, for example. The block list may also be automatically created based on number of communications, frequency of communications, or information received from a third party system. For example, a system can include a web browser or an add-on to a web browser that includes its own blocking, alerting, and/or filtering functionality. Such functionality can be accomplished through socket or port monitoring, proxy filtering or diversion, etc. Block lists can also be created and updated centrally by a system administrator 108, for example. Block lists can be maintained for various categories, allowing a user to subscribe to filtering or blocking of a category of objectionable sites or material, while allowing other material that may be objectionable to some, but not that particular user. A multi-level hierarchy of blocking sensitivity can be created to allow a more trusted user to have access to some information (e.g., medical information that may be blocked for younger users due to anatomical references.) All examples of blocking or filtering provided herein can additionally or alternatively comprise sending an alert or notification.

As shown at 210, an alert can be transmitted relating to an intercepted communication. The alert can take one or more forms, and can depend on the result of the analysis 204. In some examples, the alert results in an objectionable word, phrase, or image appearing in a feed viewable by a parent and associated with the child, along with the sender of that word or image. In some cases, a parent can view all communications with his or her child, along with a breakdown of the people communicating with their child and the relative frequencies of those communications.

A safety system can be used to "trust but verify" (in the case where blocking or filtering may be turned off in favor of active alerts or passive logging). In certain embodiments, an alert relating to the intercepted communications can additionally or alternatively be transmitted to parents or a third party system. The safety system can also store intercepted communications in a user data repository 140. Parents can review all intercepted communications from the user data repository 140 using an administrative portal user interface described more in detail below.

Because an analysis and/or filter can be applied at various physical locations—a child's device, a server, a parent's device, etc.—raw data and/or alerts can be sent directly from a child's smart phone to a parent device, they can be sent from a server to a parent device, and/or they can be sent within a parent's device. Timing of alerts is advantageously rapid. Real-time alerts can be helpful to identify harmful behavior rapidly and aid a timely response. Real-time can refer to various relatively short delay periods, including a few seconds, one or a few minutes, one or a few hours, same-day alerts, etc. Factors that affect a delay before an alert (although that delay may not be inconsistent with real-time delivery) can include: internet connection speeds and availability, cell phone provider service, available processor speed for analysis algorithms and technical protocols, and various application-specific factors.

In an example, various aspects of a child's device can be monitored and alerts or notifications can be provided to a parent. The general alert process can be accomplished using the following technical protocols. For example, alerts can be processed through a push protocol. The safety system 110 can analyze the monitored content and make a determination to push messages to the parents device. In some embodiments, the messages may be pushed according to a priority determination. For example, certain alerts relating to a child leaving a particular geofence may be pushed right away. Other alerts including child's usage of offensive words may be sent in an email report or shown on a dashboard when the parent logs into the system. Accordingly, the safety system 110 can determine priority levels of alerts and push them accordingly.

B. Application Monitoring, Filtering, Blocking, and Alerting

Similar to communications filtering, parents may also want to filter content from various software applications on the user systems 130, such as web browser clients, social networking clients, SMS, MIMS, etc. The techniques, protocols, principles, and approaches described elsewhere in this application with respect to analyzing, filtering and blocking functionality can also apply here. In addition to restrictions on viewing content, the user systems 130 may be blocked from sending messages or posting content in some applications. For example, parents may want to be alerted to various activities, or to prohibit their kids from posting pictures with alcohol or drugs on social networking sites. Parents may also want to be alerted or to prevent cyberbullying via social networking sites. Accordingly, the safety system 110 can crawl through social networking or other accounts of individuals to be protected (for example, children). This may be done by configuring a safety system plugin 132 to track and automatically store the account names and passwords when children enter them for these websites or other software applications. The safety system 110 can also work as a plug-in for these applications. The safety system 110 can review the content and determine any content to block or flag for review via the administration portal or user interface module 116. In some embodiments, application monitoring, filtering and blocking may also be implemented as described herein with respect to Apps Agent.

In some embodiments, the safety system 130 can alert a user and/or prohibit, inhibit, or block downloading and installation of certain applications. The safety system 130 can assess applications to be blocked using an application block list that may be defined by parents or dynamically maintained by a system administrator 108 or a third party system 104, and be accessible to the safety system 110, which can access and copy such a block list or comparison database periodically. The safety system 130, a system administrator 108, or others can dynamically maintain the app block list based on crowd-sourcing, allowing users of the system to give feedback about what applications should or should not be included, or discriminating between various levels of protection in a refined hierarchy of block lists. The safety system 130 can use selections, reviews and/or ratings from a plurality of users to dynamically maintain the app block list. In some embodiments, the safety system 130 can automatically send an alert or prepare a report when new applications are installed on a user system. The reports may be sent daily. Parents may also see these reports of the user system 130 on an administrative portal. The report may include the application name, the description of the application, the date and time of installation, and application rating/reviews. In some embodiments, the safety system 110 can remove an application from the user system 130 based on an input. For example, parents can remotely via the administrative portal select removal of a particular application from their child's phone.

Functionality related to application filtering and blocking can be controlled from and/or reviewed using the interactive views illustrated in FIGS. 14, and 43-45, for example. In an example, a safety system 110 can identify, analyze, uninstall, and/or block installation of software applications on a user system 130 using the following technical protocols. For example, the safety system 110 can call an operating system content provider to retrieve status of applications. The status of the applications can include which applications are installed or removed. The status can also include whether the application is active or running in the background. Accordingly, the safety system 110 can call operating system hooks to retrieve status of the applications. In some embodiments, the data store 140 may partially reside in the memory of the user system 130. The user system 130 may have restrictions on available data space. However, sending data continuously may tax battery and bandwidth. Thus, in some embodiments, data is stored locally for a certain time period before being transferred to a server. For instance, data may be stored locally for 15 minutes before transfer to an external location. The local cache can be deleted after a predetermined time period or once a predetermined capacity is reached.

C. Website Monitoring, Filtering, Blocking, and Alerting

The safety system can also block content from certain websites by filtering or substitution. Some websites may be completely prohibited. Some approaches to filtering, blocking, and alerts can include creation, storage, and updating of one or more black lists or white lists. These lists can comprise a look-up table that lists names, URLs, or other identifying indicia of the sites, sources, or content that will trigger the relevant action. For example, a black list of undesirable websites can be downloaded or accessible automatically by an application for a mobile device. Black lists can be dynamically maintained by a user-community and various objectionable materials can be classified using a code system (for example, "po" for pornography, "pr" for profanity, "nu" for nudity, "vi" for violence, "dr" for drugs, etc.) Existing rating systems can be employed or expanded (for example, motion picture or electronic gaming ratings can be used). Content can also be assigned a relative severity on a numeric scale, for example. Users can rate content and an average can be used to automatically include or not include certain content or websites in a black or white list. Users can then determine their desired level of sensitivity and subscribe to one or more sets of black lists or white lists. Black lists can also include graphic images, for example of gang symbols, genitalia, other body parts, etc., and these can be used as reference libraries against which to compare unlisted content with graphical algorithms. These concepts relating to user interaction, black lists, white lists, etc. can apply to blocking, filtering, and alerts with respect to both applications and web pages, and message content. In some embodiments, website monitoring may also be implemented as described herein with respect to WWW Agent.

In some embodiments, the monitoring, blocking, filtering, and/or alert functions described herein can be used to combat inefficient behavior by students and/or employees on the job. Thus, the system can not only improve safety but it can deter time-wasting activities and improve productivity.

In addition to analysis of web pages visited, URLs employed, applications run (remotely or locally), and messages sent or received, the system can scan stored files (such as website bookmarks, stored favorites, etc.) in order to generate alerts or other blocking or filtering activity. Some embodiments can allow removal of undesirable bookmarks, websites, etc. The system can employ key-logging, spy-bots, ad-ware techniques, etc. (techniques pioneered by more subversive enterprises) in the service of the greater causes of improving safety, avoiding or recording evidence of illicit activities, cyber bullying, etc.

Figure 17:
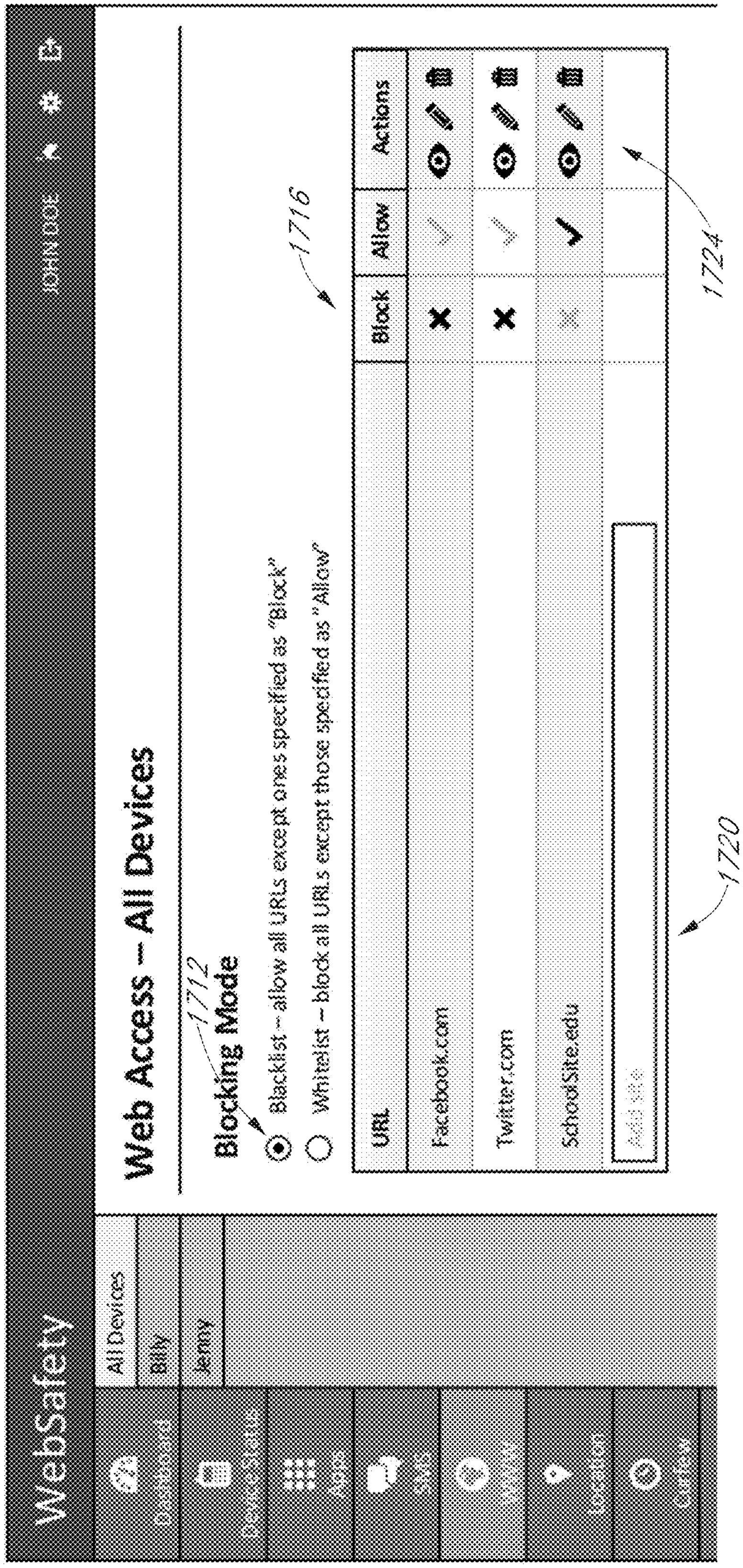
FIG. 17 shows a WWW (or world-wide web) screen.

Functionality related to website or browser alerting, filtering and blocking can be controlled from, organized by, and/or reviewed using the interactive interface illustrated in FIG. 17 and/or 48, for example. In an example, a safety system 110 can identify, analyze, inhibit access to, send alerts related to, and/or block content from websites or other internet sources on a user system 130 using the following technical protocols. For example, the safety system 110 can poll content provider of the operation systems to retrieve URLs accessed by users. The content providers may access device drivers which may control hardware (such as communications control and GPS) of the user systems 130. Accordingly, the safety system 110 can poll respective content providers for specific information including telephony services, URLs, SMS, application monitoring.

D. Safety System Plugin/Mobile Application

Figure 3A:
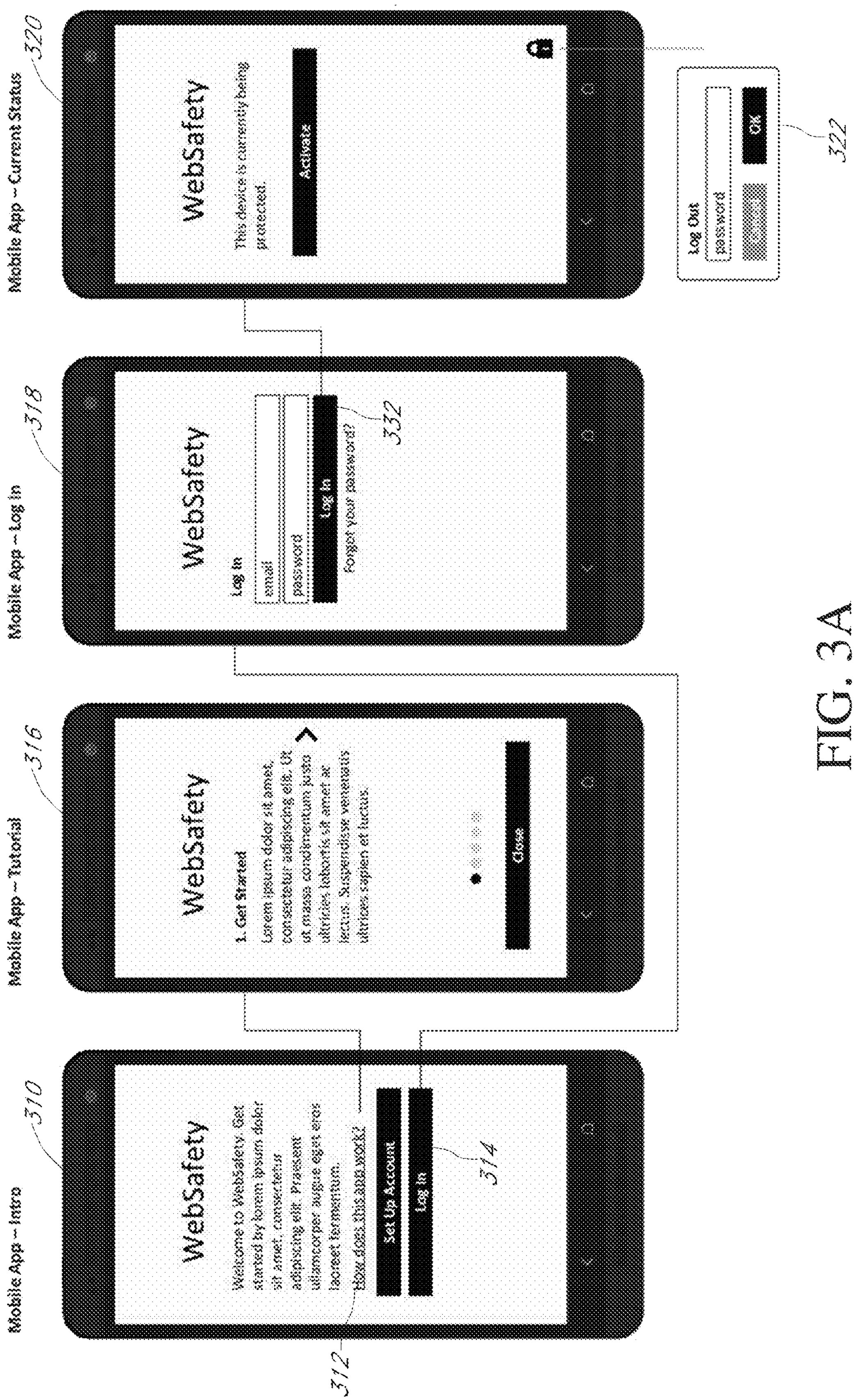
FIG. 3A shows views of a mobile application as it may appear running on a smart phone device.

FIG. 3A illustrates views of an example safety system plugin (e.g., the plugin 132) that may be installed as a software application on a mobile device or smartphone (which can be a user system 130, for example). An application can be downloaded to the smartphone, and the introduction view 310 can be shown upon launch of the application. Selection of the "how does this app work" button can result in the tutorial view 316, which can include multiple screens. Selection of the login button can result in the log in view 318. Selection of the log in button after user credentials have been entered can result in a current status view 320. A log out control 322 can be provided, allowing entry of a password. Log out can be restricted to a parent or an account holder who installed the mobile application and may not be available to any user of the mobile device.

Figure 3B:
FIG. 3B shows three views of a mobile application initiating and sign in process.

FIG. 3B shows three views of a an example mobile application initiation and sign in process. For example, a subscription reminder screen 332 can remind a user who has downloaded an application to subscribe and/or install additional software that will interact with the mobile application (or plugin 132). That additional software can provide analysis and reporting features such as those described herein with respect to safety system 110. An "OK" button control can allow a user to close the reminder screen 332, and this can allow additional screens to be viewed. One of the additional screens can be a sign in screen 334, which can have a sign in button and also provide information (and access to further information, e.g., through a hyperlink or active control illustrated here to say "How does WebSafety work" thereon) regarding the features and usefulness of a safety system 110. Another additional screen can be a sign up screen 336, which can be web accessible and allow a user to obtain a subscription.

Figure 3C:
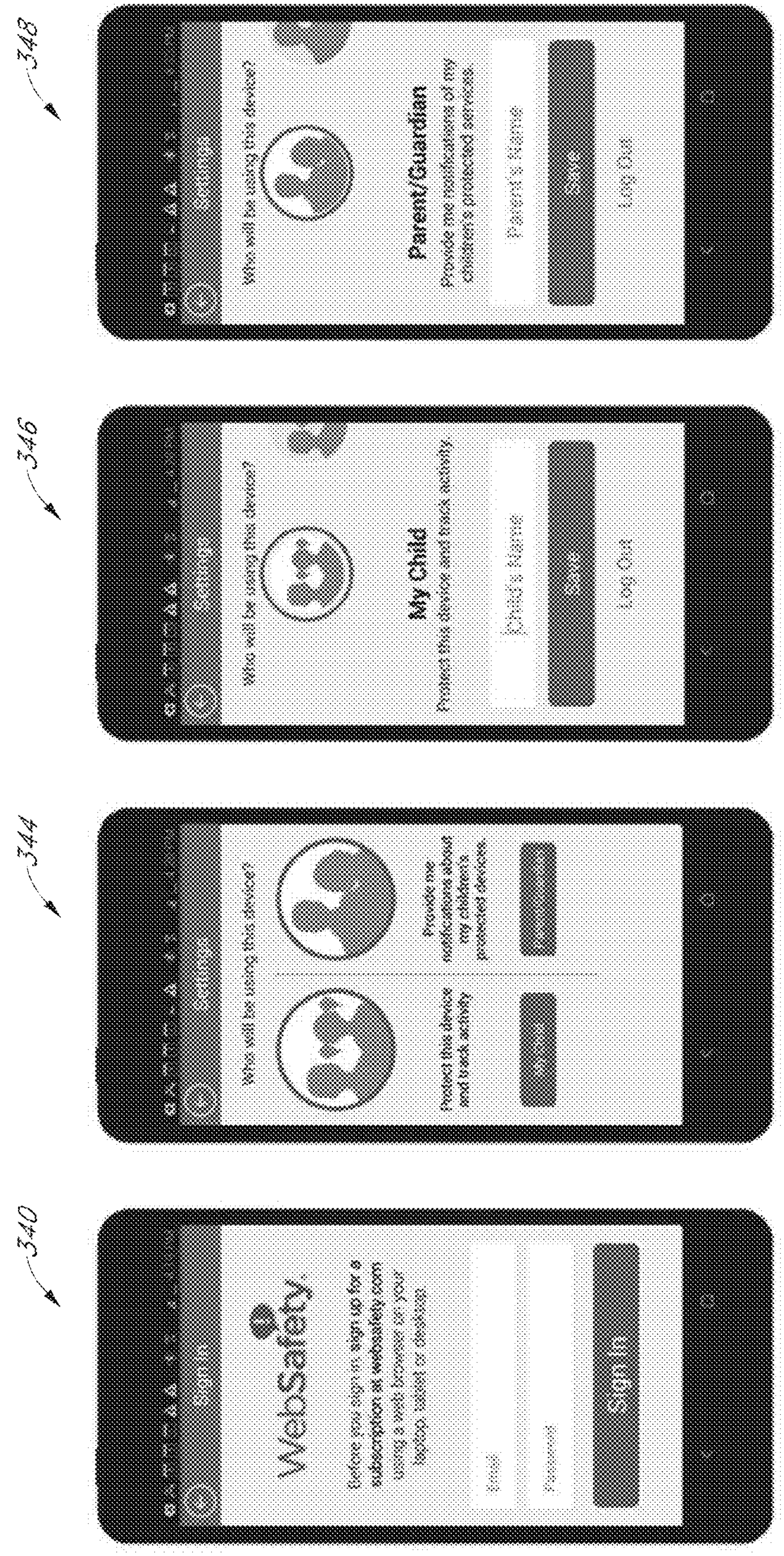
FIG. 3C shows four views of a mobile application sign in and settings process.

FIG. 3C shows four views of a mobile application sign in and settings process. A password view 340 can include user accessible fields for accepting and e-mail and password as shown. Alternatively other credential systems can be used. For example, a user can access the system using credentials associated with a social network account. The password view can accomplish functions similar to that of the introduction view 310, for example. Clicking a sign in button can provide a user access to a bifurcated user choice screen 344, allowing a user to choose who will use the device: a child or a parent. This can allow a single application software download that can function in either child mode or parent mode, depending on a selection in a process as indicated here in FIG. 3C, and/or in FIGS. 31 and 32, for example. Selection of a "my child" control button can result in the my child view 346; selection of a "parent/guardian" button can result in the parent/guardian view 348. Each option allows entry of a name, a save button, and a log out button. The my child option initiates a process that protects the device and tracks its activity. The parent/guardian option initiates a process that provides notifications to the device of protected services associated with children's devices on the same account.

Figure 3D:
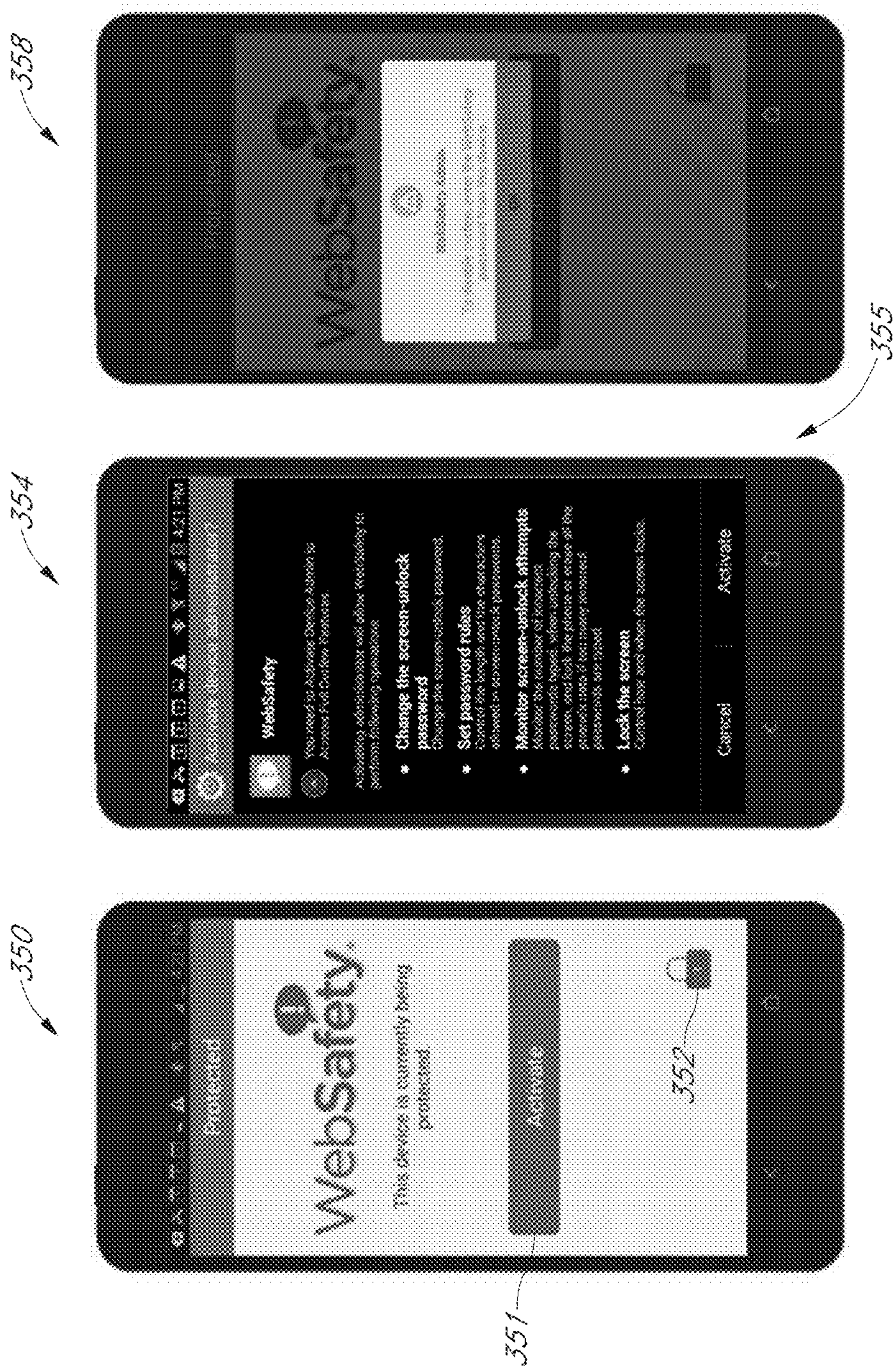
FIG. 3D shows three views of a mobile application activation and device administration process.

FIG. 3D shows three views of a mobile application activation and device administration process. A protected view 350 can be seen on a child's device indicating that a plugin 132 is installed and functioning. An optional activate button 351 can be selected, resulting in an administrative information screen 354. A lock control 352 can be selected, resulting in a prompt to enter a password or other credential (see the access settings dialogue 374 of FIG. 3F), which, if provided, can lead to the bifurcated user choice screen 354. The administrative information screen 354 can have an activate button 355, which, when selected, can result in the curfew disable message screen 358.

Figure 3E:
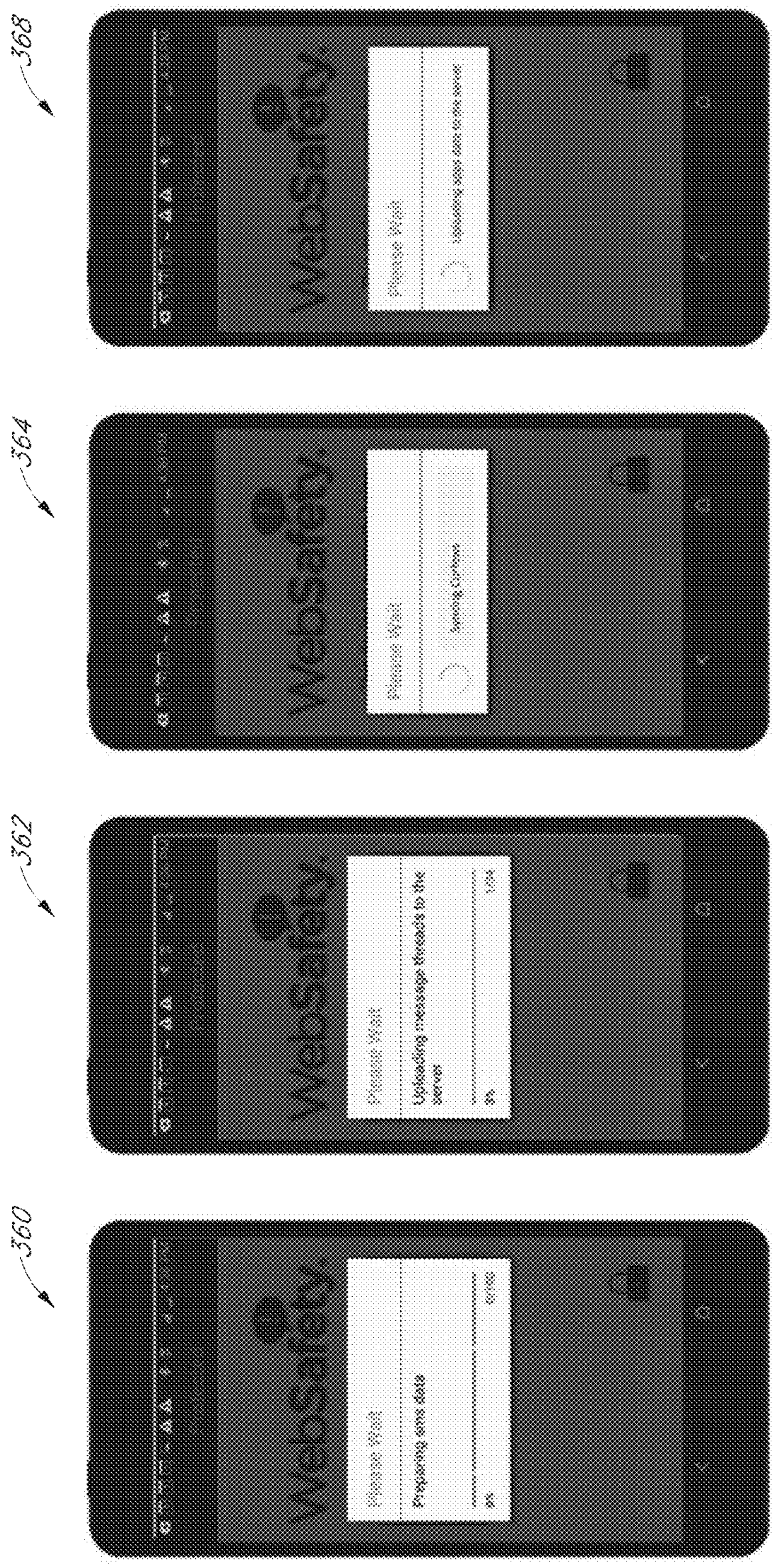
FIG. 3E shows four views of a mobile application setup process.

FIG. 3E shows four views of a mobile application setup process. For example, setting up a child device (after choosing the option of "my child," see view 346) can include the technical process steps illustrated here. These views can result after pressing an OK button as seen in the curfew disable message screen 358 and generally after the sequence shown in the views of FIG. 3D. A preparing SMS data view 360 can indicate that the software is accessing, cataloguing, and/or otherwise preparing SMS data to be reported and formatted for a parent portal, for example. An uploading messages view 362 can indicated that the prepared data is being transferred to a server over the network 102. A syncing curfews view 364 can indicated that the software is adjusting control functionality on the device shown here, and an uploading apps data view 368 can indicate that the software is reviewing installed applications and transferring that information to a server accessible over a network 102. An analysis step (see analysis module 112, for example) can then be performed by the server on any data uploaded to the server.

Figure 3F:
FIG. 3F shows two views of a mobile application protected status.

FIG. 3F shows two views of a mobile application protected status. The currently protected view 370 can result after the process shown and described in FIG. 3E. As a result of that process, the "activate" button 351 is not present in this view. The access settings dialogue 374 can appear when a lock control button 372 is selected, allowing a user to enter a password and change the settings, functionality, or role of the device (restarting a process described above, for example).

Figure 3G:
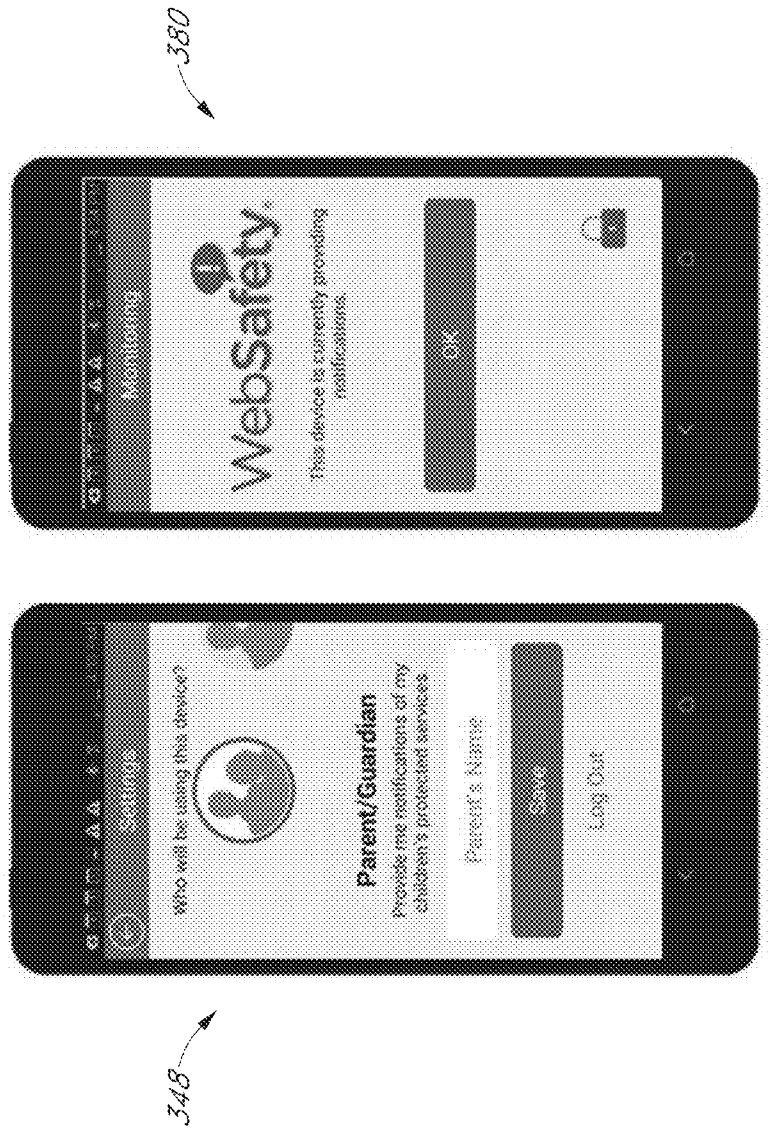
FIG. 3G shows two views that include a mobile application monitoring status.

FIG. 3G shows two views that include a mobile application monitoring status. The parent/guardian view 348, shown again here, can be selected and can result in the monitoring/notifications view 380. This can indicate that the device shown—which can be an example of a controller user system 130—is configured for use by a parent, because it is "currently providing notifications."

E. Time Restrictions/Curfew Blocking

Figure 4:
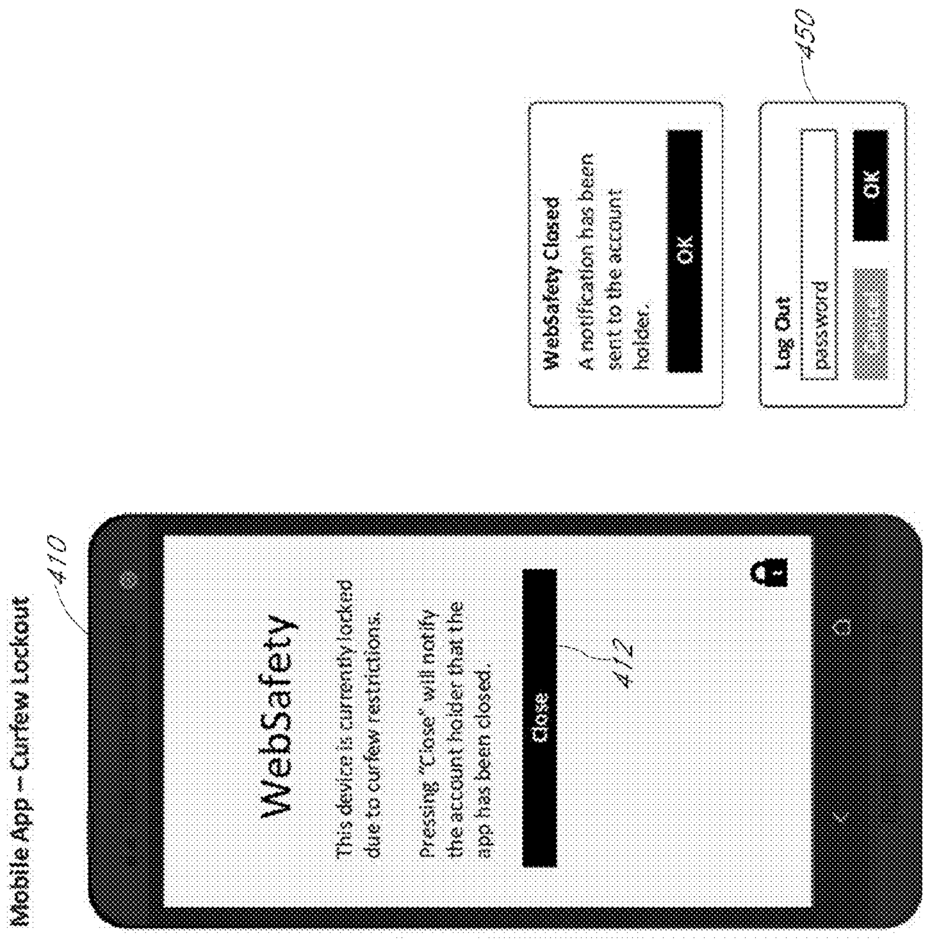
FIG. 4 shows a view of a curfew lockout screen.
Figure 36:
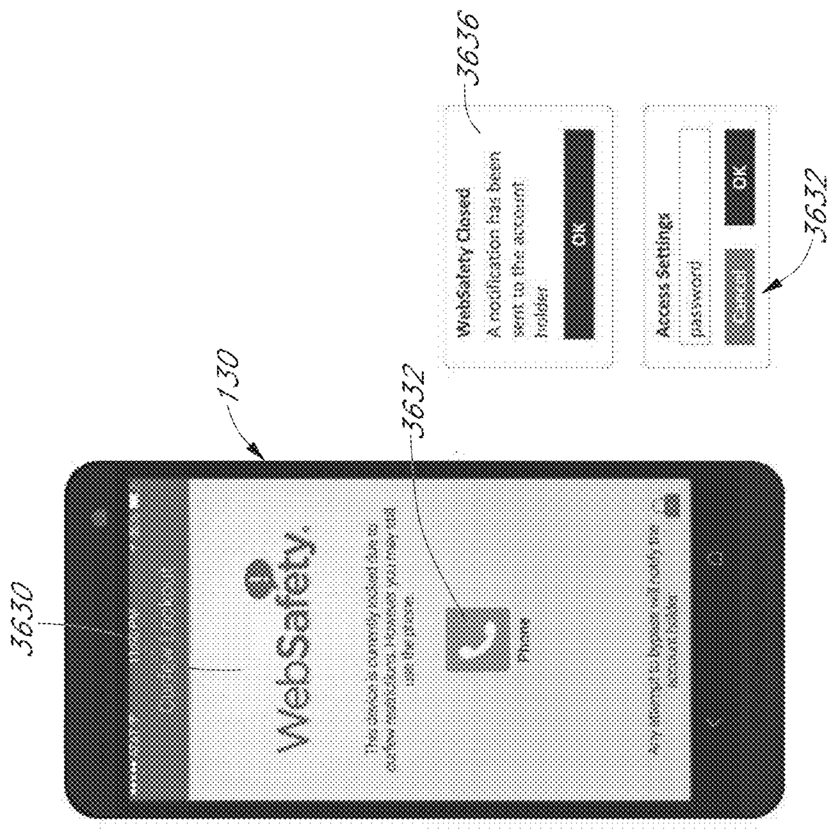
FIG. 36 illustrates an example user interface generated by a safety system indicating that the user system is in curfew mode.

In some instances, the safety system 110 can enable parents to institute electronic curfew or grounding rules. Parents may want to ensure that their children cannot access certain features of the user system 130 during a particular time of the day. Parents may not want their children to text after 9 PM or they may not want children to access any applications on a phone after 10 PM on a school night. In some embodiments, the safety system 110 can allow selective applications based on curfew settings. The selected applications can be customized by parents. For example, parents can allow certain educations apps during curfew time period. In some embodiments, curfews may depend on the location of the user systems 130. For example, schools may require all phones belonging to students to implement a curfew restriction on school property. The safety system 110 can identify that the user system 130 is within the property bounds of a school and automatically activate classroom curfew restrictions. Accordingly, the safety system 110 can customize the user system 110 based on locations and/or curfew settings. The safety system 110 can accordingly block access to applications and certain features of the user system 130 based on the curfew or grounding settings. Parents may enter these settings via one of the user interfaces described below. While the examples in this disclosure relate to children, these features may also be used by employers to control aspect of employee's phone usage during work time. Employers may want to disable access to web browsing or social networking links from user systems 130 during work hours. The safety system 110 can block these applications during a set time period or set locations. Employees may be able to access these application when they are away from work site. Similar functionality is also useful in a school setting. For example, an authorized and responsible school administrator may be able to oversee children's activities or limit use of smart phones. FIG. 4 illustrates views of an example safety system plugin that may be installed as a software application on a mobile device or smartphone (which can be a user system 130, for example). When the plugin is installed and running, it can present a curfew lockout view 410 during a designated curfew period. Selecting the "close" button 412 can result in a notification sent to the account holder (which may be a parent). In some embodiments, a close button or similar functionality may not be provided and a curfew lockout can be more strict and difficult to avoid, without having the password or other credential of the account holder. A notification resulting from closure can be announced on the lockout view, or it can happen in the background without including the text as shown. A logout control 450 can allow an account holder to stop the software from running on the mobile device, for example. Another example curfew lockout screen is illustrated in FIG. 36. Lockout can involve inhibiting functionality of the operating system of a device at a root or core level. Lockout can involve blocking user interface functionality. Lockout can involve intercepting input or output at an intermediate level between these two approaches. In some embodiments, curfew restrictions may also be implemented as described herein with respect to Curfew Agent.

Figure 19:
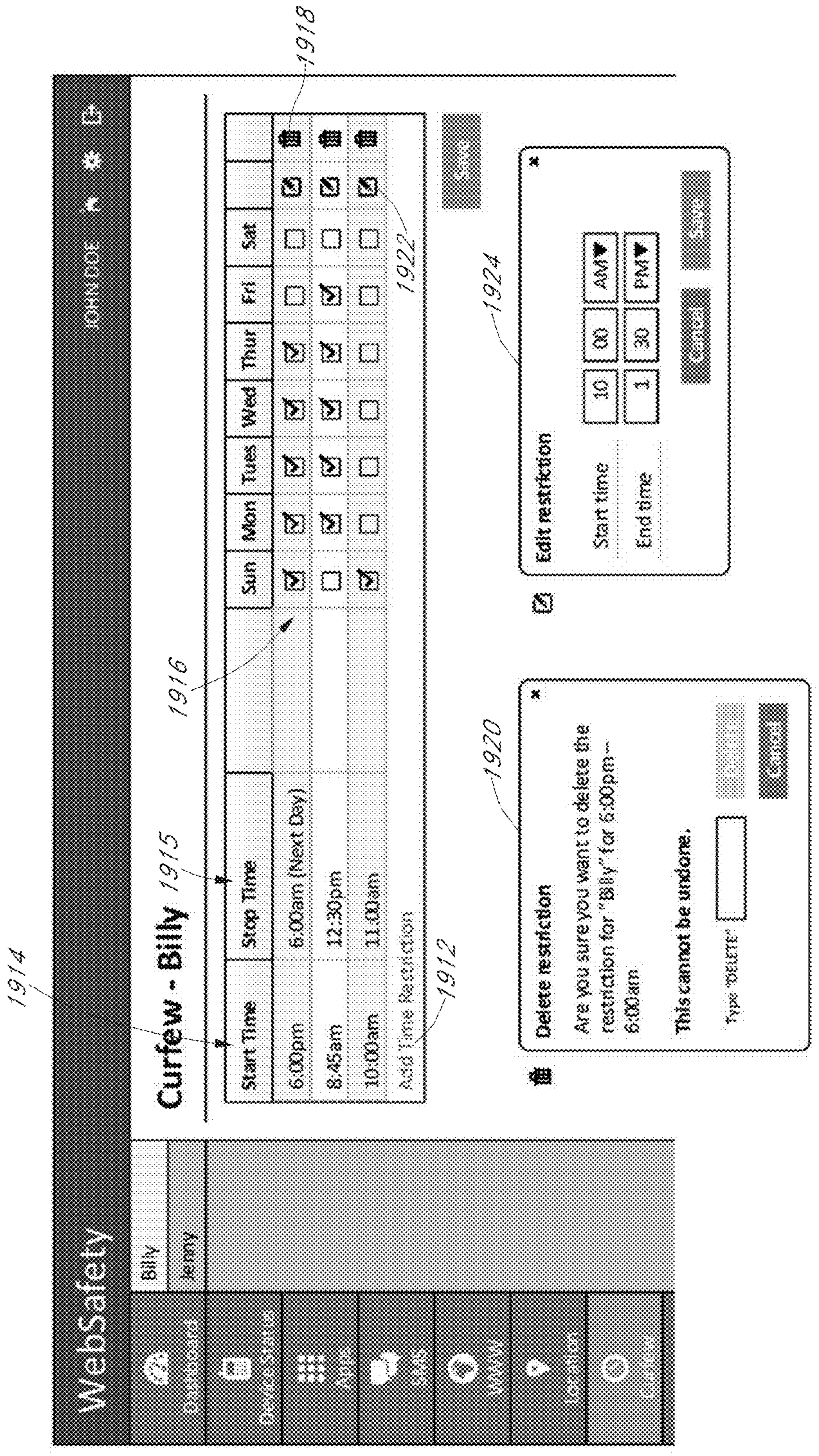
FIG. 19 shows a curfew settings screen.
Figure 50A:
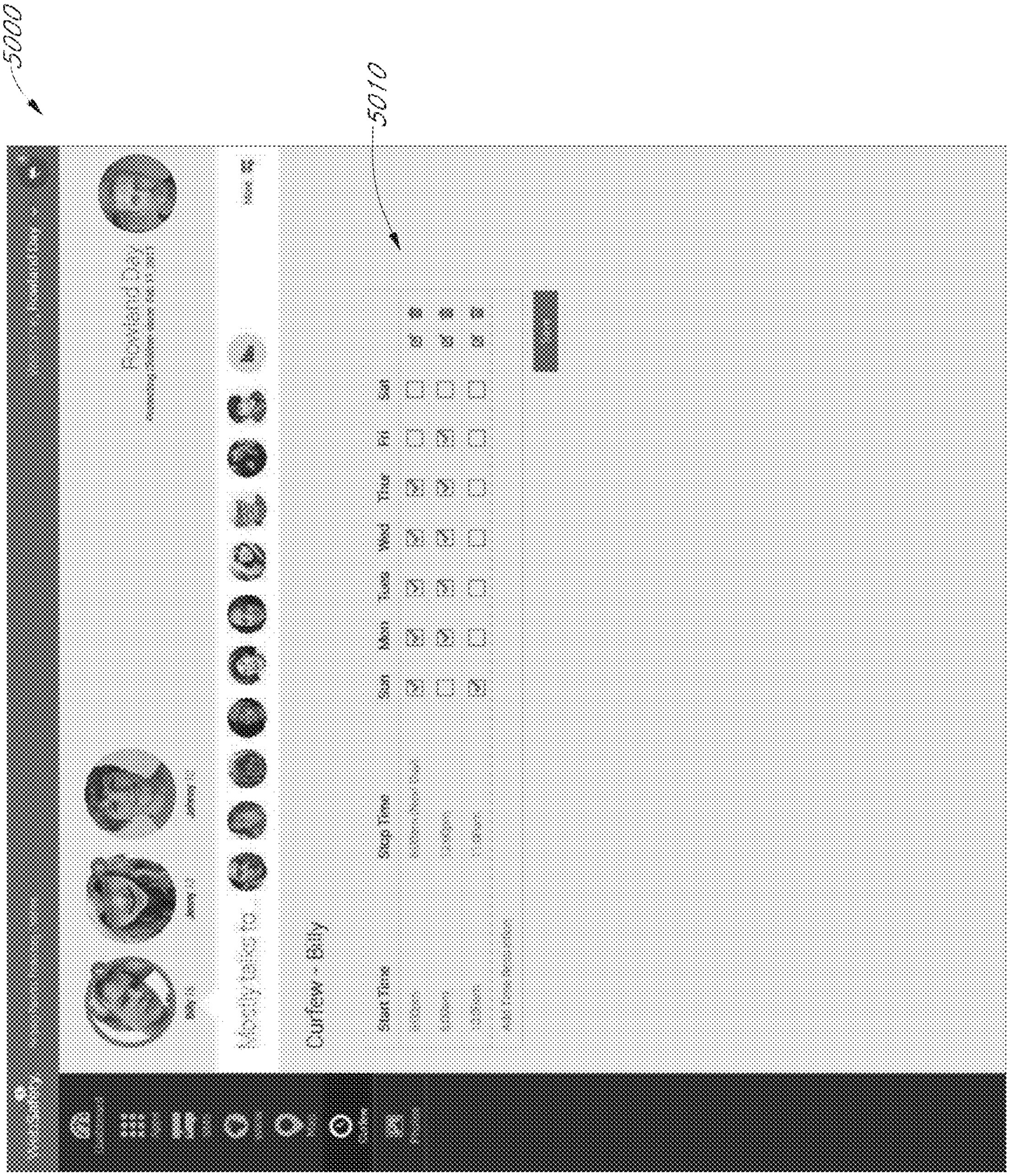
FIG. 50A illustrates an embodiment of a curfew interface.
Figure 50B:
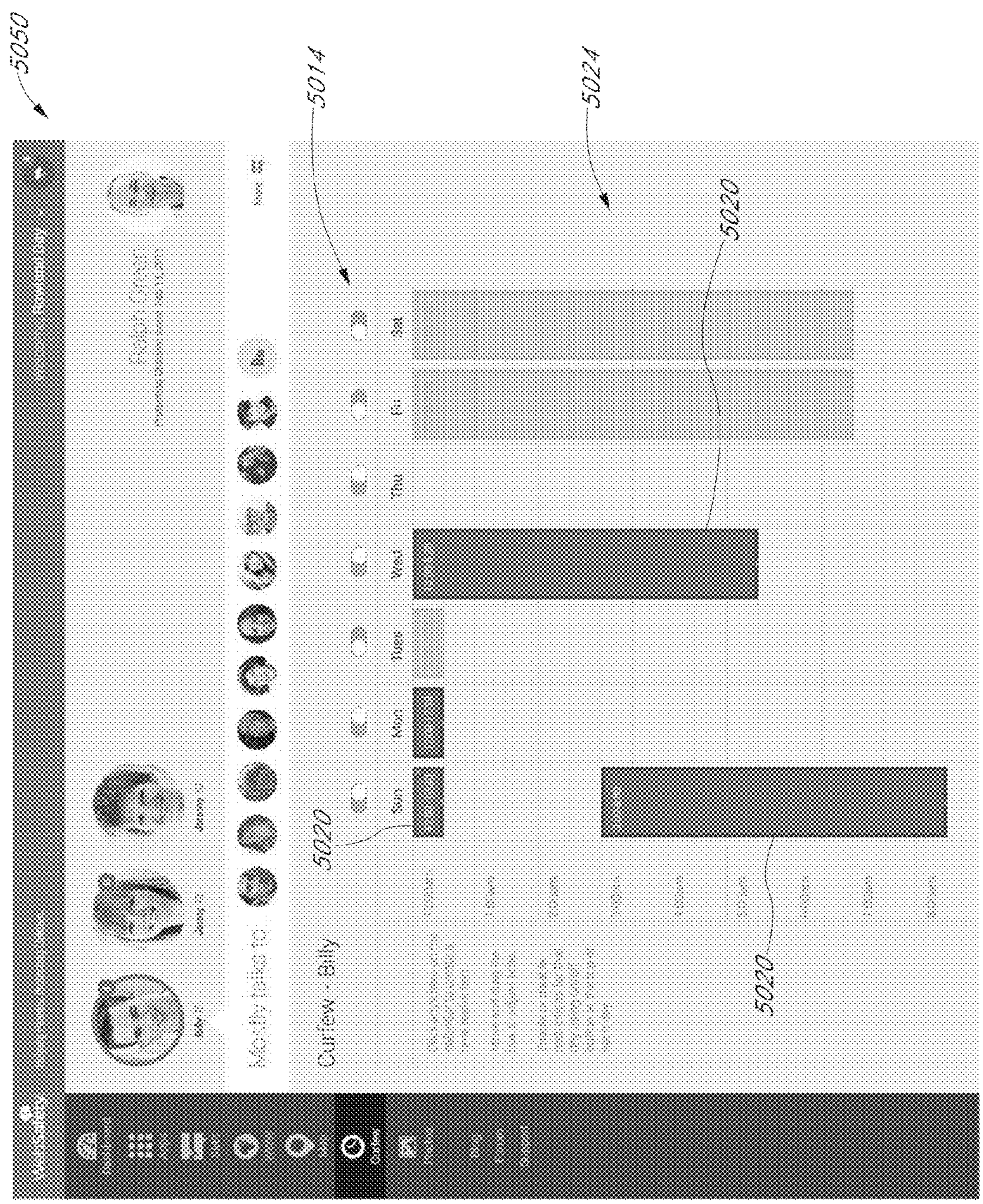
FIG. 50B illustrates another embodiment of a curfew interface.

Useful interfaces that can allow a parent to set curfew settings are included herewith as FIGS. 19, 50A, and 50B. As illustrated in FIG. 50B, the view can include a calendar background and allow visual blocks to be re-sized, dragged, or otherwise manipulated by the finger, cursor, mouse, or other user input approach. The blocks can represent time when usage is allowed, or the blocks can represent time periods when usage is not allowed. The size and placement of the blocks on the calendar, as controlled through a parent interface, for example, can establish periods where smart phone usage of a child is not allowed. The software and system can be configured to actually prevent usage of the smart phone, or it can be configured to report any clandestine usage that is contrary to the curfew restrictions. Curfews can be set as systemic, recurring calendar events, or they can be customized as a consequence of specific child behavior or failure to follow other rules or restrictions. Incentives and punishments can be calibrated to correspond to varying curfew settings. Software installed on a smart phone can be employed to track attempts to circumvent any curfew settings or restrictions. Software installed on the smart phone can continue to report some activities to a parental portal or other interface even when the smart phone itself is locked to prevent a child from using it during a curfew period. The safety system 110 can also determine how long a child is on a particular application during the day and/or week and based on the duration, enable some of the curfew restrictions. Also, as discussed herein, the safety system 110 can disable certain apps during curfew time. Further, as a child leave a particular area, the safety system can block some of the functionalities of the user system 130.

In an example, a safety system 110 can help establish time or curfew restrictions on a user system 130 using the technical protocols described herein. For example, the safety system 110 can selectively choose which applications to enable in curfew mode.

F. Anti-Tampering

The safety system 110 can also track any attempts at tampering or disabling features of the safety system 110. Children or employees may try to remove the safety system 110 from the user system 130. The safety system 110 can attempt to block removal or disabling of its features. For example, the safety system 110 can be designed to send ping messages that may be encrypted over a network to verify that the safety system 110 is still active on the user system 130. Anti-tampering functionality can also be achieved using redundant and/or parallel control techniques. For example, a user system control module 118 may control one or more of the following portions of a user system 130, for example: a central processor, a communication module, a display, a memory, etc. In some embodiments, anti-tampering may also be implemented as described herein with respect to Apps Agent and/or Device Status Agent.

V. Analytics

The safety system 110 can integrate or use other third party systems for analytics. For example, the safety system 110 can integrate Google Analytics to monitor usage of the mobile applications and website on a user system 130. The safety system 110 can store the usage stats and send a report via the account management module 120.

VI. Image Analysis

The safety system 110 can intercept data being transferred to and/or from the camera on the phone. During video chatting (FaceTime, Skype, etc.), the system can perform image recognition and block any indecent content in real time or with a small or large time delay. The safety system 110 can also prevent storage of certain types of pictures or drawings in the memory of the device. For example, the system can prevent the phone from storing any naked, violent, suggestive, inappropriate, or pornographic pictures taken via the phone's camera or received via external communications (for example text or data messaging applications like SnapChat, WhatsApp, etc.).

Objectionable content can be identified using an algorithm that looks for certain colors (flesh tones, etc.). Objectionable content can also be identified algorithmically by searching for or recognizing anatomical features in proportion or relation to others. For example, facial recognition technology can be employed to identify a human face in a given image. If a face is present, the image can then be reviewed to determine the orientation of a human body associated with that face by following common colors (for example, flesh tones) that may represent a neck. Orientation can also be determined by relative positions of features in the face; a body will generally be positioned in the same general direction from the eyes that a mouth and chin are positioned, for example. This analysis can allow the algorithm to scan the area where a related human body is generally expected to be found, thus avoiding wasting computational and processing resources. A scan can review images to identify erotic, suggestive, or otherwise inappropriate imagery by searching for contours, colors, lines, and/or shading that may be typically associated with images of breasts, genetalia, gluteal regions, typical clothing that may be associated with only partial or otherwise suggestive coverage thereof, hands forming gang or other crude or inappropriate gestures, etc. Images to be blocked, filtered, flagged, or analyzed can also be identified by metadata associated therewith, for example data indicating provenance from a known pornographic website, an "xxx" indication, a title relating to sex acts, a name of a known pornographic actor or actress, a word associated with erotic industries, etc.

In an example, a safety system 110 can perform image analysis to assist with child safety and well-being on a user system 130 using the technical protocols described herein.

VII. Place Alerts, Restrictions/Geofencing

Parents may want to track the location of their children or demarcate a physical area on a map where their children should be or not be for a particular time. As an example, parents may drop off their child at a location such as a friend's house, a mall, or a movie theater. While dropping off a child, parents may select that location and choose a radius outside which a child should not stray. Parents may select the location via the administration module of the safety system 110. Selection may include checking the current location on a map. Accordingly, parents can create a geofence using the safety system 110. When the child leaves the area designated by the parent, the safety system 110 can send an alert to the parents. The safety system 110 can also block certain features of the child's user system inside (for example, disable Facebook inside of school geofence) or outside (for example, texting outside of school during school time) of the selected geofenced area. Thus, parents may use the safety system 110 to monitor the location of the child with the child's user system 130.

Parents can pre-designate location and/or time of where their children should be during the day. For example, parents can set their children's school location. The phone safety system can then track the location of the child and send an alert to the parent when the child makes it to the designated location. An alert can also be sent when the child is moving outside of the designated radius. Thus, if a child leaves the school zone during school time, an alert may be sent to the parents. A history of phone location can also be tracked and recorded for later reference and pattern recognition. In some embodiments, location monitoring may also be implemented as described herein with respect to Location Agent.

VIII. Speed Tracking

Tracking a moving phone can enable measurement of its speed. The safety system 110 can track location using the GPS module and accordingly calculate an average speed of the user system 130 based on measured locations at certain time intervals. Other methods can also be used to measure the speed of a moving phone, such as, accelerometer or triangulation. The safety system 110 can then inhibit some of the functionalities of the phone, for example, based on the detected speed. For example, if the phone is moving beyond a threshold speed, the phone safety system can block incoming text messages, e-mails, multi-media messages, phone calls, etc. The safety system can also alert parents if their children are driving over the speed limit by automatically identifying the speed limit (for example, based on the location of the user system 130 over time, based on GPS or local cell-tower triangulation, based on independent accelerometer techniques, etc.). Such systems can incorporate and expand on the technical information and teachings in U.S. Pat. No. 8,380,176; its entire disclosure is incorporated by reference herein for all that it contains and is made part of this specification.

Speed tracking may also be used to prevent, deter, or help deal more effectively with abduction. The safety system 110 can use various inputs, including video, audio, and speed to identify a possible abduction scenarios and send alerts to parents and authorities. As an example, the safety system 110 can use variety of parameters to weight and determine an abduction score. Parameters can include screaming or crying sounds, asking for help, unusual geographic location (not in the usual area the person is supposed to be), speed of the user system, or no phone usage for a certain period of time.

IX. Parent Portal/User Interface Module

As described above, parents can select parameters using the account management module 120 and/or the user interface module 116 of the safety system 110. In some embodiment, parents can directly select the settings from the child's phone. In some embodiments, parents can make the changes remotely (to the child's phone) via one or more user interfaces discussed in more detail below.

A parent community portal (e.g., accessible through the user interface module 116 or otherwise through a network 102) can increase the effectiveness of the safety system 110 by enabling parents to share information with the community. For example, parents can rate (positive/negative) software applications ("apps"), websites, etc. and those ratings can be shared with other parents or users. The safety system 110 can look up the ratings and automatically decide whether to allow a child to access a particular application, or it can report the community rating (along with voting percentages, detailed feedback, comments, etc.) to the parent for a final decision. Parent portal user interfaces can show blocked messages and pictures to the parents and receive their input, which can be used to adapt the system in blocking/reporting future messages and pictures. The account management module 120 can learn parenting style and automatically implement changes based on parent's selection of what is and is not appropriate, or a parent can actively select a level of protection or define their own style using controls provided through a user interface module 116 or an account management module 120, for example. Such controls can include drop-down menus listing available profiles, available blocking databases, available community standards resources, etc. The portal can also use collected data from some or all parents or other users and perform statistical analysis to increase effectiveness of the application. Using appropriate permissions and safeguards (for example, removal of specific personal identifiers), some implementations can allow parents to see other parents' phone preferences for their children as a way to learning options and acceptable community standards in certain cultures and communities. In some embodiments, the safety system 110 can enable parent to search community information from their user systems 130. For example, the safety system 110 can provide a search functionality to look-up apps of concerns and/or safety ratings.

X. Automated Learning Alerts

As described above, the phone safety system can send alerts to the parents, employers, users, etc. Parents can decide if an alert is a false positive and the system can adapt based on parents' ratings. For example, some parents might be fine with their child using the word 'stupid', while other parents may not. Accordingly, technical solutions include allowing a user to blacklist or whitelist their own terminology using a visual interface, dropdown menu, color scheme, machine learning, etc. The safety system 110 can store multiple categories of offensive words. Categories may include firearms, sexual innuendos, etc. The safety system 110 can also use context to prevent false positives by analyzing surrounding words and mood. For example, pattern may be recognized showing that a parent tending to be more strict regarding some words is also more likely to be more strict with regard to other words. User community data can be analyzed in order to save a parent time in designating all objectionable words and instead implementing a predicted level of tolerance based on an initial set of responses to an interactive survey or other settings. Also, in some cases there might be language/cultural misunderstanding. As described above, the safety system 110 can learn parents' responses to the alerts.

Integration with existing public systems and institutions can be beneficial and more easily achieved when an automated system such as those described herein are deployed. For example, suspicious text and messages indicating cyberbulling may automatically be sent to a police or a school server for further investigation. A parent can be automatically queried prior to such notifications to authorities, or notified simultaneously.

XI. Example Benefits

Systems and methods described herein can accomplish automatically what even tech-savvy parents can't. Thus, no matter how attentive, a highly technical parent likely does not have time to scan logs or user transmissions (both content and timing) coming to and from their child's device(s). Children may be sending more than 100 text messages a day and in addition may be posting on different platforms and network. Moreover, writing a script to perform such tasks may be beyond the skills of even tech savvy parents, especially when dangerous applications are constantly being created and distributed. Children maybe likely to delete messages before parents are able to review them. The safety system 110 can include one or more modules described above that can retrieve and analyze messages (including texts and data messages) before a child has an opportunity to delete the messages from their computing devices. For example, in some embodiments, the safety system 110 can retrieve messages from memory of the phone in real time or in substantial real time with respect to messages sent and/or received. Thus, even if a child is using applications like SnapChat, the safety system 110 can retrieve sent and or received messages before they are deleted from the phone. In some embodiments, a system can periodically or continuously record screenshots or screen-capture video during the time that a problem website or application is being used on a user system 130. This recording function can be used as an alternative or additional measure if the website or application is not blocked or removed, for example. This function can also be used to gather evidence against a cyber-bully or other perpetrator who attempts to destroy evidence or mask harmful activities using electronic means.

In an example, a safety system 110 can perform image capture and frequent logging of screenshots to assist with child safety and well-being on a user system 130 using the technical protocols described herein.

Thus, the systems described herein can protect the lives and well-being of children. Monitoring of devices (for example, Android, iOS, or other devices that are examples of user systems 130) can be accomplished remotely by parents using tablets, laptops or home computers (which can provide a parent access to the safety system 110). The systems described herein pay attention to children's behavior on their smartphones, and tablets so users can be a parent, even in their world—that is, even when fast-evolving modern technology and social systems are being used by children on a constantly evolving basis. These systems can provide simple, real-time notifications that brings vulgar, derogatory and suspicious online behavior to a user's attention so parents have the opportunity to react when it matters. These systems can provide alerts to potential cyberbullying—which can be purely electronic, or a precursor or adjunct to physical bullying. These systems give parents the opportunity to open a sensitive and timely dialogue with children child about the challenges they may be facing. The systems described herein can do what caring parents can't, due to technological impediments and time constraints. Thus, the described systems empower users with awareness by monitoring children's smartphone and tablet activity including internet, social media, and texting, so parents can teach and assist their children, for example.

XII. Example Overview

An example system can protect one or more devices (e.g., a user system 130) using a monitor dashboard (e.g., a user interface module 116 and/or an account management module 120) and notifications. Systems and methods such as those presented herein can allow parents (or any users, but generalized users can be referred to as "parents" herein) to protect multiple devices (e.g., user systems 130) such as tablets and phones. Parents can customize the alerts and other information they wish to receive about their child's social communications and behavior. Thus, a single responsible user can have a device or web interface that tracks information sent by or received by one or more other devices (e.g., user systems 130) that are used by those over whom the responsible user has parental or other authority for safety and well-being.

To accomplish these goals of safety and well-being, a responsible user can have access to a "monitor dashboard," which is an example of a user interface module 116 and/or an account management module as illustrated with respect to the safety system 110 of FIG. 1. This can be a web portal, accessible from any computer over the world-wide web (see the network 102 of FIG. 1); it can be an application accessible on a parent's own mobile device. The dashboard (which can be made available via the user interface module 116 of FIG. 1, for example) can be a window that allows parents to see what is going on in their children's lives in real time, and recognize potentially harmful communications (and/or other activities, location, viewing and usage habits, etc.) before it is too late. Examples of how such a dashboard can be arranged and visually presented are provided herein.

Organization of information in a dashboard view can be highly effective in making a monitoring application effective. A dashboard can allow at least some portion of various data resources to be visible at the same time, but allow a single interactive view from which more details can be accessed for any of those data resources. The portion viewable in the dashboard view can provide decision-making information that helps a user assess whether the additional details should be accessed. For example, a dashboard can include information about how many "alerts" have occurred since the last time details were viewed. Additional disclosure on these and related topics are provided herein with respect to many of the figures. It can be helpful to organize notifications and content according to which child's device is the source of a notification.

It can also be helpful to organize notifications according to perceived priority or threat level. Default presumed threat levels can be established in the system. In some cases, a parent/user may establish their own hierarchy of priorities for notifications. Higher threats or more urgent priorities can be listed or displayed more prominently, and/or they can lead to more drastic notifications. For example, a threat of physical harm may cause a monitor dashboard to proactively send a text or other message to a parent's phone, using the audio aspect of a ringing phone to alert a parent to imminent danger for a child. To take another example, receipt of a crude or otherwise inappropriate image, or receipt of anything at all from a designated threat source, can give rise to visual, tactile, haptic, audio, or other feedback, either through or facilitated by a monitor dashboard. Notifications can be provided as real-time alerts, giving parents the opportunity to become aware of cyberbullying and inappropriate behavior, in a timely manner.

A monitor dashboard (e.g., a user interface module 116) can depend on information fed to it from sources that continuously or periodically monitor and access content on a child's device. This can be accomplished through software that is installed on a child's device (e.g., a safety system plugin 132) or otherwise has access to—for example, through a cellular network or data-provider's servers—information coming to and leaving from a child's device. That software (or a server accessible therefrom via a network 102) can automatically translate these communications and parse or otherwise analyze them to identify what portions of these communications involve actual content sent to or from a child. Such parsing can increase efficiency when transmitted data volume is high by ignoring some aspects of headers or other technical trappings and focusing instead on substantive content (for example, the actual text of an SMS, the actual images attached to an e-mail or delivered through a snap-chat type platform, etc.) Monitoring software can be periodically updated to support monitoring of applications deemed to be new threat sources. Thus, periodic updating and interaction with a remote server can be very helpful to improve effectiveness of such monitoring software.

XIII. Example System Features

Beneficial features of a system can include one or more of the following features: (1) a dashboard such as that discussed above. This can be a real-time dashboard that parents can use to stay informed on the mobile phone and tablet usage habits of their children. "Real time" can indicate that updates or notifications can occur on a time scale that is relatively rapid with respect to some other underlying time scale, it can refer to virtually instantaneous updates, or it can refer to updates that occur within seconds or minutes. (2) Ability to monitor applications, or "apps." Thus, a parent can be notified of installed apps on a child's phone or tablet. To assist users who may not be familiar with the latest applications, detailed descriptions can be provided of the leading applications on a child's phone and why a parent should or should not be concerned. (3) Ability to monitor text messages, for example those provided through a short message service ("SMS"). Thus, a parent may have the ability to view all the SMS messages sent and received by their child's device, with the ability to receive notifications when words of concern are used. Parents can also be notified when flagged contacts (that is, contacts of a child that have previously been identified as a potential problem or threat source) send something to the child (for example, an SMS message). (4) Ability to monitor browsing or other usage of the world-wide web ("WWW," or "web"). Parents can receive alerts when flagged URLs such as porn and other inappropriate websites are accessed from a child's device. (5) Ability to monitor social media. A parent may be able to view photos uploaded to a child's Social Media accounts in one convenient location, and receive alerts when content (for example, words, music, or images) of concern are used on social networks. (6) Location Tracking. Parents can view current and past locations of their child's device, and create areas (geo-fences) where the child cannot use their phone (i.e. school) or the parent will be notified. Geo-fencing features can provide exceptions for emergencies. Such exceptions can be accomplished through a permission system involving a parent's remote decision through a dashboard, for example. Another example is an ability to telephone a parent notwithstanding a geo-fence blocking all other calls from a particular location. (7) Curfew. Parents can establish time restrictions on when the child can use their mobile devices. For example, if the child tries to use the device during restricted times, the parent can be notified immediately. Exceptions for emergencies can also be implemented here. (8) Notifications. All notifications or alerts can be set to real time, hourly, daily, or weekly summary reports. Notifications can be accompanied by icons or particular colors indicating a level of priority or urgency. They can also include icons indicating that the source of a notification is a software program such as those with one or more functions described herein.

XIV. Example User Interfaces

FIGS. 5-23 show example views of hardware running software that can accomplish the goals discussed herein. These views and the included text and graphical placement indicate functionality and features of a web safety system.

Figure 5:
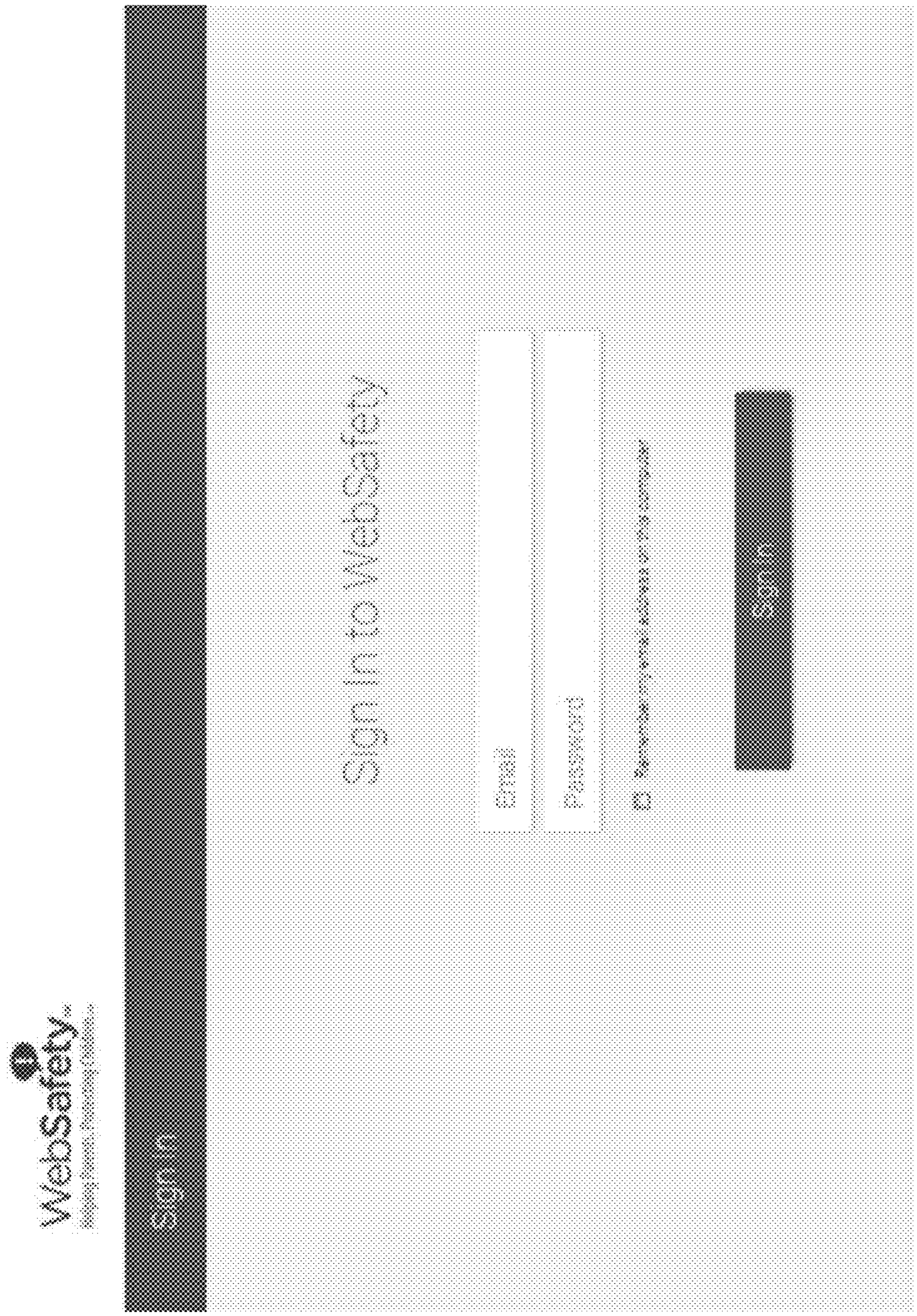
FIG. 5 shows a view of a website that can include a login screen for a system user to access his or her account.

FIG. 5 shows a view of a website that can include a login screen for a system user to access his or her account.

Figure 6A:
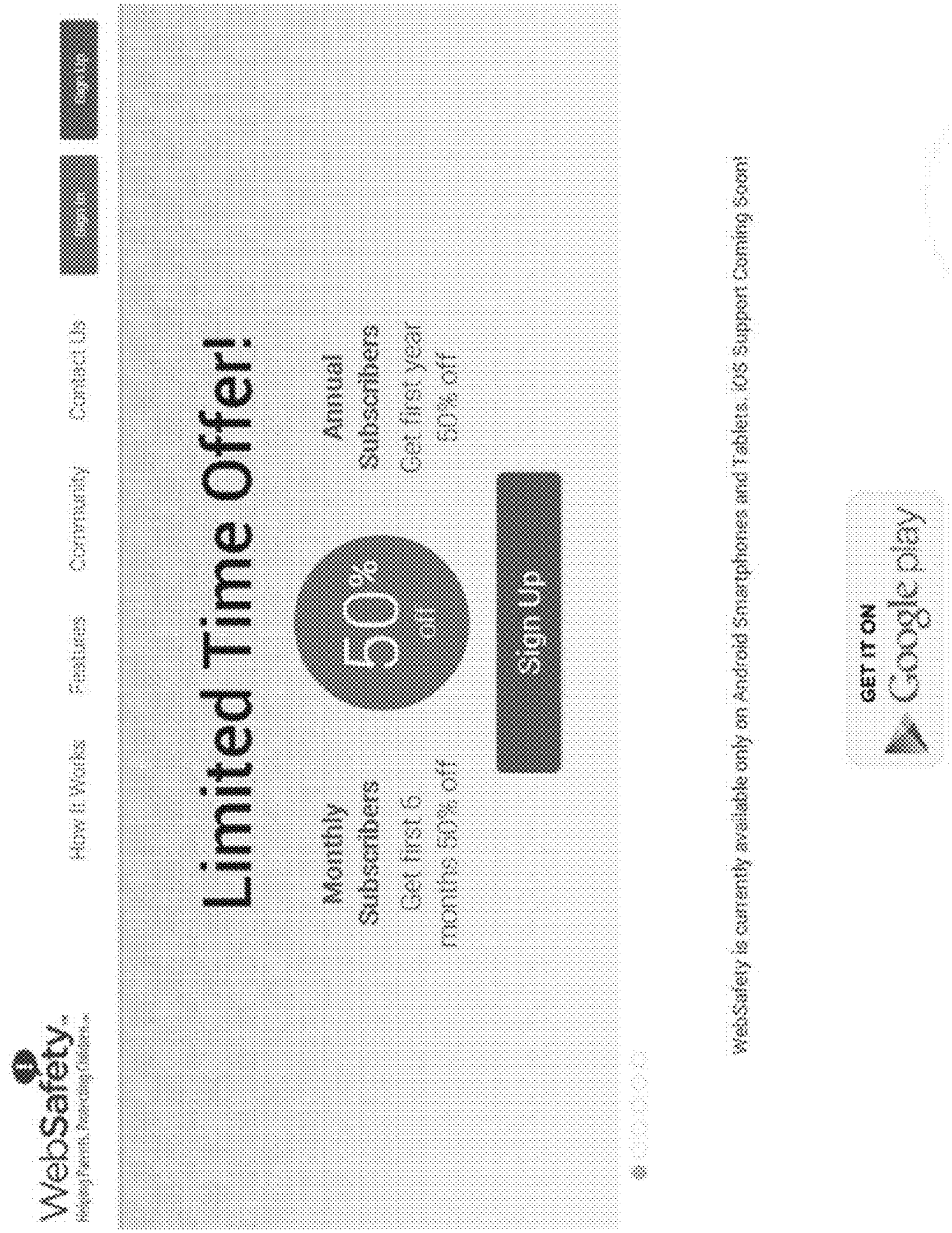
FIGS. 6A and 6B show a view of a web page that can provide subscription and pricing information.
Figure 6B:
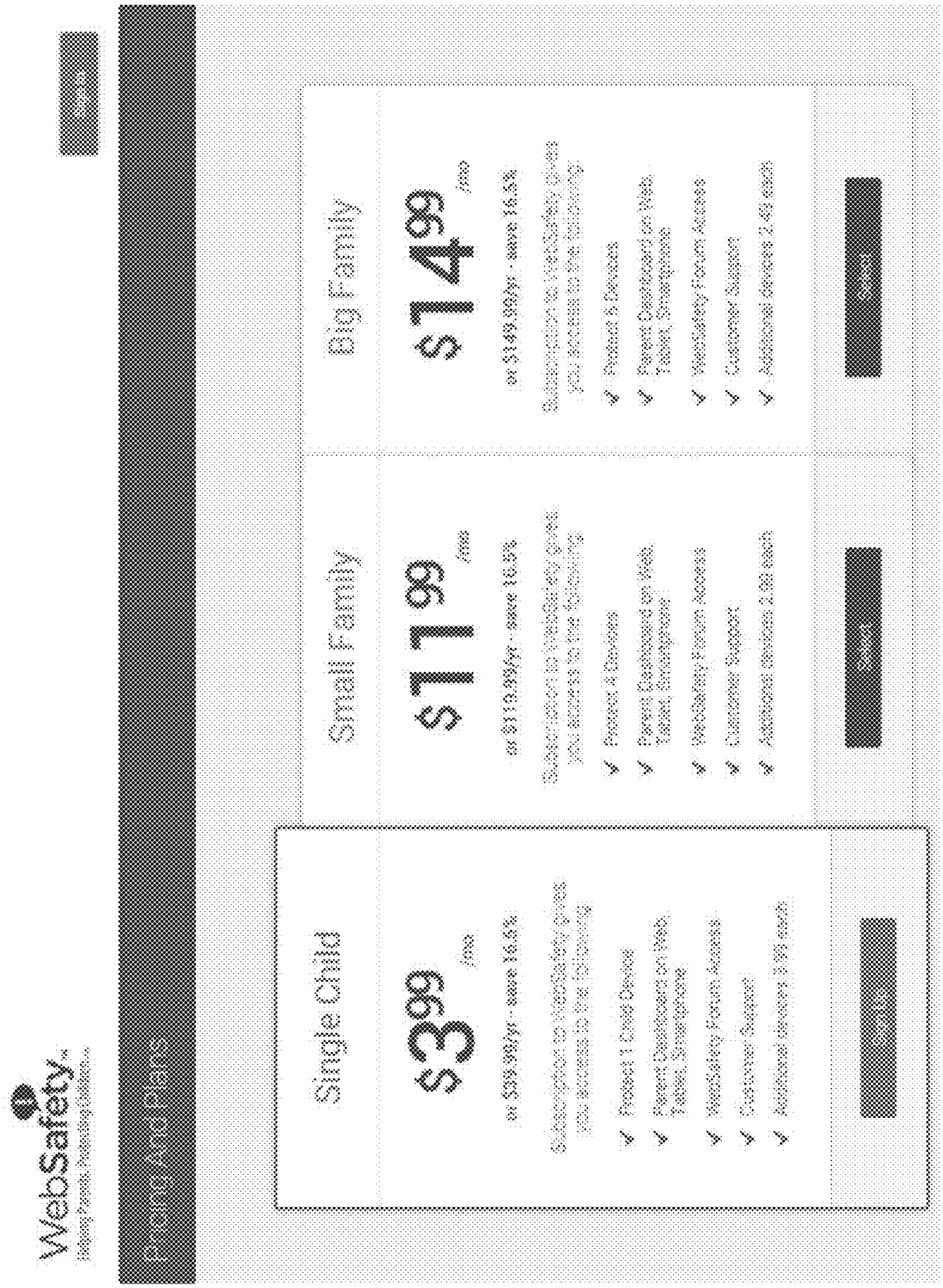

FIGS. 6A and 6B show a view of a web page that can provide subscription and pricing information.

Figure 7:
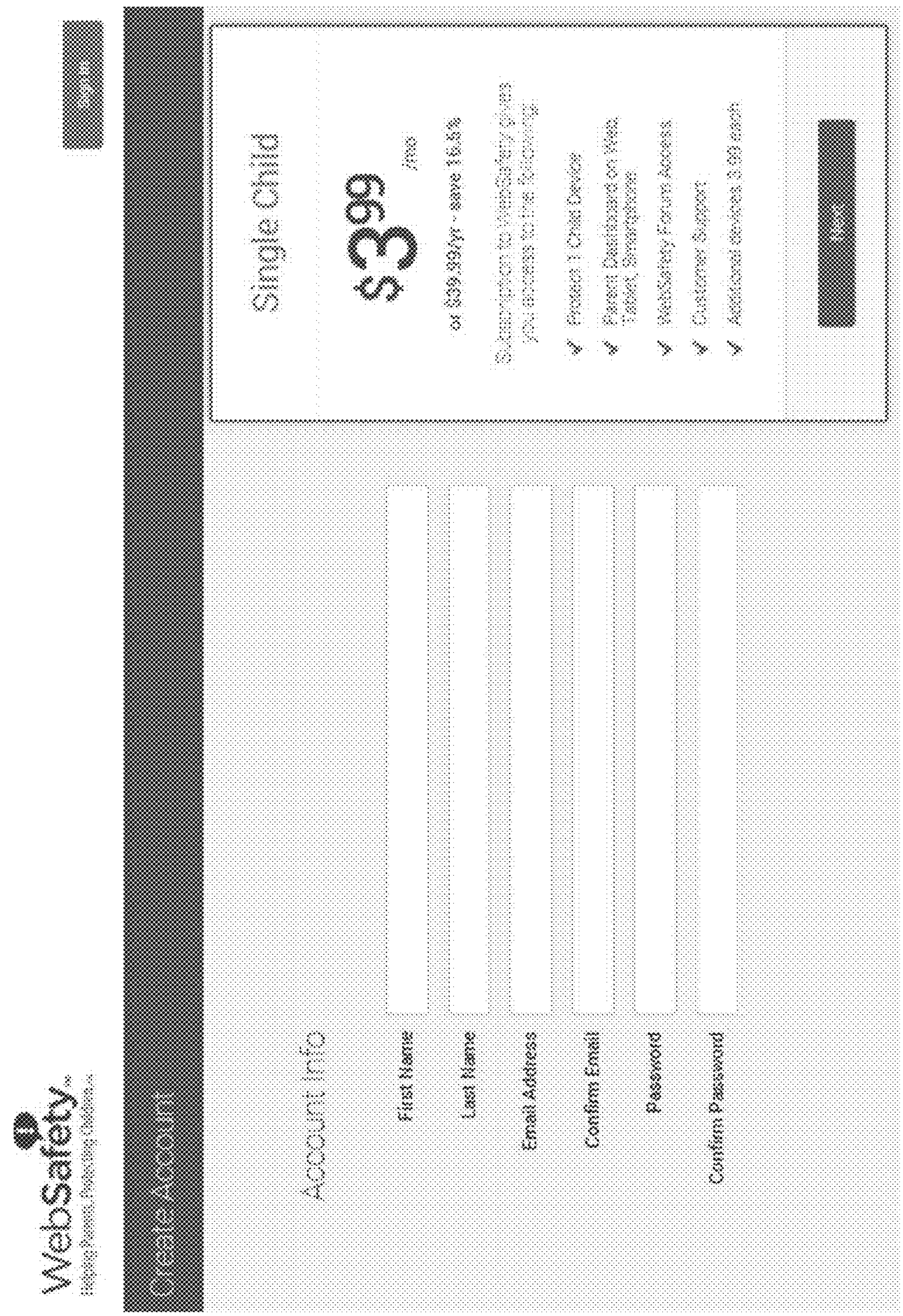
FIG. 7 shows a view of a webpage that can assist a user in creating an account and providing name, e-mail, and password information.

FIG. 7 shows a view of a webpage that can assist a user in creating an account and providing name, e-mail, and password information.

Figure 8:
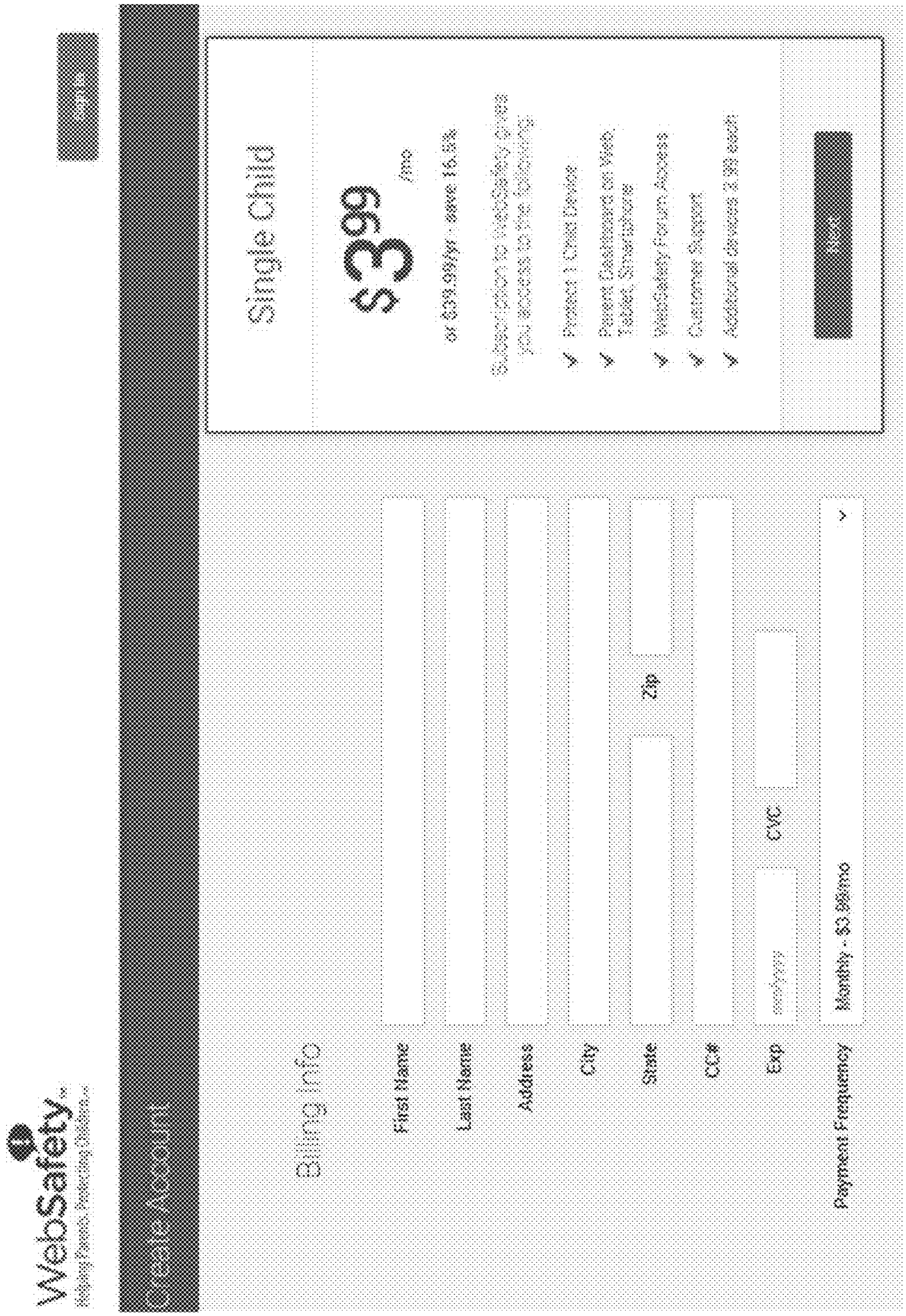
FIG. 8 shows a view of a webpage that can assist a user in creating an account and providing billing information.

FIG. 8 shows a view of a webpage that can assist a user in creating an account and providing billing information.

Figure 9:
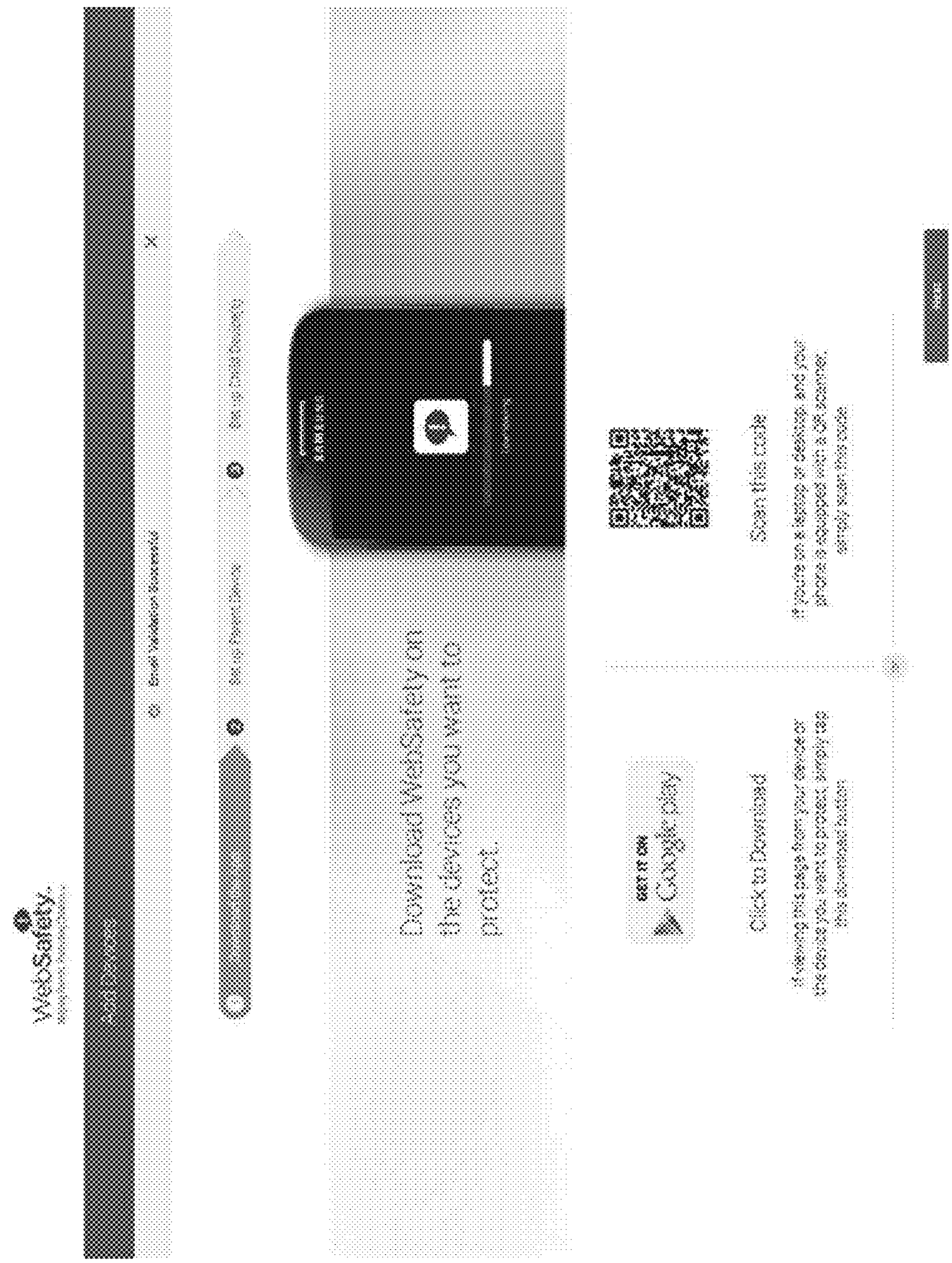
FIG. 9 shows a view of a webpage that can assist a user in preparing to use a safety system by downloading and installing the components.
Figure 31:
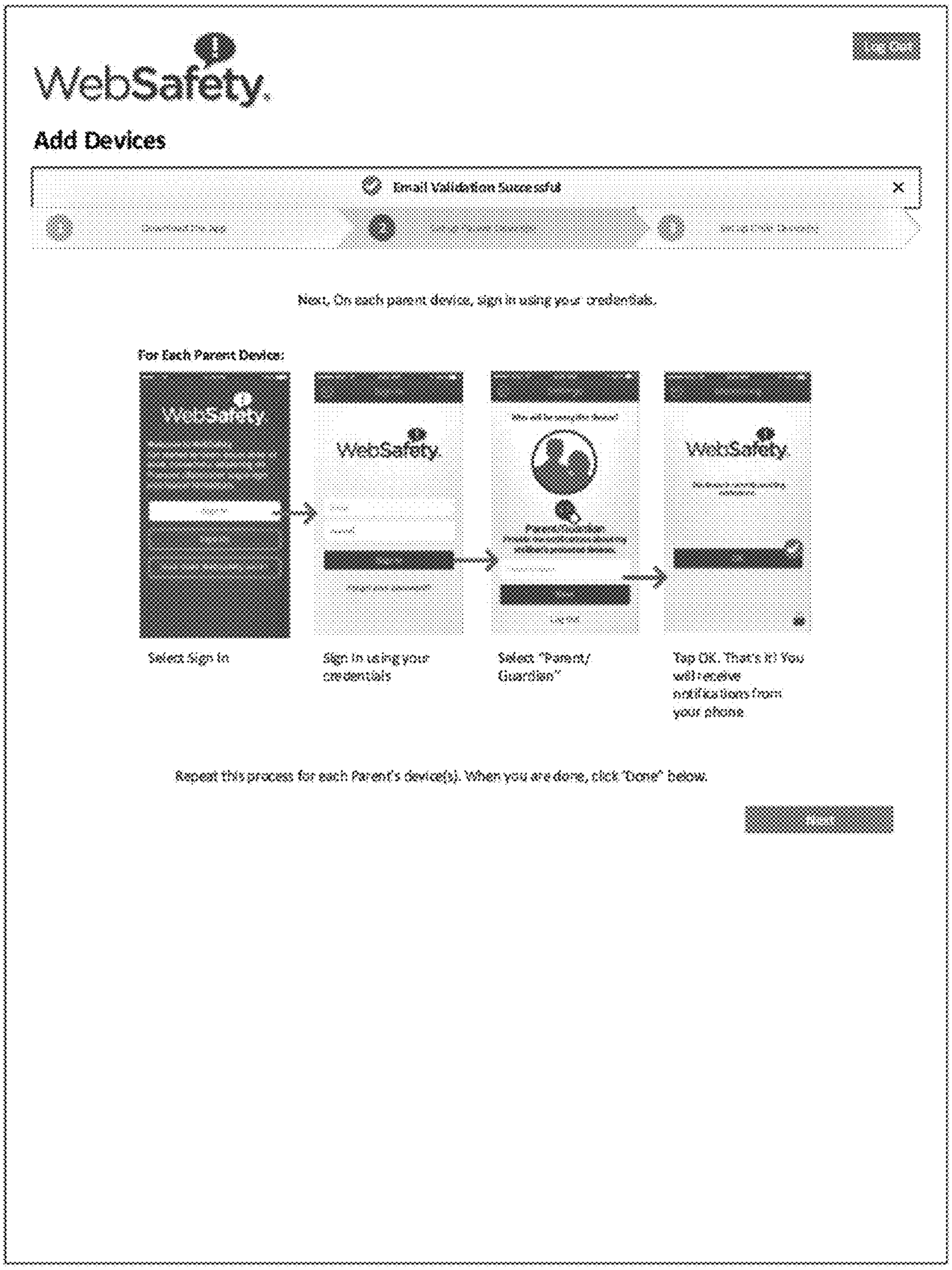
FIGS. 31 and 32 illustrate example embodiments of a process for enabling systems described herein on one or more user systems
Figure 32:
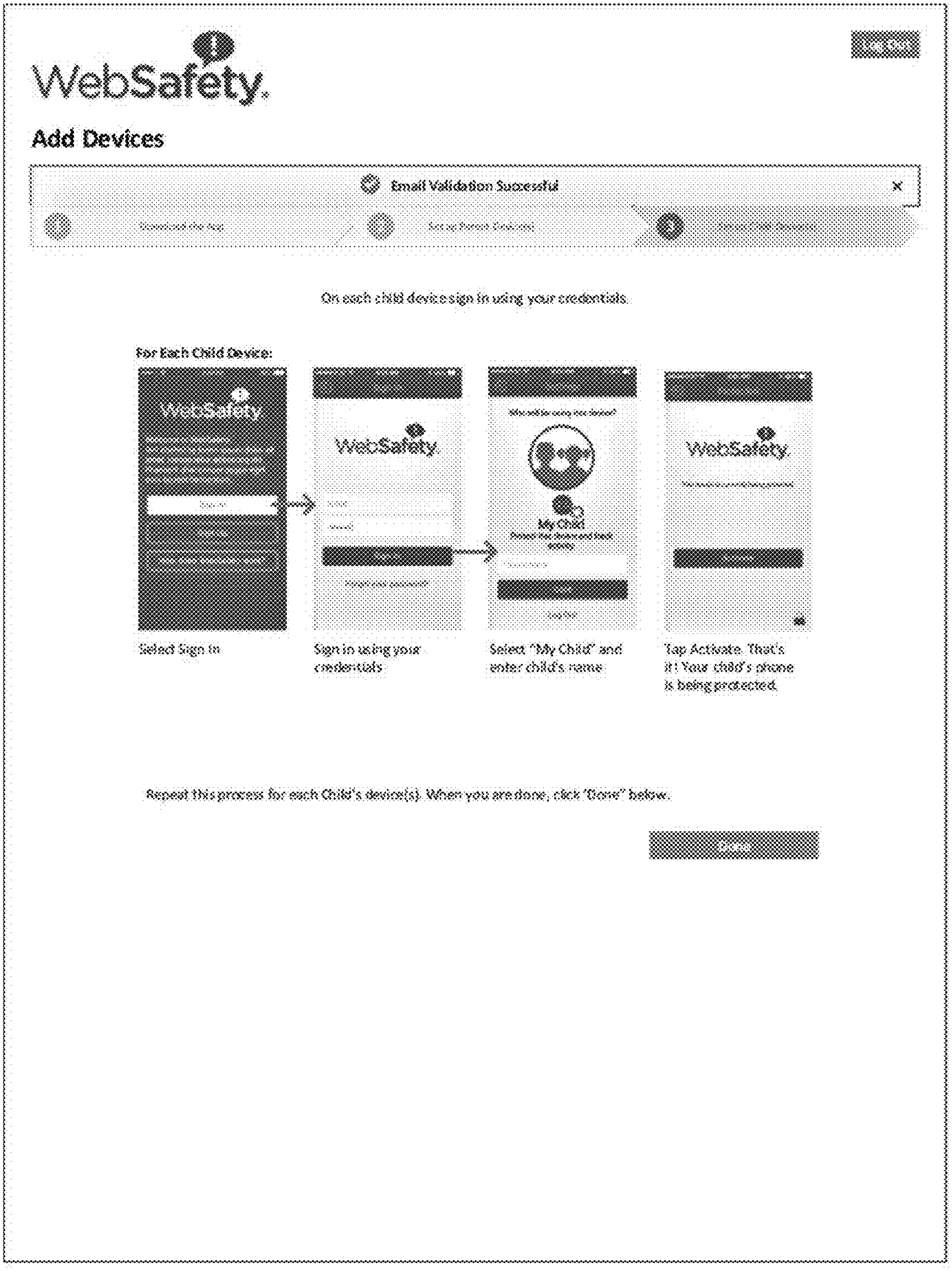

FIG. 9 shows a view of a webpage that can assist a user in preparing to use a safety system by downloading and installing the components. As noted in FIG. 9, three steps for initiating use of a safety system 110 can include downloading a software application ("the App," or a safety system plugin 132) to a mobile device (e.g., a user device 130), setting up a parent device (to display or access the user interface module 116, to receive notifications from the safety system 110, etc., installing a plugin 132 that may be configured for parental use), and setting up a child device (providing user parameters 140, installing a plugin 132 that may be configured for a use on a child's device, granting that plugin access to various portions of the user system 130, etc.) FIG. 31 shows a screen indicating example steps, processes, and screen shots for setting up a parental device. FIG. 32 shows a screen indicating example steps, processes, and screen shots for setting up a child device.

XV. Websafety Software Example, with Interface Views

In addition to the figures included herewith and described herein, reference is made to U.S. design patent application No. 29/509,071, which provides additional interface views, examples of how information can be viewed, and views of controls allowing users to interact with a computer through a user interface. The entire disclosure of this design application is incorporated by reference herein for all that it contains and is made part of this specification.

FIGS. 10A and 33-53, among others, show various views of a software framework for presenting information and controls to an account holder for a system such as the ones described herein. Many of these views are examples of how a user interface module 116 of FIG. 1 can be implemented. At the left in these figures is a vertical series of tabs with icons that may allow a user to touch, click, or otherwise select them. Each tab causes a different view (or set of views) to be presented to a user, and examples of those views are presented below. Some of these tabs have sub-tabs that may appear, for example, immediately to the right of the left-most series of tabs. The tabs shown here are merely examples, but they include (as noted in FIG. 10A): Dashboard 1010 (which may include Account Info and Notifications sub-tabs, for example), Device Status 1012, Apps 1014, SMS 1016, WWW 1018, Location 1020, and/or Curfew 1022.

Figure 10A:
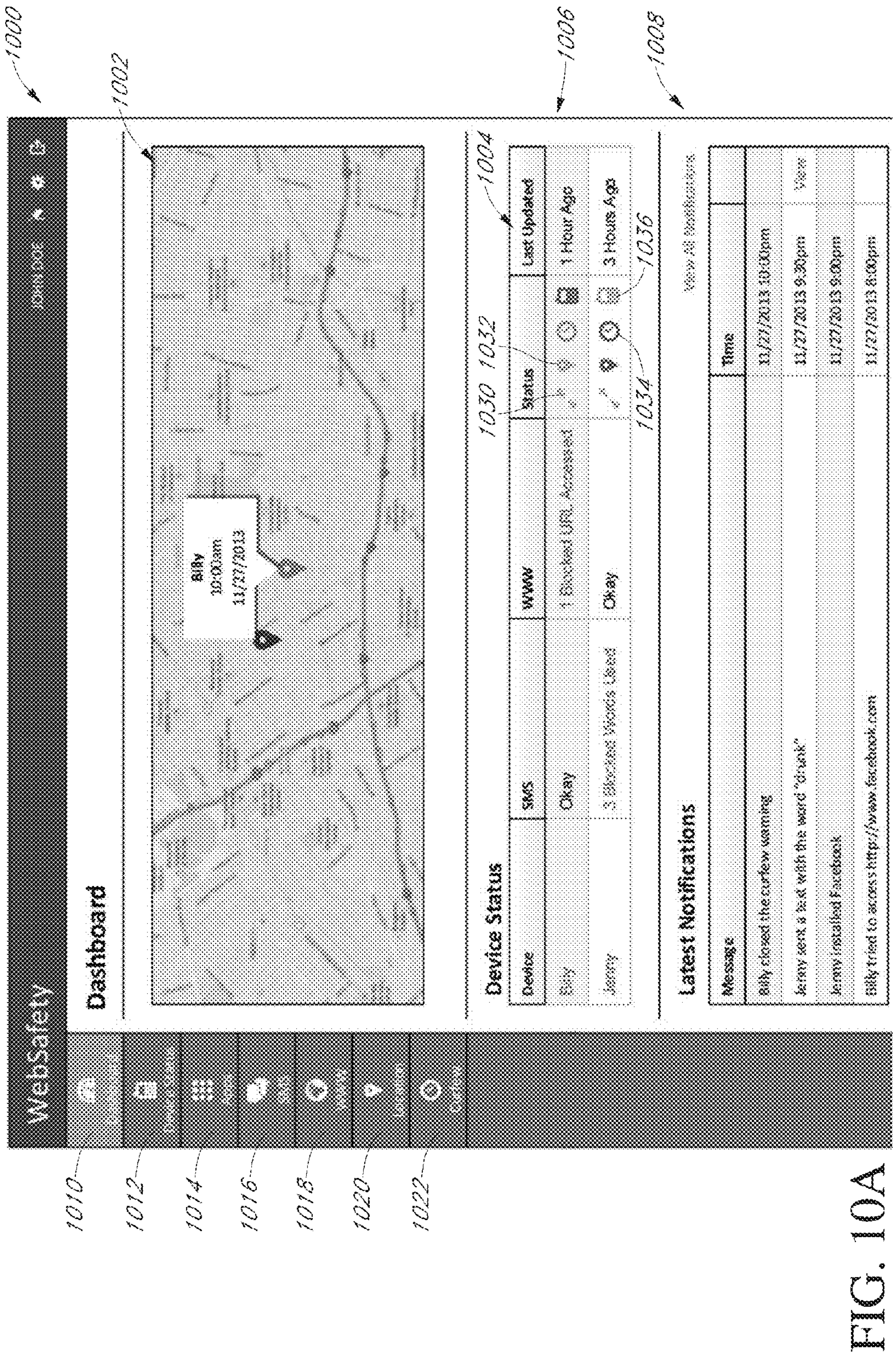
FIG. 10A shows a dashboard view with a map.
Figure 37:
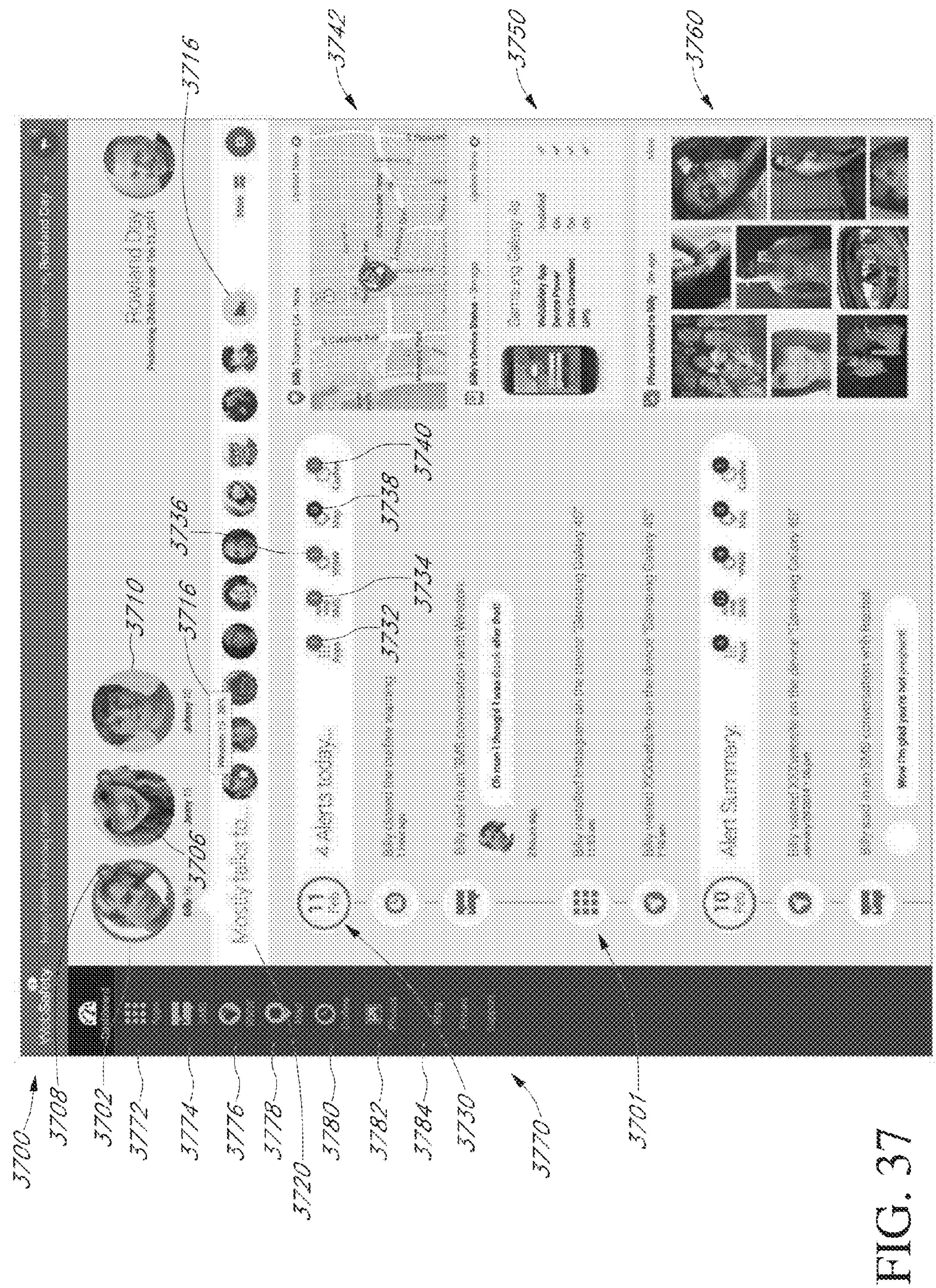
FIG. 37 illustrates an embodiment of a dashboard user interface generated by a safety system.

FIG. 10A shows an embodiment of a dashboard user interface 1000 with a map 1002 indicating the current location of devices subject to the system, the names of the children using the devices, a status section 1006 including an SMS status, a world-wide web status, and the time of a last update 1004. This view also shows a list of the latest notifications 1008. The latest notifications can include messages to a user alerting them to the actions of their children with respect to their user systems 130, for example, and the times at which they occurred. FIG. 10A can indicate a view that is provided by user interface module 116 of FIG. 1. Live hyperlinks can be provided. For example, clicking on the name "Billy" can load a device status screen for Billy. Clicking on "view" in the notification list can load an SMS activity screen with an SMS conversation visible. The dashboard view can be accessed, for example, by an account user on a computer or another mobile device. FIG. 37 provides another software interface view of a dashboard.

Figure 10B:
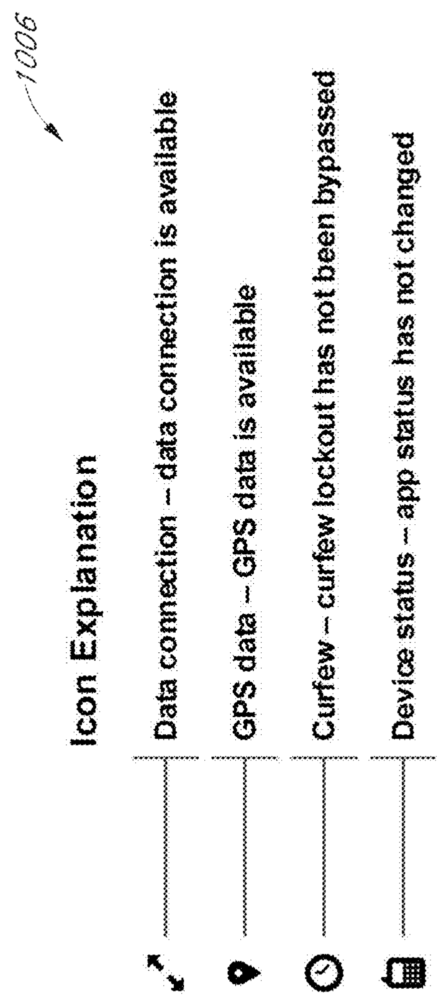
FIG. 10B shows an explanation of some of the icons in FIG. 10A.

FIG. 10B shows an explanation of some of the icons in FIG. 10A. Icons are provided showing data connection 1030 (when the icon is darker or more prominently displayed, a data connection is available, as indicated by the up and down arrows for uploading and downloading), GPS data 1032 (when the icon is darker or more prominently displayed, GPS data is available for the device), curfew 1034 (when the icon is darker or more prominently displayed, it can indicate that a curfew lockout has or has not been bypassed), and device status 1036 (when the icon is darker or more prominently displayed, it can indicate that device status has or has not changed).

Figure 11:
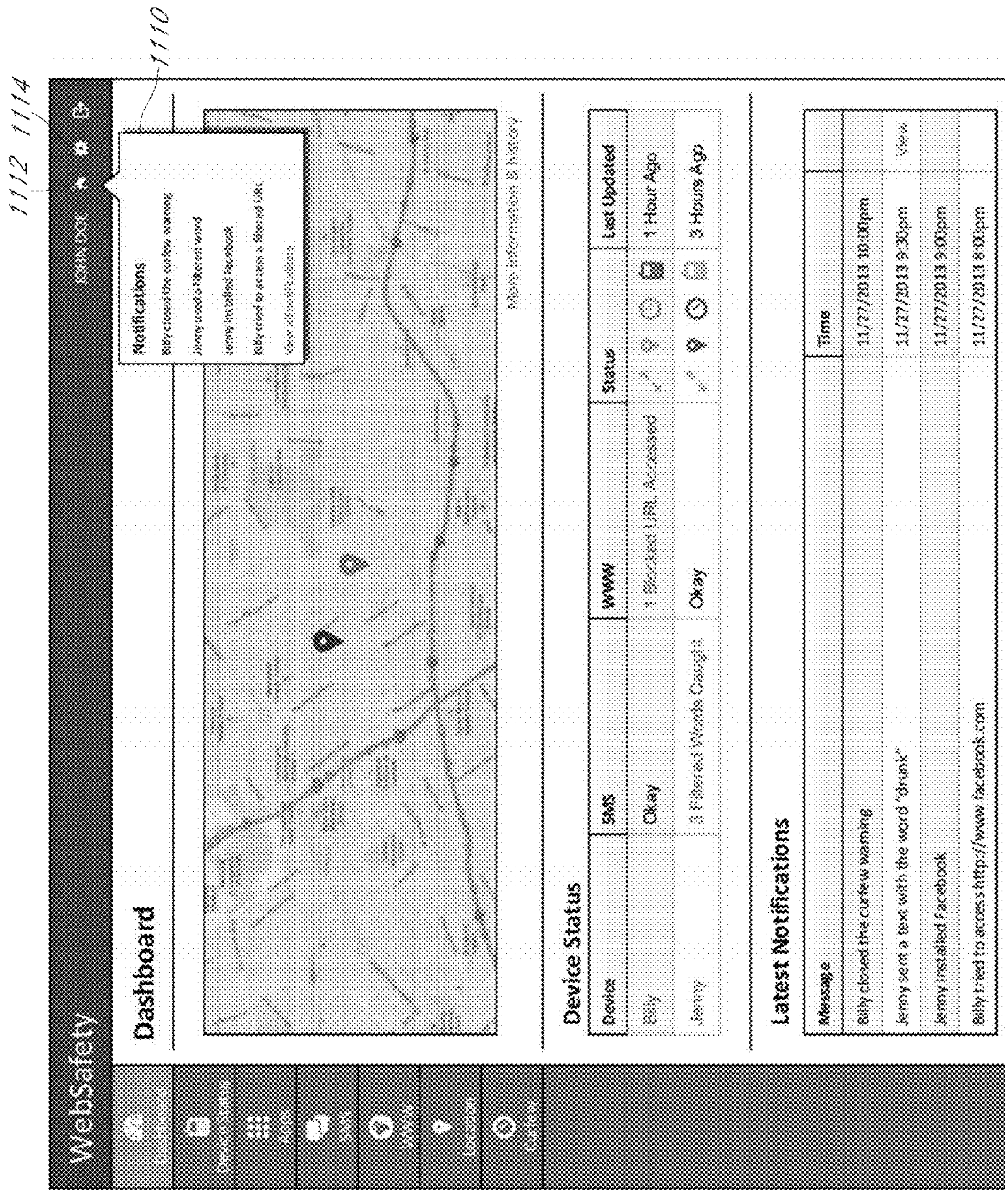
FIG. 11 shows a dashboard view with notifications information.

FIG. 11 shows a dashboard view that emphasizes and explains notification functionality of an example system. In the notification bar at the top right, a notifications call-out window 1110 can be displayed after clicking the notification icon 112. A "view all notifications" hyperlink can be selected to show a "notifications" screen. Other icons in the notification bar at the top include a gear 1114 that can allow a user to access a settings interactive interface.

FIGS. 11-22 and 37-53 (among others) illustrate how the disclosed systems, apparatus, and methods can automatically extract and assemble data from complex, moving electronic devices and assemble that data in organized and graphically efficient views. For example, the dashboard views of FIG. 11 can show locations of two different children on the same map at the same time in the same view. The embodiment of FIG. 11 also aggregates data relating to both of the children and their smart phones—the status of both Billy's phone and Jenny's phone is shown in the same view. The notifications listing also assembles events and messages from both children and integrates them chronologically. Thus, this graphical display allows efficient review by a user of a parent portal. The dashboard assembles data in a highly organized and efficient manner.

Figure 12:
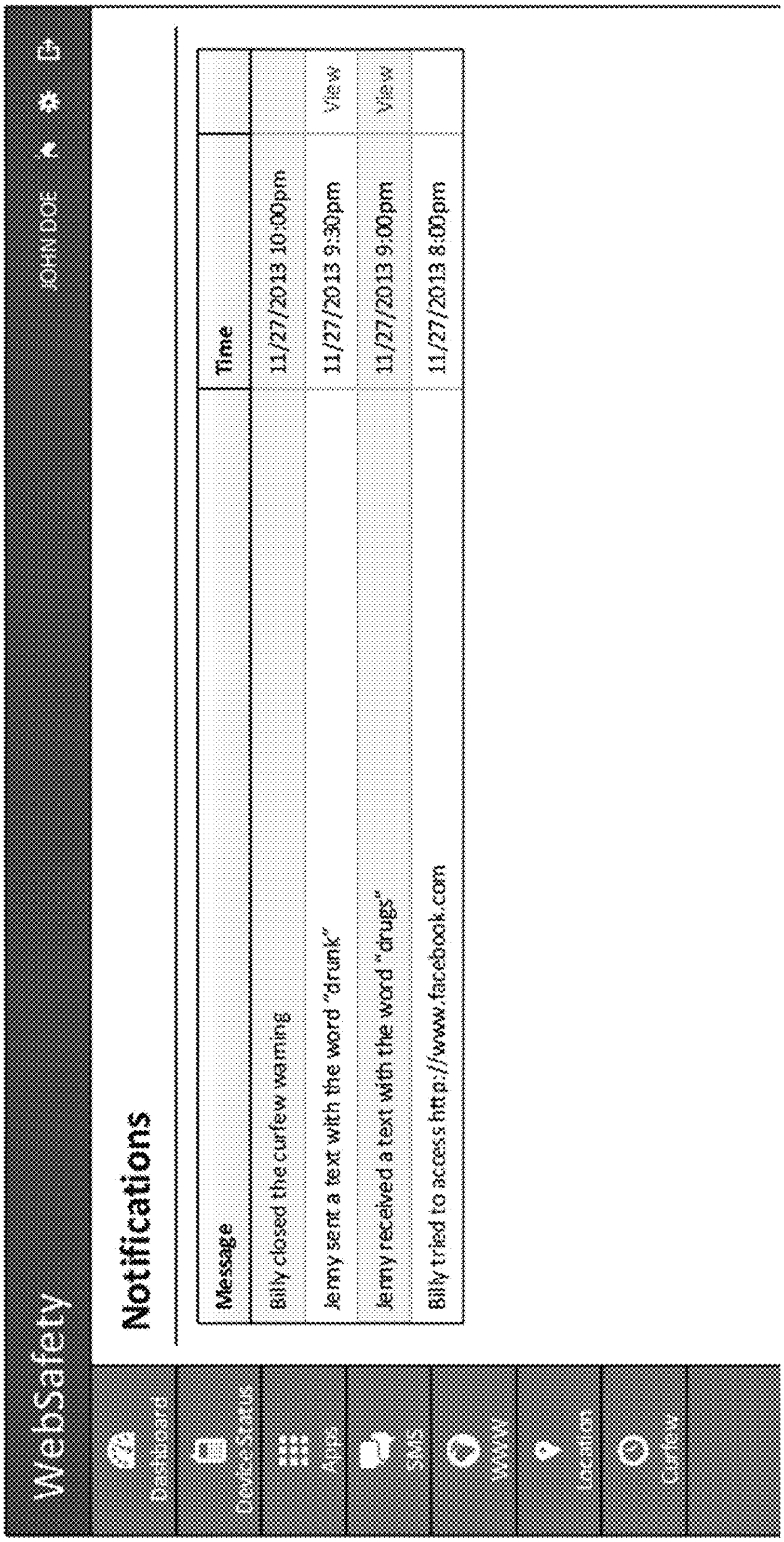
FIG. 12 shows a view of a notifications screen.

FIG. 12 shows a view of an example notifications screen that can provide a continuously scrolling list, where the most recent notifications can be included most prominently (for example, on top of the list or otherwise emphasized). These notifications can be accessed from various other interface views in the system—see, e.g., FIGS. 37, 39, and 41 that show "alerts," which can be notifications—many of which can present a shorter list of only the latest or most relevant notifications, but with the ability to click through to this more extensive list. Another view of a notifications page having similar functionality is provided as FIG. 42.

Figure 13:
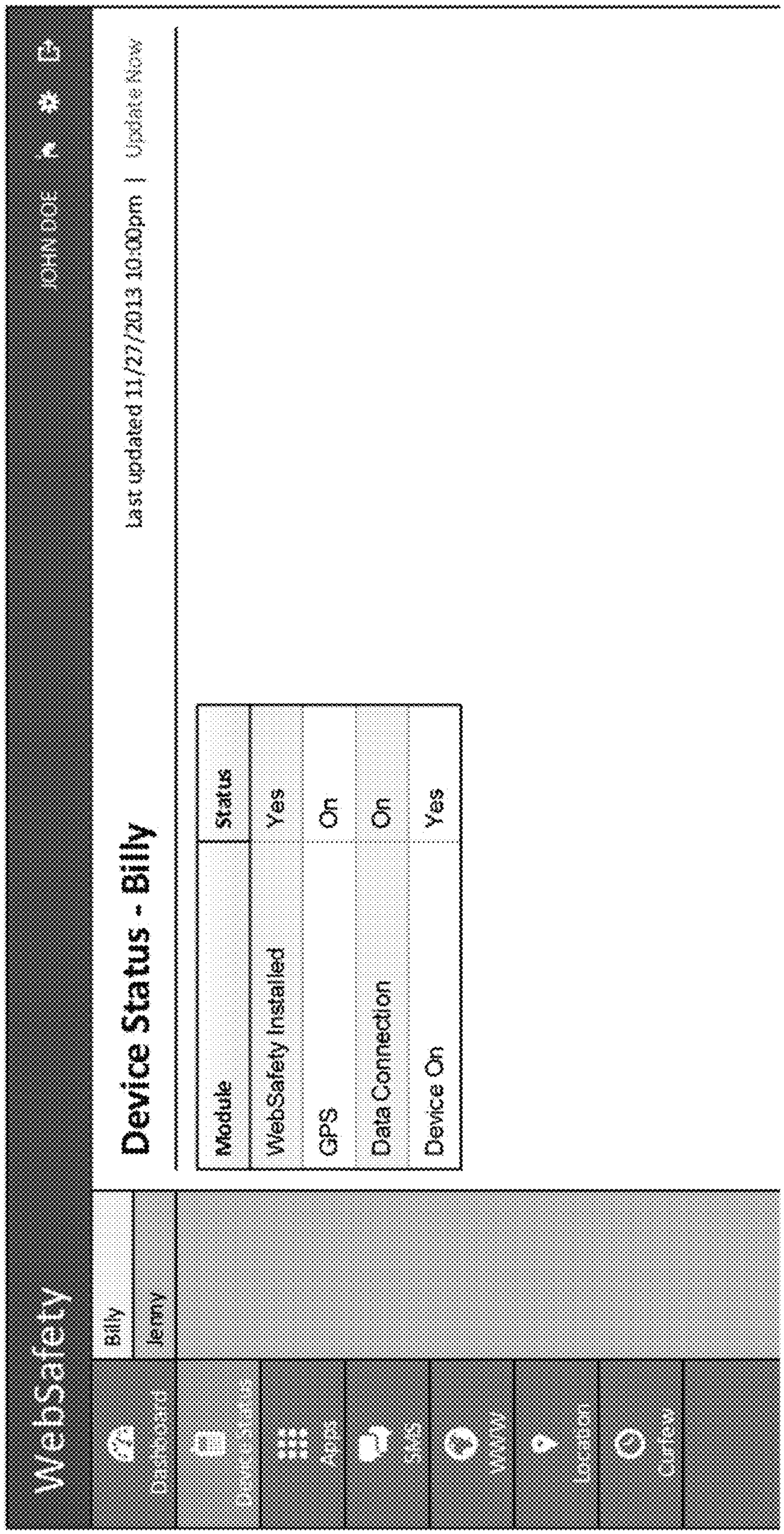
FIG. 13 shows a view of a device status screen.

FIG. 13 shows a view of a device status screen that may present a more detailed or dedicated view that is related to or accessible from the device status portion 1006 of the dashboard described in FIG. 10A. In this example, it is Billy's device status that is displayed, and the table indicates that Billy's device (a user system 130 in the context of FIG. 1) has Web Safety software installed (which can fill the role of a safety system plugin 132 in the context of FIG. 1), the device Global Positioning System (GPS) is on, the data connection (for example, through a cellular phone network) is on, and that the device itself is powered on. Other device status information views are provided as portions of FIGS. 41 and 51.

In an example, a safety system 110 can identify and report on device status (e.g., installation of a safety application or plugin, GPS status, data connection, and/or whether a user system 130 is powered on) using the technical protocols described herein. In one embodiment, the safety system 110 can call on operating system modules such as content providers (for Android OS) to access device status. In some embodiments, device status monitoring may also be implemented as described herein with respect to Device Status Agent.

Figure 14:
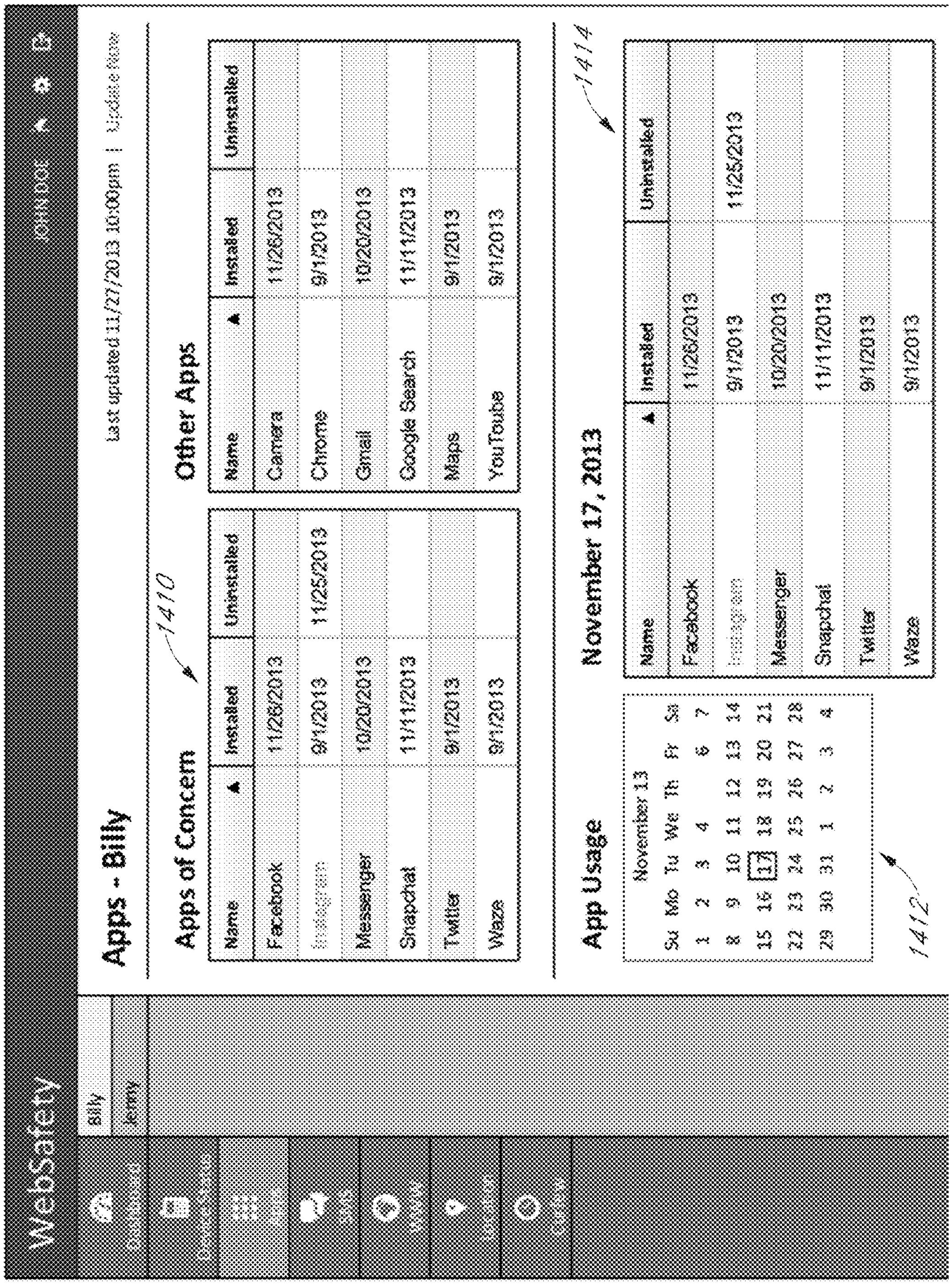
FIG. 14 shows a view of an "Apps" screen.

FIG. 14 shows a view of an "Apps" screen, including "Apps of Concern"—for example, mobile device applications that can potentially be used in cyberbullying activities. In some embodiments, a system can block, delete, or otherwise deter use or functionality of one or more of such applications. Application usage can be tracked and reported as shown. For example, an "Apps of Concern" portion can list software applications that have been identified as presenting potential dangers to children, their installation dates, and when they were uninstalled, if applicable. Columns in the tables can be sorted by each column by clicking the header, then the arrow. Uninstalled applications can be shown in a lighter font color, or "grayed out." A calendar 1412 showing application usage organized by date in a table 1414 can initially show the current day as a default view. Other views related to software applications (including control panels from which a user can update controls, filters, and gather information) are provided as portions of FIGS. 43, 44, 45 and 48. FIG. 15 shows a Filters view of a set of SMS screens. In some embodiments, a system can identify cyberbullying based on frequency of received communications. A system can search for or filter words that may be employed by users of short message service functionality. This view shows a search filter list 1512, where search results can be shown automatically as a user of this view types in a search term. The system can also automatically block senders that may use more than a given number of filtered words, as shown at 1516. Users can also be unblocked, as indicated by the hyperlinks of the words "Unblock" at 1520. Word usage frequency can be tracked, as shown under the heading "Usage Top 20" at 1526.

Figure 16:
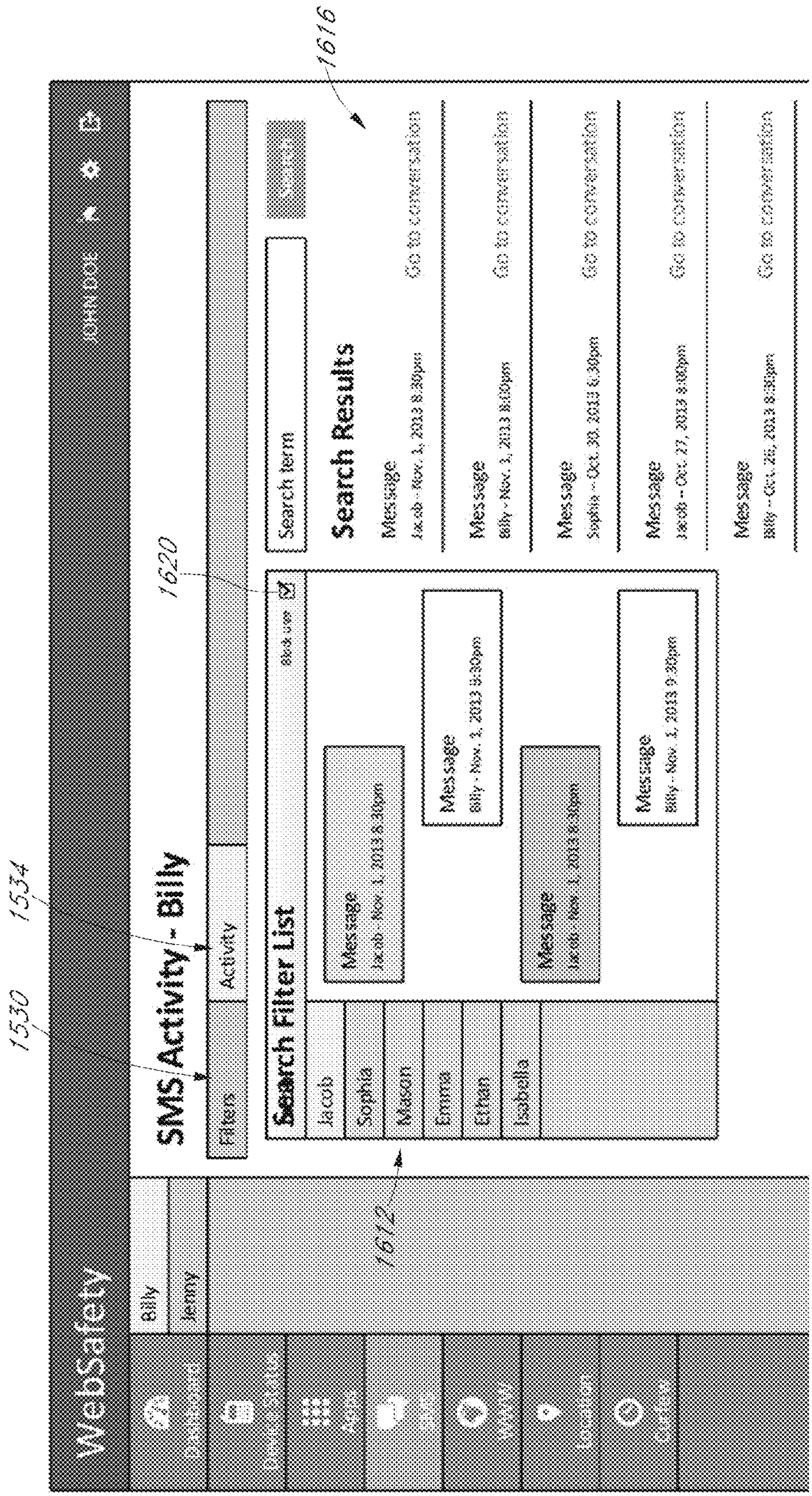
FIG. 16 shows an Activity view of a set of SMS screens.

FIG. 16 shows an Activity view of a set of SMS screens. This demonstrates how information can be grouped and collected for efficient viewing, through interaction of a user with controls made available through a user interface. The "filters" portion 1530 of the user interface illustrated in both FIGS. 15 and 16 can be selected by a user to access the controls and information visible in FIG. 15. Immediately adjacent to the filters portion 1530 is an "activity" portion 1534 of the same toolbar. Selecting the activity portion 1534 can control the view to provide a running timeline view of messages sent and received, as shown. A control can be provided (shown here as check-box 1620) allowing a user to decide, upon review, that a particular person should be blocked and immediately and conveniently block that person from conversing with their child through texts. FIGS. 15 and 16 illustrate how a series of graphical controls and selections can be used to organize and allow a user to access information. Thus, a hierarchy of selections can include selection of an "SMS" control in a first control area (the left-hand bar), selection of a particular child (here, Billy) in a second control area, selection of filters or activity in a third control area, and, in FIG. 16, selection of a particular interlocutor (here, Jacob) in a fourth control area. All four control areas can be visible simultaneously to allow rapid changes between the information visible and the controls accessible for selection. Additional control areas can be included (and indeed, various selectable portions of the screens shown in FIGS. 15 and 16 can be characterized as additional control areas, including the tool bar visible across the top of the views shown here.

Figure 18:
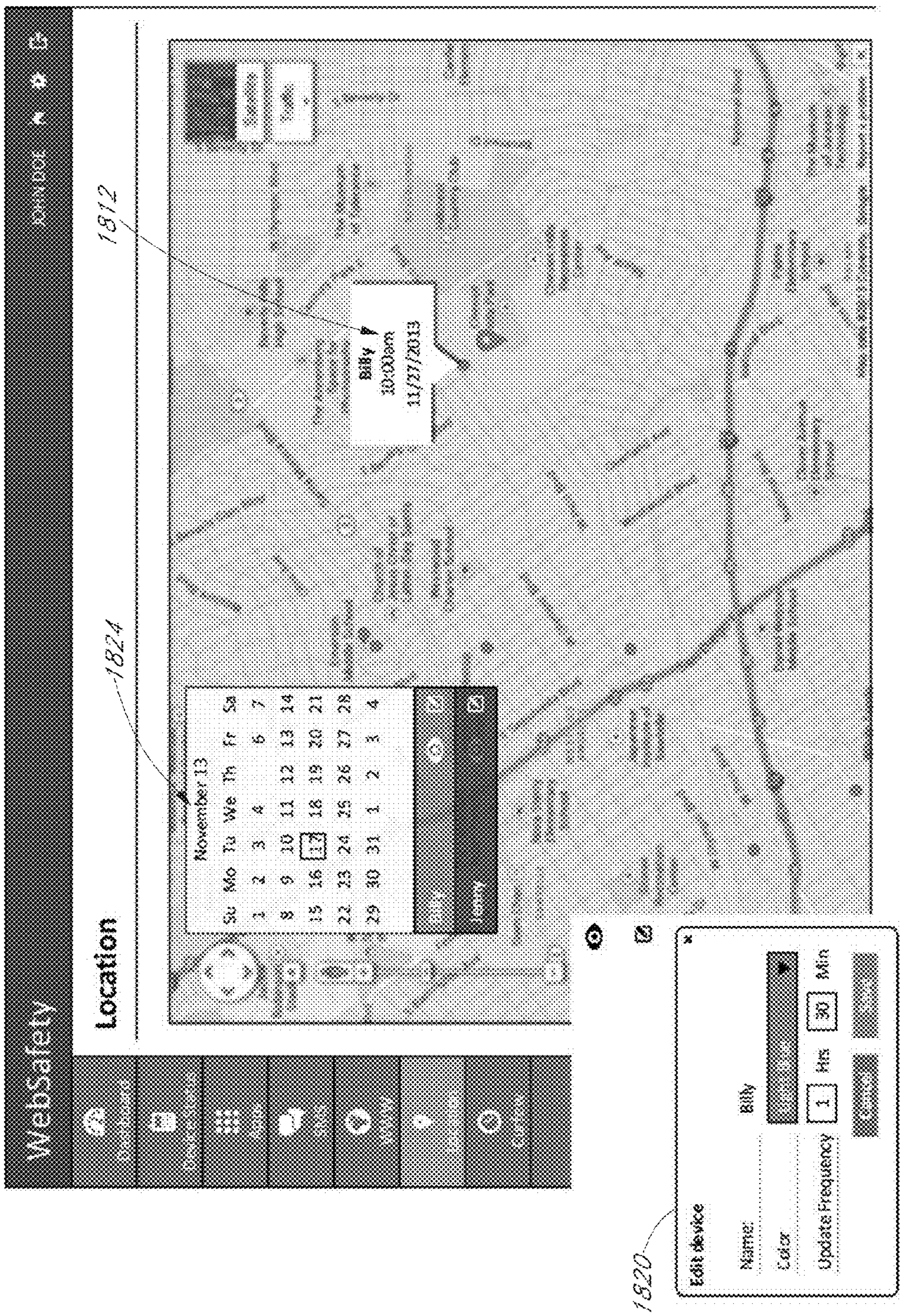
FIG. 18 shows a location screen.

Messages with filtered words can be highlighted (e.g., using a different text or background color such as red) or otherwise identified or distinguished in order to draw the attention of a user. A “filtered word” can be a word that appears in a black list or a block list, and can be a vulgarity or epithet, for example. Thus, “filtering” can refer to searching for forbidden or problem words, or it can refer to allowing some words to pass while blocking others. This selection can also reveal further selectable controls specific to various potential SMS interlocutors with whom a child may converse through texts, as shown in the sidebar listing names. Various SMS senders can be listed (as shown at 1612 with the example list of names: Jacob, Sophia, Mason, Emma, Ethan, and Isabella). At 1616, search results may be shown (this may be accomplished on the fly as search terms are entered without a user needing to refresh a page). Clicking on the hyperlinked text “go to conversation” can display a message in context in the center of the window. Other views related to SMS filtering that may provide similar functionality to that described with respect to FIGS. 15 and 16 are provided as FIGS. 46 and 47. FIG. 17 shows a WWW (or world-wide web) screen, indicating that blocking mode can have a blacklist and a whitelist for URLs to block or allow. An “X” can indicate a website is blocked, and a check-mark can indicate that a website is allowed. As with various other views illustrated and discussed herein, various portions of this view are “active” in the sense that a user can interact with them to select options, activate functions, and generally control and interact with the safety system 110. Thus, the blacklist and whitelist modes can be selected by the blocking mode user controls 1712, and particular URLs can be blocked or allowed (or flagged or allowed) by a user toggling between these options using the URL-specific user controls 1716. A user can customize a blacklist or whitelist by typing a URL into the customization field 1720, which invites input using the faint text “Add site.” Further actions are indicated in the active area 1724, using an eye icon (which can allow a parent to link directly to a browser view of the URL in question to research whether it should be included), a pencil icon (which can allow a parent to edit the field listing the URL or to add notes annotating when or why a site was included, for example), and a trash can icon (which can allow a URL to be removed from the list, for example). Thus, a user can effectively control the filters and the functionality of the safety system 110 in order to customize it for the needs of their family. Other views related to web access that may provide similar functionality to that described with respect to FIG. 17 is provided as FIG. 48. FIG. 18 shows a location screen indicating at the location box 1812 example user Billy’s location on a map, along with the date and time that the location was recorded. As indicated in the edit device menu 1820, different colors can be used for different devices and users being tracked. Here, Billy’s device is shown on the map with light blue icons. An eye icon can be selected to show or hide a device on the map, or to otherwise view related information, re-orient the map, or otherwise draw attention to or make more accessible some aspect of Billy’s location data. A frequency can be selected for how often to search for or display device locations, as indicated with the illustrated edit device menu 1820. A location history can also be provided and accessed from this location screen, for example by selecting a data from the calendar 1824. Location information can be graphically or otherwise juxtaposed to aid a parent in recognizing patterns and/or deviations therefrom. This location screen or a similar interactive view can be used to establish geographical boundaries and/or other geofencing functionality. For example, a circle can be dynamically drawn or placed on the map indicating an allowed radius of unreported movement within which the phone (or a safety system plugin 132 of a user system 130) need not alert a parent. Other shapes can be drawn, which can relate to school campus boundaries, allowed neighborhoods, prohibited locations, no-go zones, etc. Results of violating borders can be reporting, diminishing smart phone functionality (e.g., limiting to only emergency calls and abduction tracking, etc.) Other views related to location tracking that may provide similar functionality to that described with respect to FIG. 18 are provided as one or more portions of FIGS. 33, 37, 39, 41, and 49.

FIG. 19 shows a curfew screen indicating Billy’s curfews for various days of the week, including start times 1914, stop times 1915, and check boxes 1916 for when to apply the curfew, for example. The illustrated interface is interactive and provides an array of customizable controls and active fields that can be adjusted and edited by a user. For example, an active field or hyperlink 1912 can be used for adding additional time restrictions. Check-boxes 1916 can be selected for which days of the week the curfew time restrictions should be applied. A garbage-can icon 1918 can be used for deleting a given restriction, which may result in the delete menu 1920; this menu may include a confirmation (for example, typing the word “delete” as indicated, providing some other control input such as a password, etc.). A pencil and paper icon 1922 can be selected to edit restrictions, which may result in the edit menu 1924, as shown, with its additional interactive fields and controls. The delete menu 1920 and the edit menu 1924 can be typically not shown, except when one of the icons 1918 or 1922 is selected. Other views related to curfew information and controls that may provide similar functionality to that described with respect to FIG. 19 are provided as one or more portions of FIGS. 50A and 50B.

Figure 20:
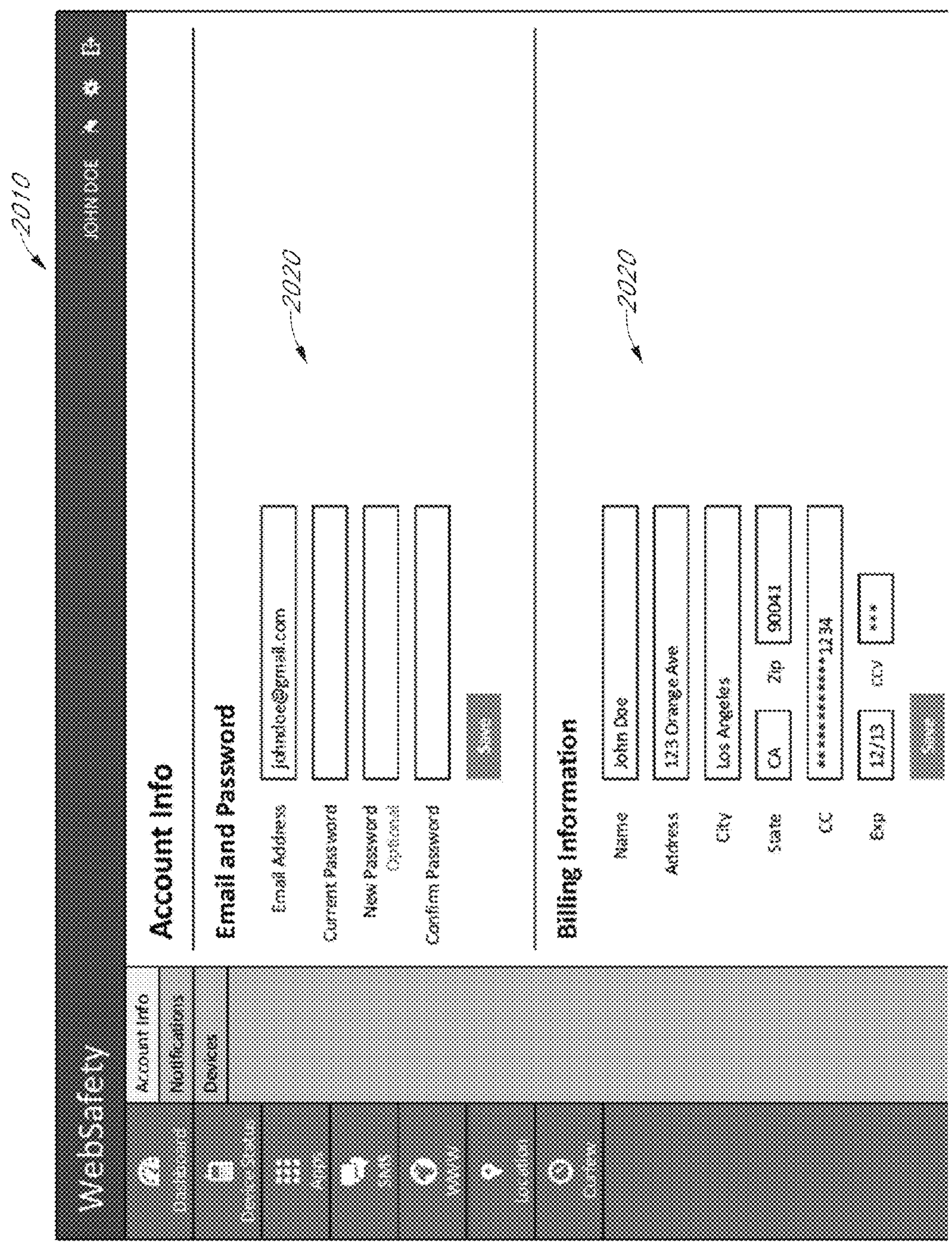
FIG. 20 shows an account information screen.

FIG. 20 shows an account information screen 2010. In the context of a safety system 110, this screen can be interactive and represent a way of interacting with an account management module 120 (see FIG. 1) through a user interface module 116. An initial view of an account information screen 2010 can include information provided during an account setup process (see, e.g., FIGS. 7 and 8), but the fields 2020 can allow a user to update the information and save new information relating to billing and so forth.

Figure 21:
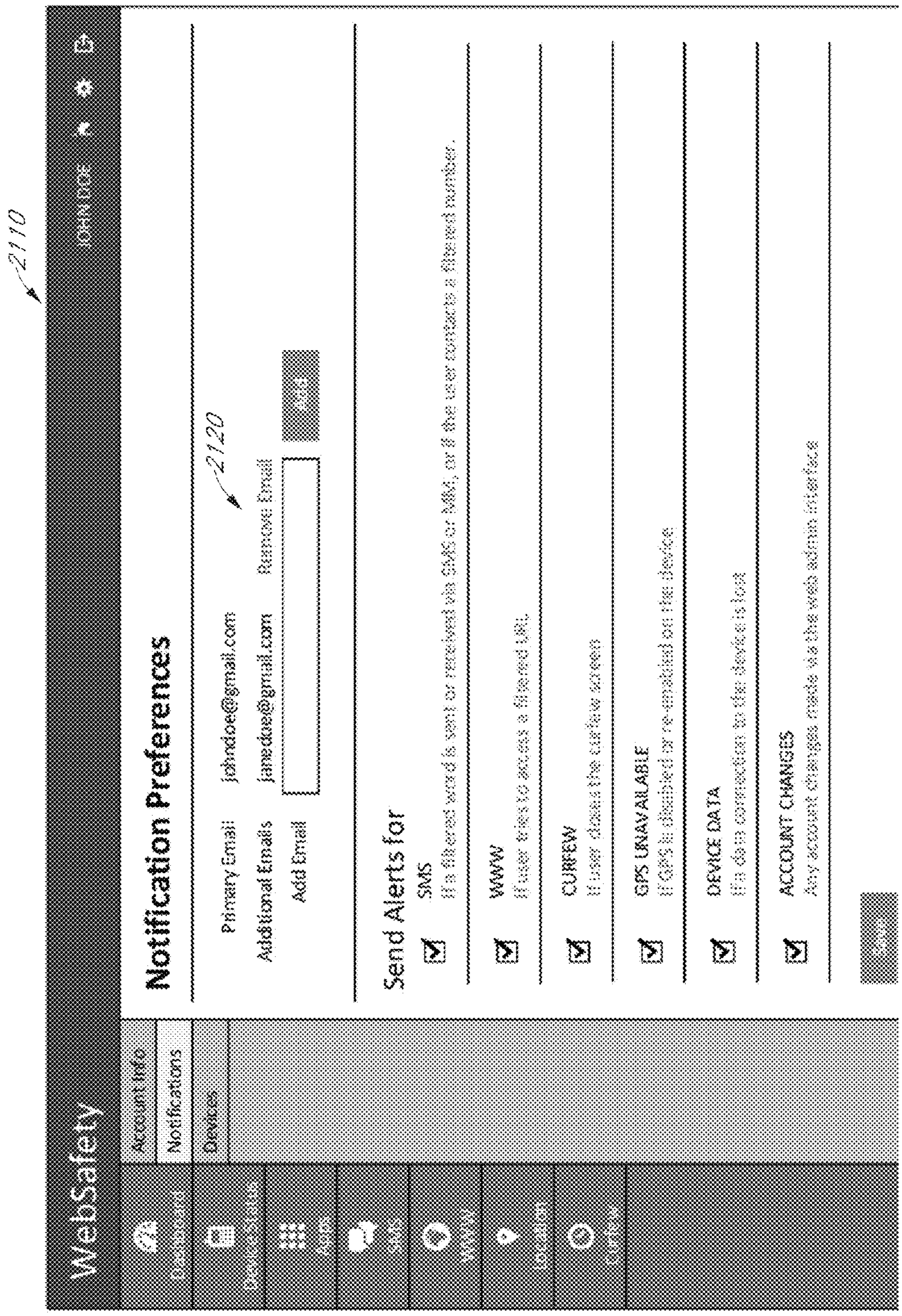
FIG. 21 shows a notification preferences screen.

FIG. 21 shows a notification preferences screen 2110. An account user can indicate the email address or addresses to be used for notifications as indicated at 2120; multiple emails can be listed. Other notification approaches can also or alternatively be used, including texts, phone calls, audible notifications, some combination of these options, etc. Alerts can be sent to an account user when: an SMS filtered word is sent or received (for example, via SMS or multimedia (MM)), or if the user contacts a selected (“filtered”) number; a user tries to access a filtered URL; a user closes the curfew screen; a GPS functionality of a device is disabled or re-enabled; a data connection to the device is lost; and/or account changes are made. Other notifications can also be provided. The selections made when initially setting up a child’s device (as explained herein with respect to FIG. 9, for example) can be initially displayed here, but interactive controls can be provided allowing a user to update or otherwise change the settings and configuration. Another view related to notification preferences and controls that may provide similar functionality to that described with respect to FIG. 21 is provided as one or more portions of FIGS. 34 and 53.

Figure 22:
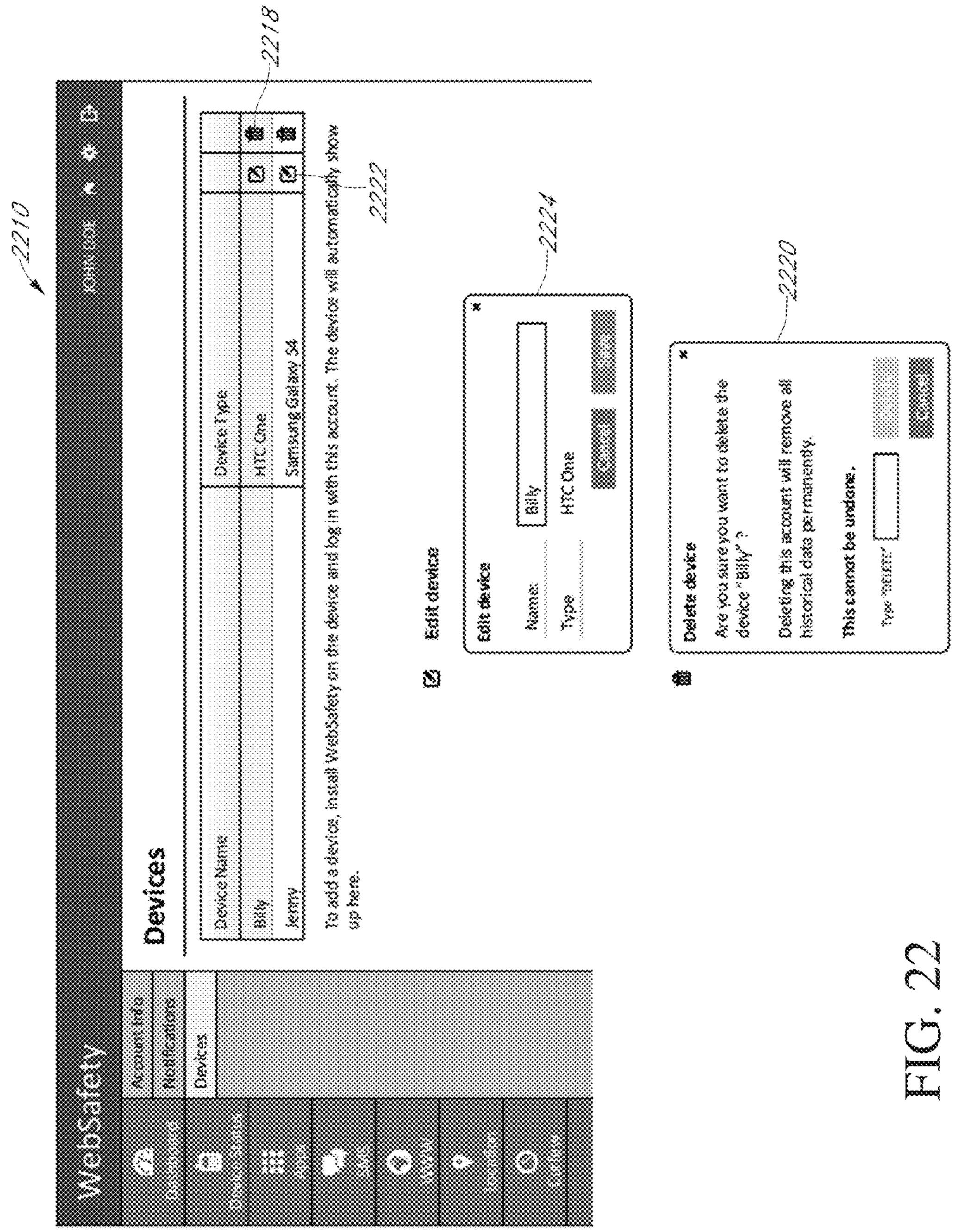
FIG. 22 shows a devices screen listing the devices being tracked.

FIG. 22 shows a devices screen 2210 listing the devices being tracked in an example account. Billy has an HTC One, and Jenny has a Samsung Galaxy S4. Installation of software (which can play the role of a safety system plugin 132 of FIG. 1, for example, "WebSafety," available from WebSafety, Inc. of Newport Beach, Calif. as of October 2014 and its successors) and logging in to the account from that software on a user system 130 which can be the devices listed above can cause a device to automatically be visible in the list. Devices' association with user names (for example, Billy is associated with HTC One) can be edited, and devices can be deleted from the listing as shown. For example, a garbage-can icon 2218 can be used for deleting a given device, which may result in the delete device menu 2220; this menu may include a confirmation (for example, typing the word "delete" as indicated, providing some other control input such as a password, etc.). A pencil and paper icon 2222 can be selected to edit a device, which may result in the edit device menu 2224, as shown, with its additional interactive fields and controls. The delete device menu 2220 and the edit device menu 2224 can be typically not shown, except when one of the icons 2218 or 2222 is selected. Another view related to devices to track and monitor and controls that may provide similar functionality to that described with respect to FIG. 22 is provided as one or more portions of FIG. 51.

Figure 23:
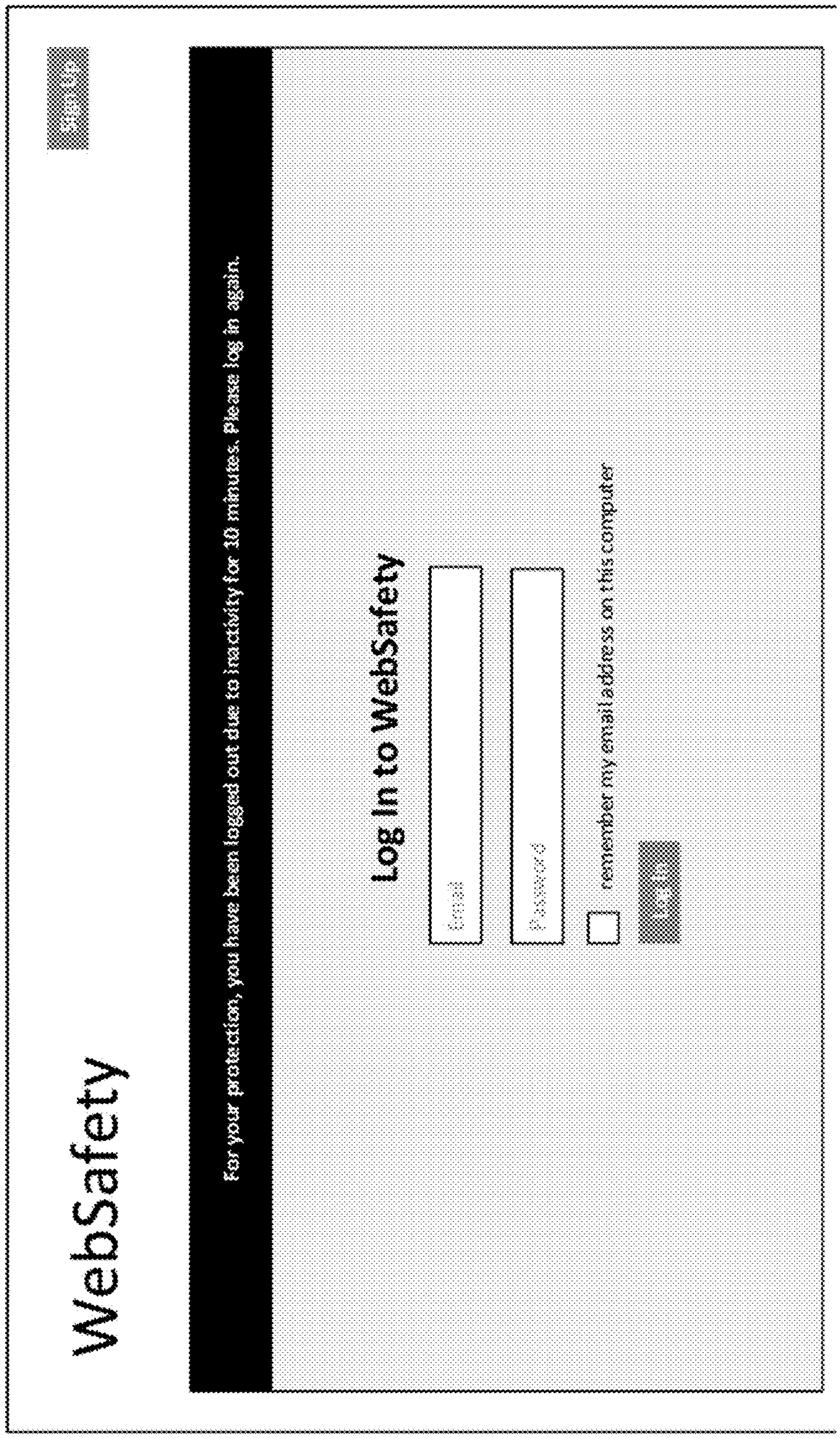
FIG. 23 shows a log-in screen.

FIG. 23 shows a log in screen that can be automatically shown after a time-out period has elapsed, to enhance security for the account user. This log in screen can be displayed to a user of a user interface module 116 of a safety system 110, for example, and it can be especially useful when the system 110 is accessed from a web browser over the internet, for example. Another view related to account security and controls that may provide similar functionality to that described with respect to FIG. 23 is provided as one or more portions of FIGS. 3A, 3B, 3C, 3F, 5, 31 and 32.

Figure 24:
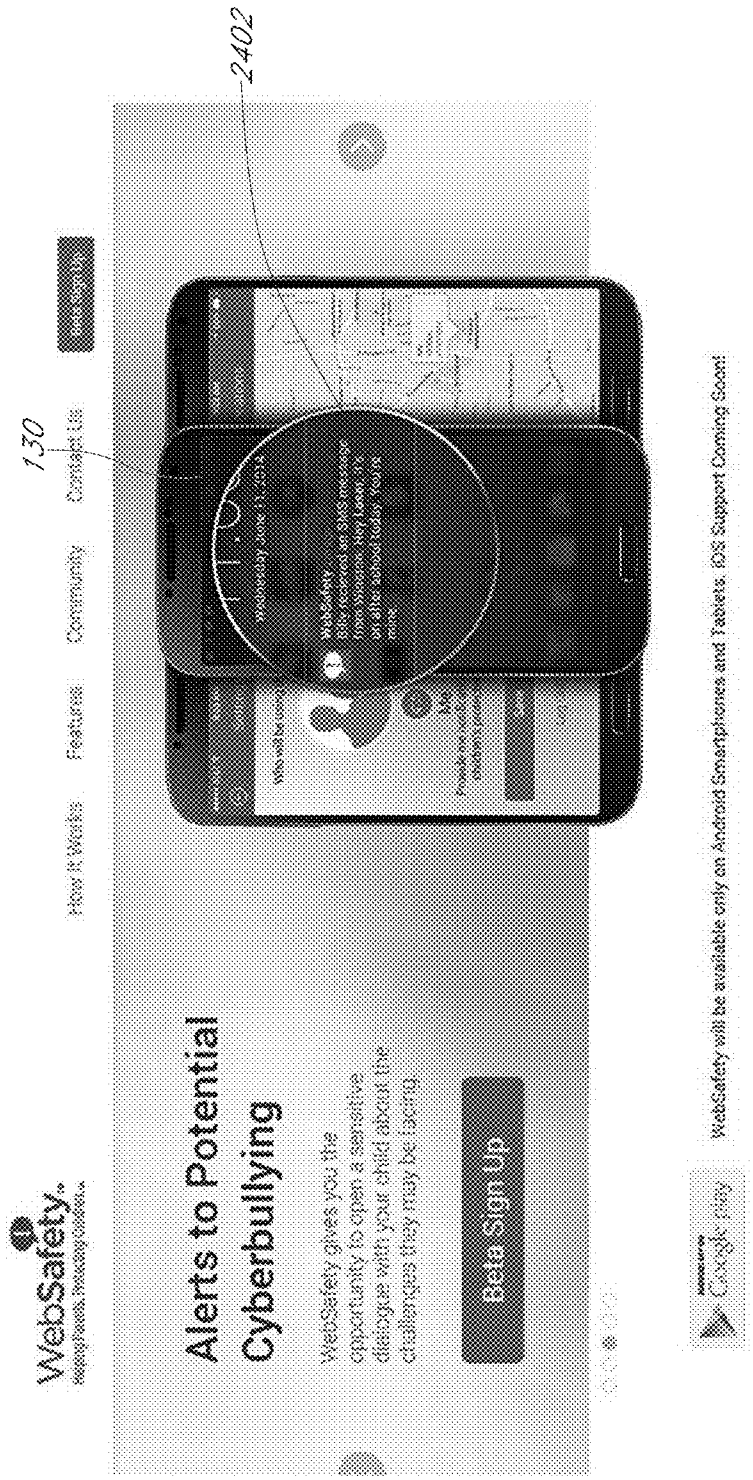
FIG. 24 shows a user system including a notification (emphasized) received from the safety system over a network.
Figure 25:
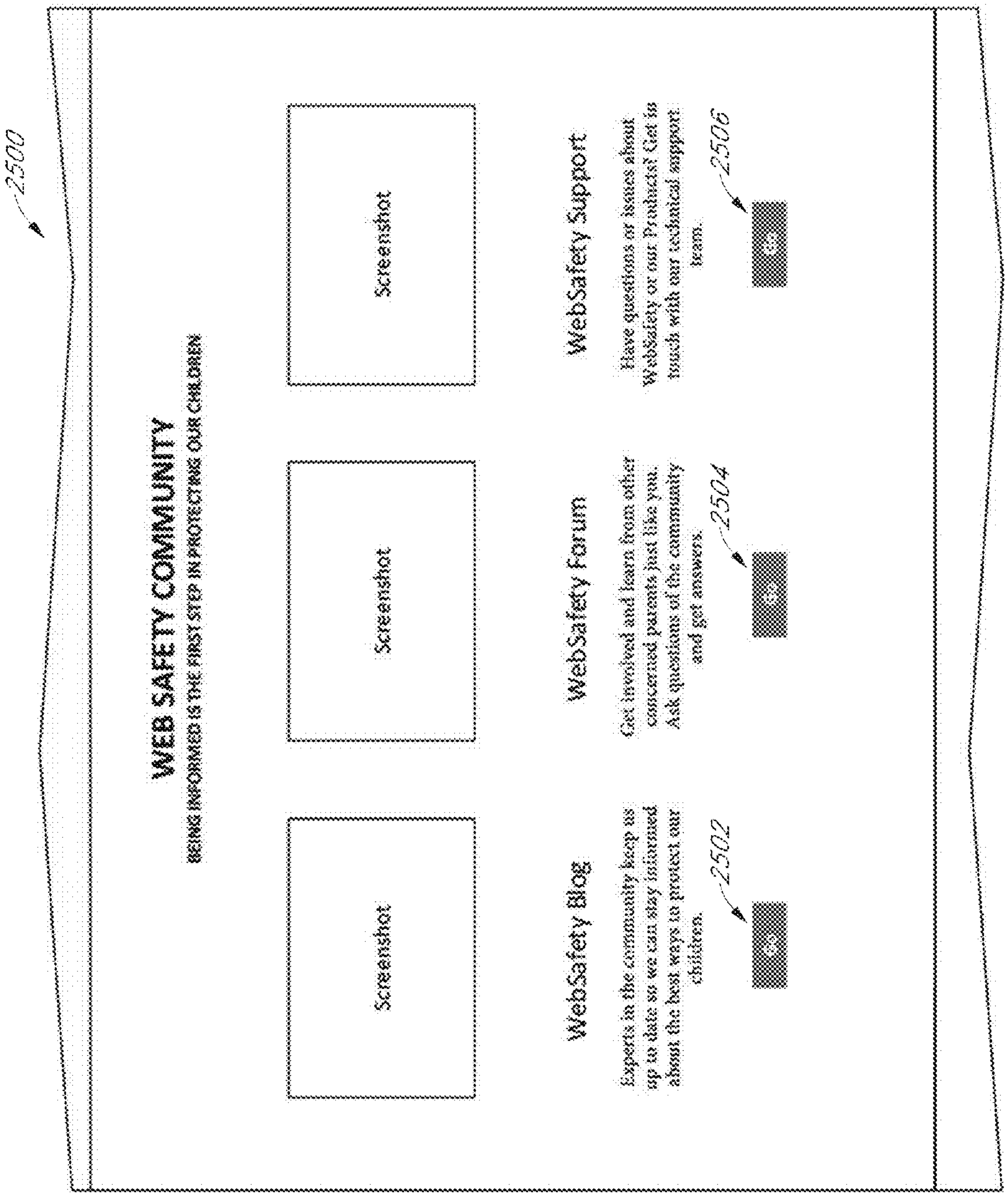
FIG. 25 illustrates a user interface including active links for parents to access community features discussed above.

FIG. 24 shows an example user system 130 including a notification 2402 (emphasized) received from the safety system 110 over a network 102. Parents can install a software application (e.g., a safety system plugin 132 of FIG. 1, for example, the "WebSafety" mobile app, available from WebSafety, Inc. of Newport Beach, Calif. as of October 2014 and its successors) on their smart phones to provide features of the safety system 110. The safety system 110 can provide alerts or notifications to the parent. In some embodiments, the safety system 110 can interrupt the operating system of the user system 130 or any tasks running on the operating systems of the user system 130 to provide the message 2402.

In some embodiments, the safety system 110 need not be installed on the user system 130 of the parents. Instead, the safety system 110 can send notifications 2402 via SMS or data messaging to any e-mail or other account. Parents may be monitoring more than one of their children. Thus, the notification 2402 can include the identity of the child concerning the alert. In some embodiments, the notification 2402 can also include a full quotation or an excerpt of the content at issue. The content at issue can be a text message, a multimedia message, a URL, etc. For messages, the notification may also identify the sender or the recipient of the message. The safety system 110 can determine the threat level of the content to the child before interrupting the parent's user system. As shown in FIG. 24, the threat level is very high as the content of the message relates to a possible fight after school. The threat level can be determined based on keyword and/or phrase matching or image recognition.

XVI. Community Features

Parenting is not easy. Parents are often at a loss to identify and resolve some of the issues that they encounter with their children. The safety system 110 includes technical solutions to assist parents on at least two aspects of parenting—identification of a problem and presenting solutions (or at least identifying resources for learning and finding help leading to potential solutions). For example, parents might find through the safety system 110 that their children are being bullied or harassed, or that they might be considering drinking or trying drugs. This can represent identification of a problem, and it can occur through parental access to the texts, images, applications, or websites to which a child is exposed.

FIGS. 25 to 30 illustrate community and support features that can be provided by the safety system 110. This can represent resources for finding help or understanding the problem, and it can save time by automatically using the same underlying data or information that gave rise to the parental concern to locate relevant articles, content, or other online resources, and drawing a parent's attention to those items. For instance, relevant instructional or informational content can be provided and access thereto (both passive and active) can be improved through the systems described. A community for users to interact with a software provider and each other can be accessed, for example, through a community portal 2500 that may be an example of a user interface module 115. Thus, a WebSafety blog (accessible through a blog access button 2502) can include relevant content for users of a WebSafety software system. Experts in the community can keep users up to date, informing users of the best ways to protect their children. A WebSafety forum (accessible through a forum access button 2504) can facilitate dialogues between parents about the best ways to protect their children. A WebSafety customer support portal (accessible through a support access button 2506) can also be provided as part of this community, and such customer support can be technical and/or content-related. Support may include automatically notifying parents through their computing devices of new applications downloaded by their children and include a description of the new application. The safety system 110 can obtain description of new applications from a data repository 150 of the safety system 110. The safety system 110 can update the data repository based on information automatically retrieved from application stores, user comments regarding the application, etc.

Technical features of the described system can allow better and faster access to relevant background information on the topics raised by the monitoring and notification features of the described system. For example, automatic keyword searching or automatic alerts based on use of any of the particular features described above can give rise to content suggestions—for example, links to relevant blog posts, support tickets, or forum discussions. Such automatic alerts can sort by relevance, date (putting most recent first), by user rating (putting those most used or most highly approved or most-viewed first), etc. As discussed above, the safety system 110 can determine certain keywords or identify content from the images. For example, the safety system 110 can determine words such as "drink" in messages: "Man, that was a close call at the checkpoint; Told you shouldn't drink and drive." Other examples are provided in FIGS. 11, 12, 16, 37, 39, 42, 46, and 47. In some embodiments, the safety system 110 can also identify from images (for example sent or received via messages, posted on Facebook, or SnapChat, etc.) that the child is holding a can of beer, for example. In another example, the safety system 110 can automatically identify specific children using image recognition techniques or based on social network tagging.

The mobile safety monitor 110 can suggest content—for example, relevant articles from social scientists, therapists, medical professionals or others—based on the keyword and image detection. Content may not be unique to a user community for the systems and features described here, and can also be drawn from larger web searches or syndications services. Content can be marked as unique to the user community or as drawn from other sources, and may include links to sources so users can assess credibility. Content can be sorted by reaction or preference from a user community, such that content giving rise to more comments, longer reading times, more forwards, etc. can be featured, deemphasized, or removed, depending on the type of feedback involved.

The safety system 110 can store in the data repository 150 written and audio-visual materials such as articles, books, podcasts, or videos. The data repository 150 can also store links to professionals who may be able to assist parents in identifying solutions. The safety system 110 can suggest content and/or provide access to professionals based on identification of one or more issues discussed above. As an example, besides the notification of the "drink" message, the safety system 110 can include links to articles dealing with alcohol and teenagers. The safety system 110 can also include link to one or more professionals that parents can directly interact with via text, audio, and/or visual communications. Accordingly, the safety system 110 can connect parents with the resources they need to help their children.

The safety system 110 can also analyze a child's usage pattern of their user system to determine community content. For example, the safety system 110 can collect data on messaging use, application use, social networking use, picture capturing usage by the child, etc. Based on this gathered data, the safety system 110 can determine whether a particular behavior with respect to using a computing device is deviating from the norm. Accordingly, the safety system 110 can suggest to the parents, via one of the user interfaces shown herein, community content that can assist parents. Further, the safety system 110 can be used to implement the solutions identified in the content directly such as setting certain restrictions or curfew on the use of one or more computing devices. Based in part on the drinking and driving text, for example, the safety system 110 can provide parents with an option to disable user system 130 while the child is driving (that is when the user system 130 is moving at a speed over a threshold). The safety system 110 can also automatically provide other restriction settings as described below with respect to FIGS. 48 and 50 based on the monitoring described herein.

In an example, a safety system 110 can analyze a child's usage pattern of their user system to determine content recommendations, using one or more of the following technical protocols. For example, the safety system 110 can automatically implement or recommend curfew protocols based on child's usage patterns. For example, if the child is using their phone while in school or driving, the safety system 110 can automatically block the texting functionality of the phone. Further, the safety system 110 can receive input from parents through a survey or questionnaire to automatically recommend phone usage settings for their children.

Figure 26:
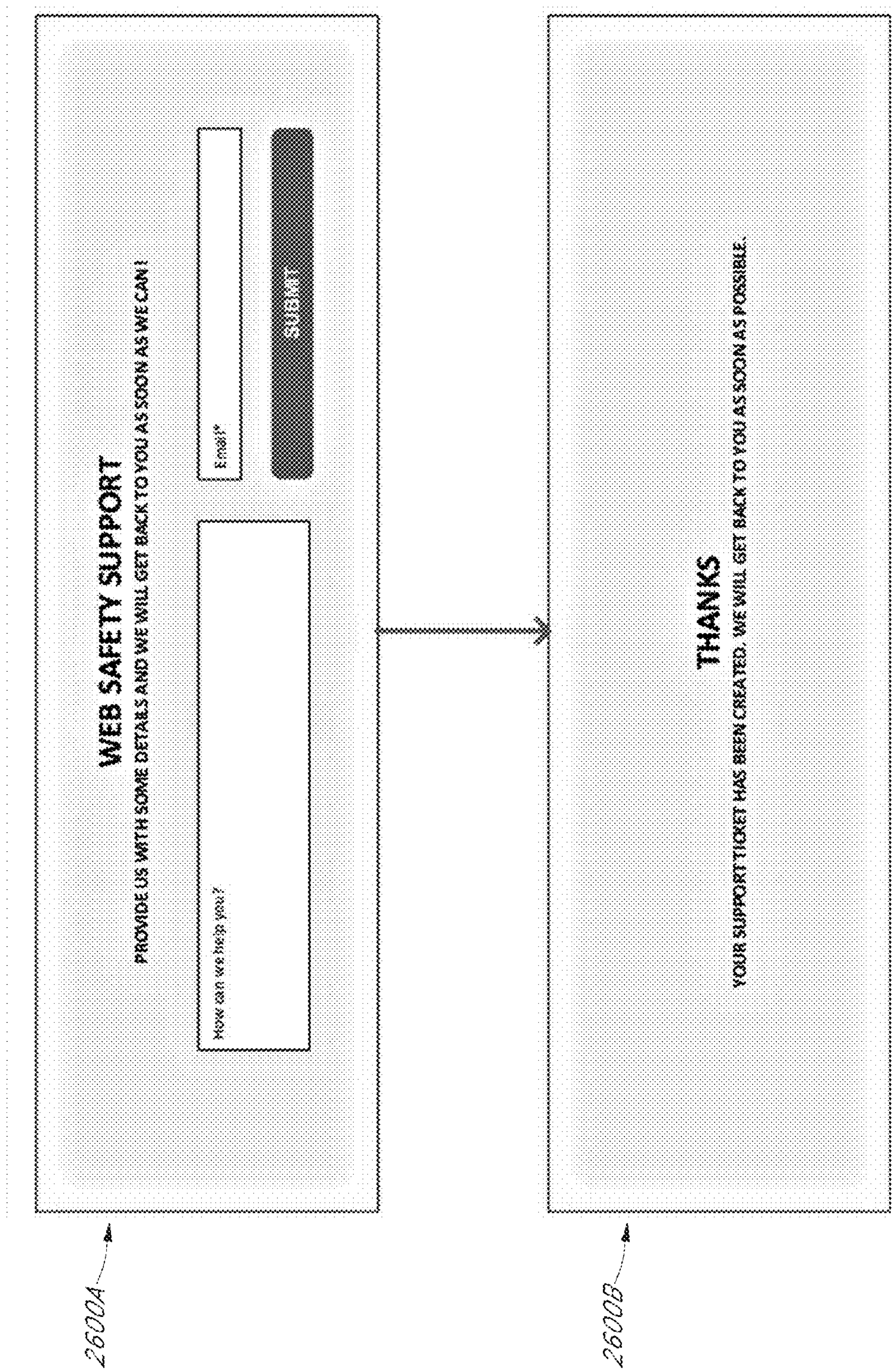
FIG. 26 illustrates user interfaces that enable users of the systems described herein to ask technical questions about the software including some or all modules of a safety system.

FIG. 26 illustrates user interfaces 2600A and 2600B that enable users of the systems described herein to ask technical questions about the software including some or all modules of the safety system 110. These interfaces may be used as a WebSafety customer support portal (that may be accessible through a support access button 2506), and such customer support can be technical and/or content-related.

Figure 27:
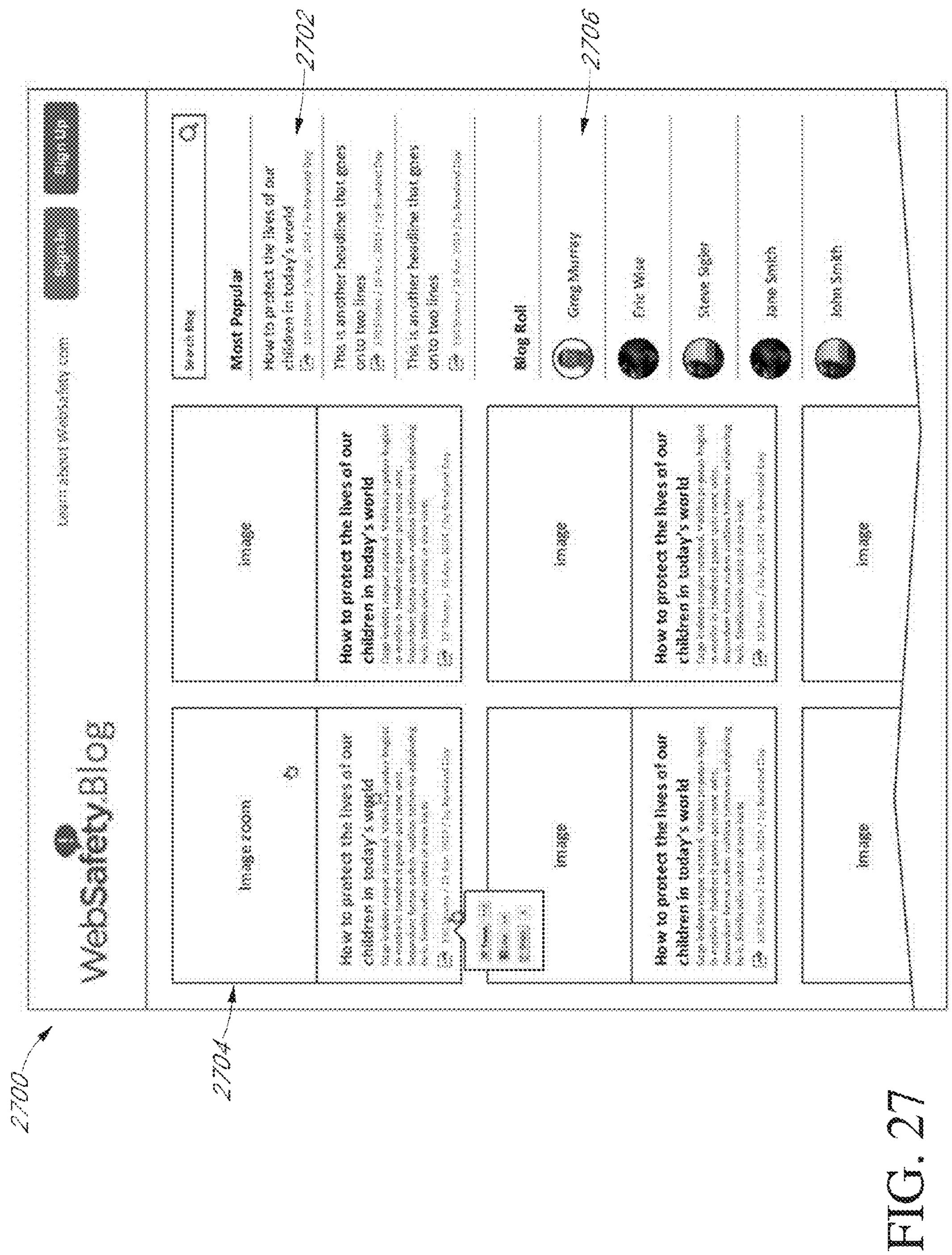
FIG. 27 illustrates an example a blog user interface generated by a safety system 110 to provide community features discussed above.
Figure 28:
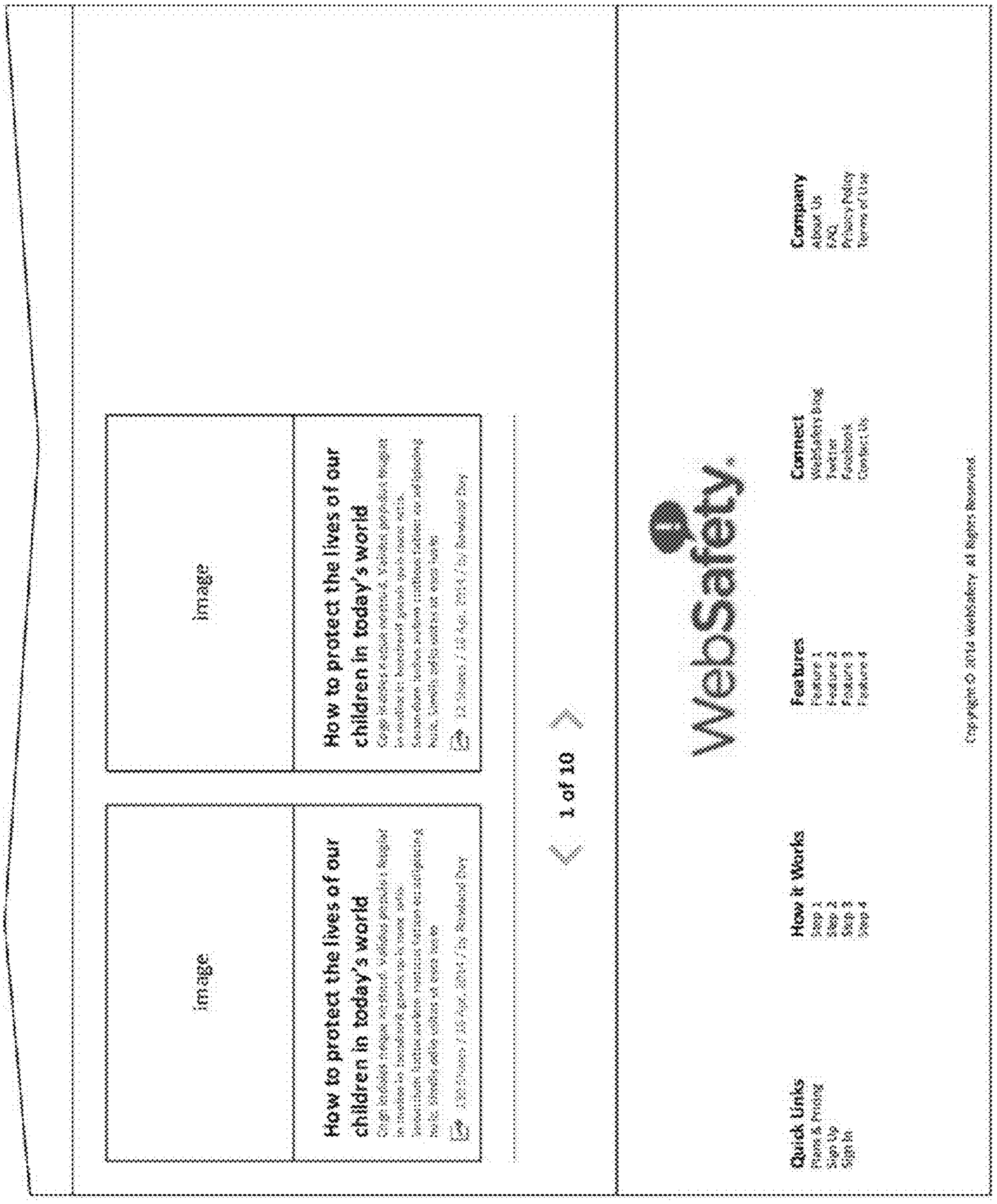
FIG. 28 shows a second portion of the user interface including additional articles.
Figure 29:
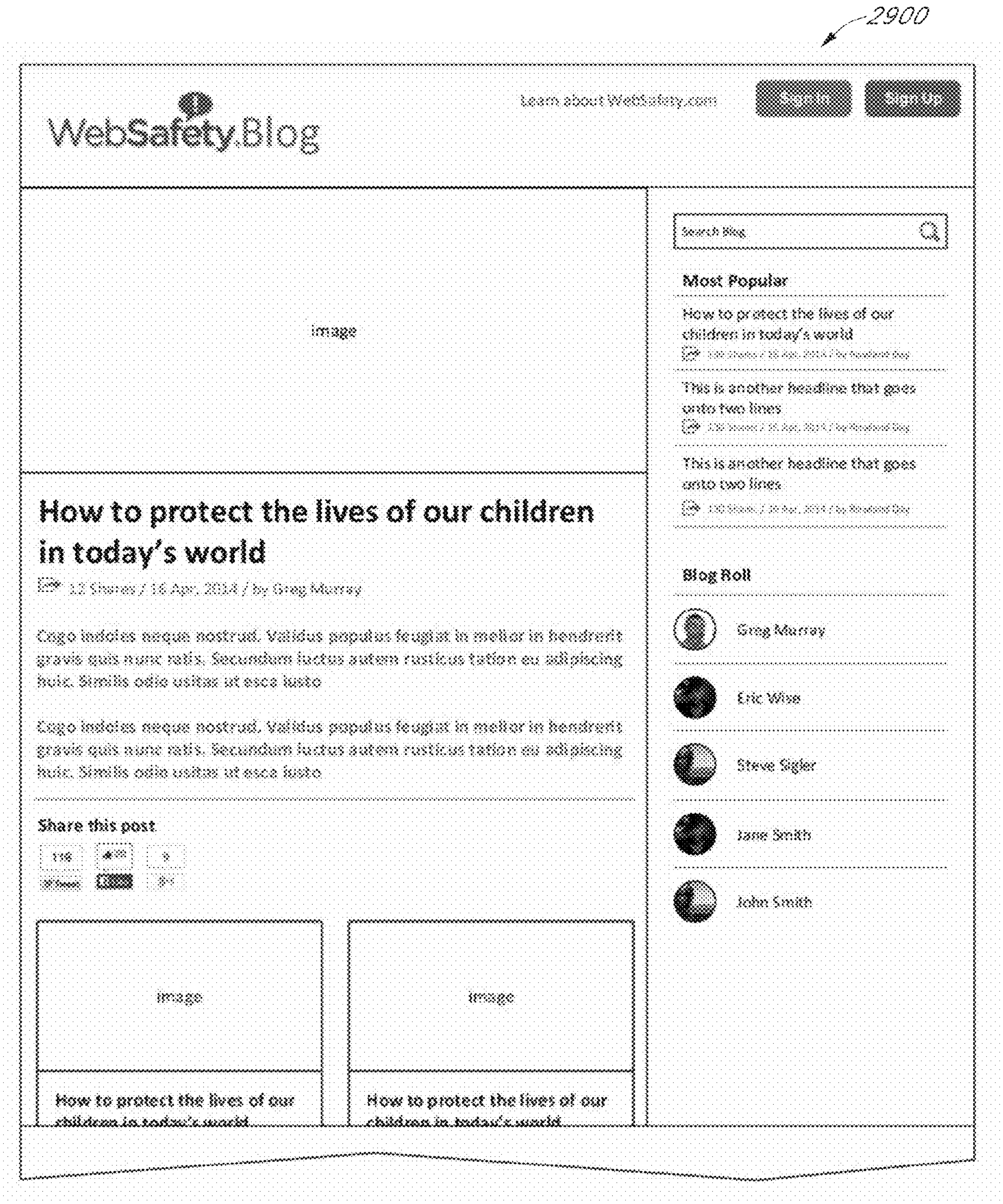
FIG. 29 illustrates an embodiment of a user interface including an article or a blog.

FIGS. 27-29 illustrate example blog user interfaces. An interface 2700 generated by the safety system 110 can provide some of the community features discussed above. This interface 2700 may be used as a WebSafety blog (accessible through a blog access button 2502). Experts in the community can keep users up to date, informing users of the best ways to protect their children. The safety system 110 can customize the blog user interface 2700 based on issues determined automatically through monitoring of their children. As discussed above, the safety system 110 can select content from data repository 150 or external resources for presentation to the parents based on monitoring of children. The content 2704 may also be organized according to ratings or reviews of the particle article or media content. The blogs user interface 2700 can also include a blog roll 2706 listing some professionals who may have relevant specialty in accordance with the parent's need as automatically determined by the safety system 110. The blogs user interface 2700 can also include articles or other media items 2702 that may be rated highly by the community. The community can include other parents using the systems described herein. In some embodiments, the community can also include professionals such as psychologists, doctors, or life coaches. FIG. 28 shows a continuation of the user interface 2700 including additional articles. A user can select one of the links corresponding to an article or a blog that can direct them to user interface 2900 (as shown in FIG. 29) with a more detailed view of the selected article.

Figure 30:
FIG. 30 illustrates an example user interface showing a more detailed overview of a professional listed in the blog roll.

FIG. 30 illustrates an example user interface 3000 showing a more detailed overview of a professional listed in the blog roll 2706 of FIG. 27. The user interface 3000 shows writings and other resources related to the particular professional selected by the user from the blog roll 2706. As discussed above, the safety system 110 can identify professionals based on monitoring children's user systems 130.

XVII. Example Registration or Activation Processes and User Interfaces

Further to the description provided herein with respect to FIG. 9, for example, FIGS. 31 and 32 illustrate example embodiments of a process for enabling systems described herein on one or more user systems. Users can install a software application including some or all the modules of the safety system 110 on their user systems 130. The safety system 110 can require email or other forms of validation to activate the software. The safety system 110 can provide parents with options to select whether the computing device with the software installed is to be used by a child or parent. When the computing device is selected as parent, the safety system 110 can send notifications and/or alerts regarding their children to that particular computing device. For example, safety system 110 can interrupt the operations on the user system 130 of the parent to display alerts. When a particular computing device is enabled in the parent mode, that computing device can be used to control operations of other computing devices such as those belonging to their children. For example, parents can use the safety system 110 on their user system 130 to block some or all functionalities (for example texting, Facebook, etc.) in the children's user system 130.

In FIG. 32, the example process shows registration of a software application including some or all of the modules of the safety system 110 on a user system 130 for a child. After installation, parents can select that their child will be using the user system 130. Once the user system is selected to operate in child mode, the safety system 110 can monitor that user system and control its operations as described herein. Setting up a child device can include filling out a profile (e.g., with name, date of birth, and e-mail) for that child. An example profile interface page for a child is provided as FIG. 52.

In an example, a safety system 110 can provide a single application software download that can function in either child mode or parent mode, depending on a selection in a process as indicated in FIGS. 3C, 31 and 32, using one or more of the following technical protocols.

XVIII. Example Location User Interface

Figure 33:
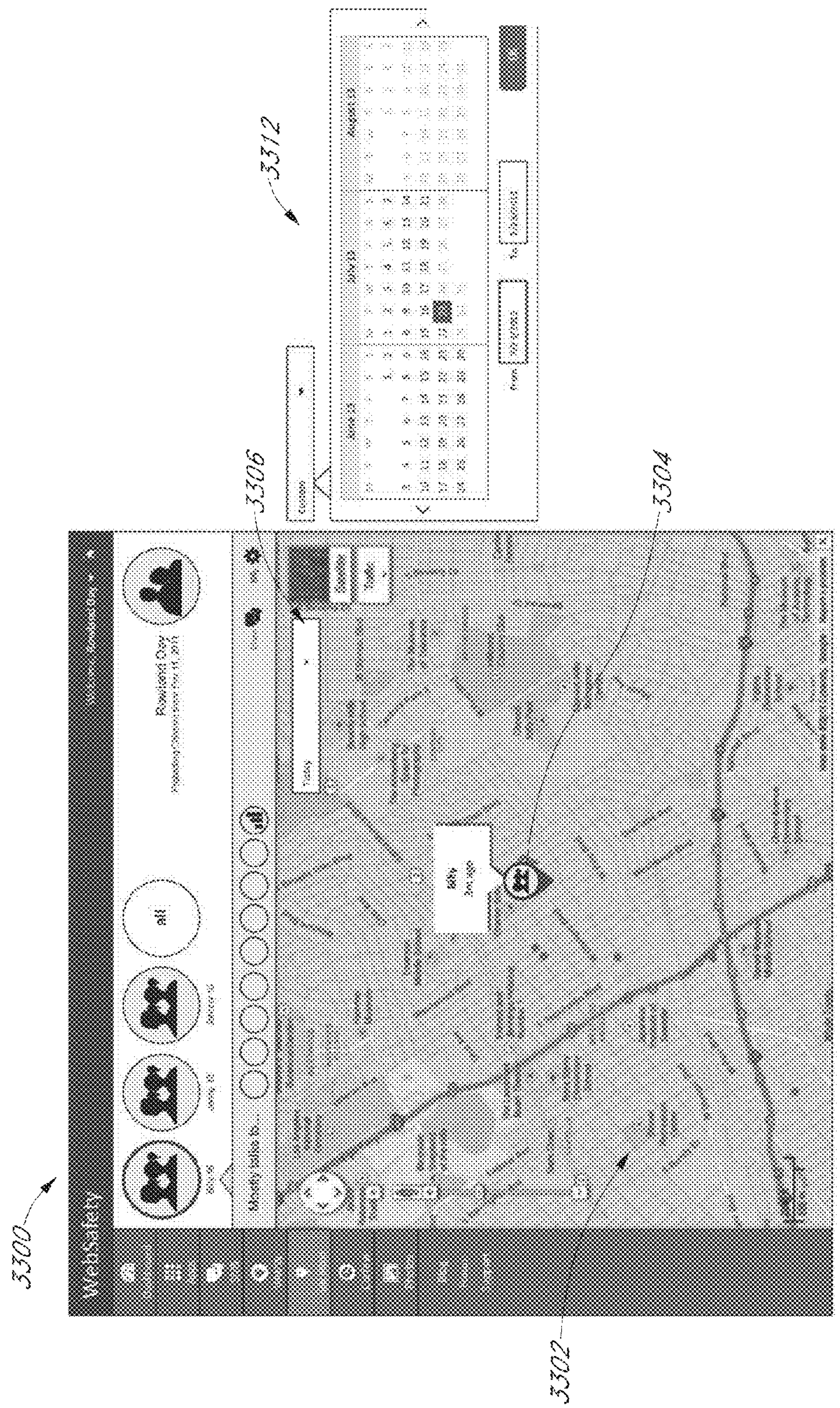
FIG. 33 illustrates an embodiment of a maps user interface generated by a safety system to show location information of a child's user system on a map 3302.

FIG. 33 illustrates an embodiment of a maps user interface 3300 generated by the safety system 110 to show location information 3304 of a child's user system (e.g., user system 130 of FIG. 1) on a map 3302. Other views related to map user interfaces that may provide similar functionality to that described with respect to FIG. 33 are provided as at least a portion of FIGS. 10A, 10B, 18, 33, 37, 38, 41, and 49. The map 3302 can also include additional markers (not shown) for location of school, home, one or more friends' houses, etc. A calendar control 3312 can be integrated into or accessible from the interface 3300. This calendar control 3312 can be used to select the day for which location data to display. More granularity can be provided and movements can be plotted by minute, hour, and/or day and graphically superimposed on a map view. In some embodiments, location user interfaces may be generated as described herein with respect to Location Agent.

In some embodiments, the safety system 110 can track location data received from the user system of the child over time and identify patterns. For example, the safety system 110 can automatically send an alert when the location of the child's user system has deviated from the norm (for example, more than 100 yards, 500 yards, 1 mile, 5 miles, 25 miles, etc. away from the school during the time when the child should be in school, more than a threshold distance (e.g., 500 yards, 5 miles, 20 miles, etc.) away from home any time of the day). The safety system 110 can also determine if the child has visited a new location or is visiting a particular location with high frequency. The safety system 110 can store locations and location history in data repository 140. Accordingly, parents can use the user interface 3300 to determine where their child's device was at a particular day and time by using the time bar 3306.

The length of time spent in a geographical location can also be tracked. If a child stays at a friend's house much longer than expected, an alert can be generated. Thus, the calendar and mapping features described herein can be combined to create a hybrid between the geofence features and the curfew or other scheduling features. Thus, a child's smart phone can include software that automatically notifies a parent through a parent portal when a child deviates slightly or drastically from a planned schedule. Dangerous or unwanted neighborhoods can be identified geographically and parents alerted when a child ventures within a given distance of such locations. The system can track or otherwise receive data from other interactive applications that provide updates relating to neighborhoods that may become more or less dangerous over time, and incorporate this data into automatic or suggested alert functions.

Location information can also be integrated with other functionality of the system. For example, certain applications may be allowed in some locations, and not in others. Thus, a full curfew-based lock-down of the phone may not occur while Billy is attending his piano lesson at (Miss Jones' house at the corner of first and elm, for example), but certain restrictions may apply, disabling all installed gaming applications but not the phone, camera, and recording functions, for example. Thus, the system can be used to help improve the chances that a child will not only be in the right place at the right time, but also will not be engaged in unwanted activities for that place and time. Although the calendar feature illustrated in FIG. 33 only shows days, some embodiments can include a calendar with a more granular break-down of hours and minutes, for example. Thus, an interface similar to the ones presented herein with respect to curfew controls (see, e.g., FIGS. 19, 50A and 50B) can also be used in conjunction with geographic or other location-related controls.

XIX. Example Notification Administration User Interface

Figure 34:
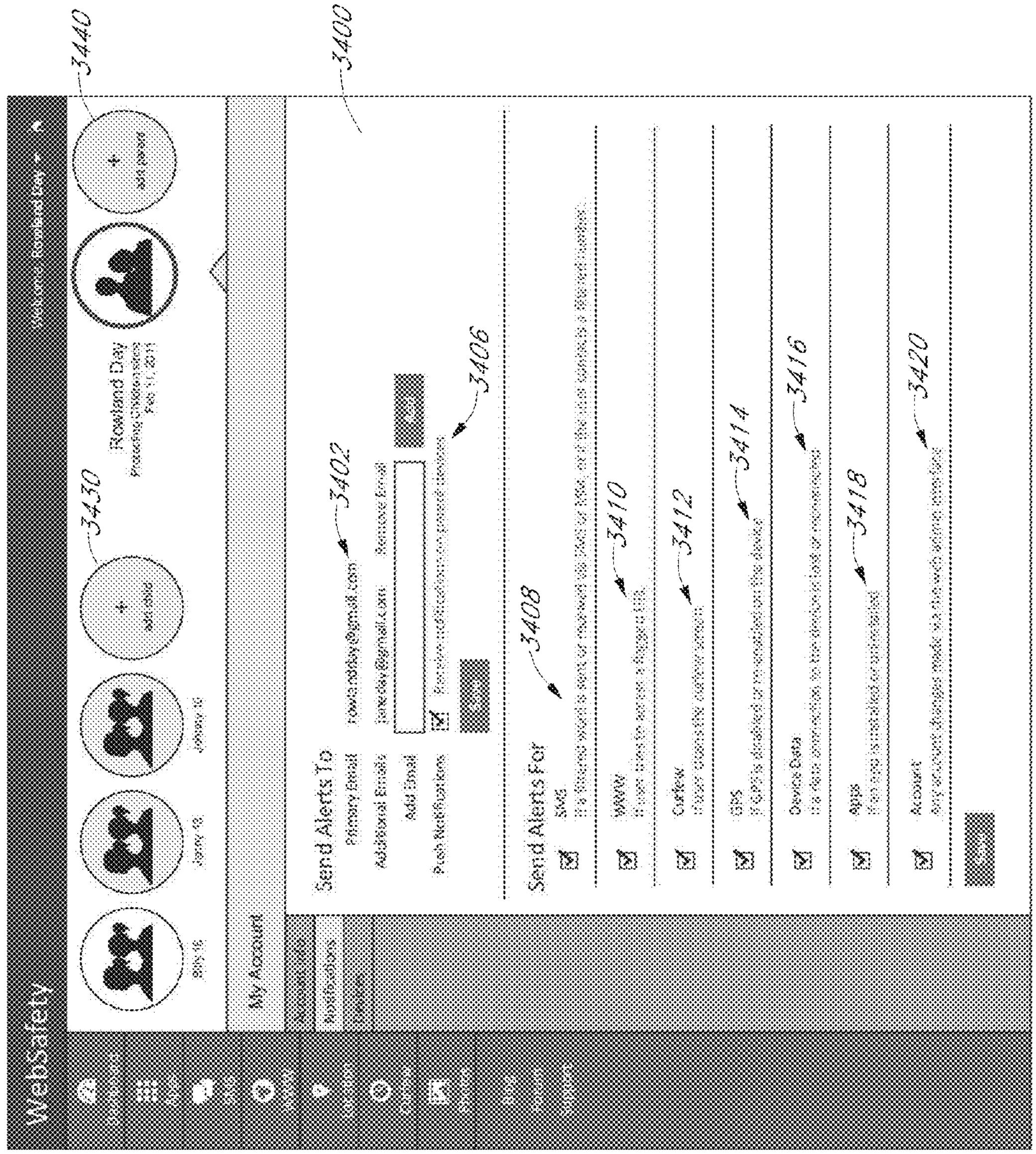
FIG. 34 illustrates an embodiment of a notification administration user interface 3400 generated by a safety system.

FIG. 34 illustrates an embodiment of a notification administration user interface 3400 generated by the safety system 110. This interface can include functionality similar to that described herein with respect to FIGS. 21 and 53, for example. Parents can use the administration user interface 3400 to select alerts and notification settings for activity relating to their children. For example, parents can input a correspondence address 3402 (for example email), which can be used by the safety system 110 to send alerts and/or notifications. In addition, parents can select notifications to be pushed directly on to the parents user systems 130 that were enabled with the safety system 110 as discussed above. Notifications may be pushed or pulled via text messages or through an application software installed on parent's user systems. Accordingly, the safety system 110 can interrupt a parent's user system when an alert or notification is generated. Furthermore, parents can select which alerts that they would like to receive. For instance, the safety system 110 can generate alerts based at least on the parent's selection of one or more of the following: text messages 3408, internet usage 3410, curfew 3412, GPS 3414, data connection 3416, and user system applications 3418, etc. The safety system 110 can also generate alerts based on detected threat level as discussed above.

FIG. 34 also shows an add child user control 3430 that can be selected to add an additional child to the tracking and safety system, and an add parent user control 3440. As with other controls illustrated herein, these controls can have hyperlink functionality that immediately switches a user's view to a dialogue that prompts a user to input the information needed and to perform any other steps (such as installing software on a child's mobile device) relevant to the indicated function.

XX. Computing Device Status User Interfaces

Figures 35A, 35B:
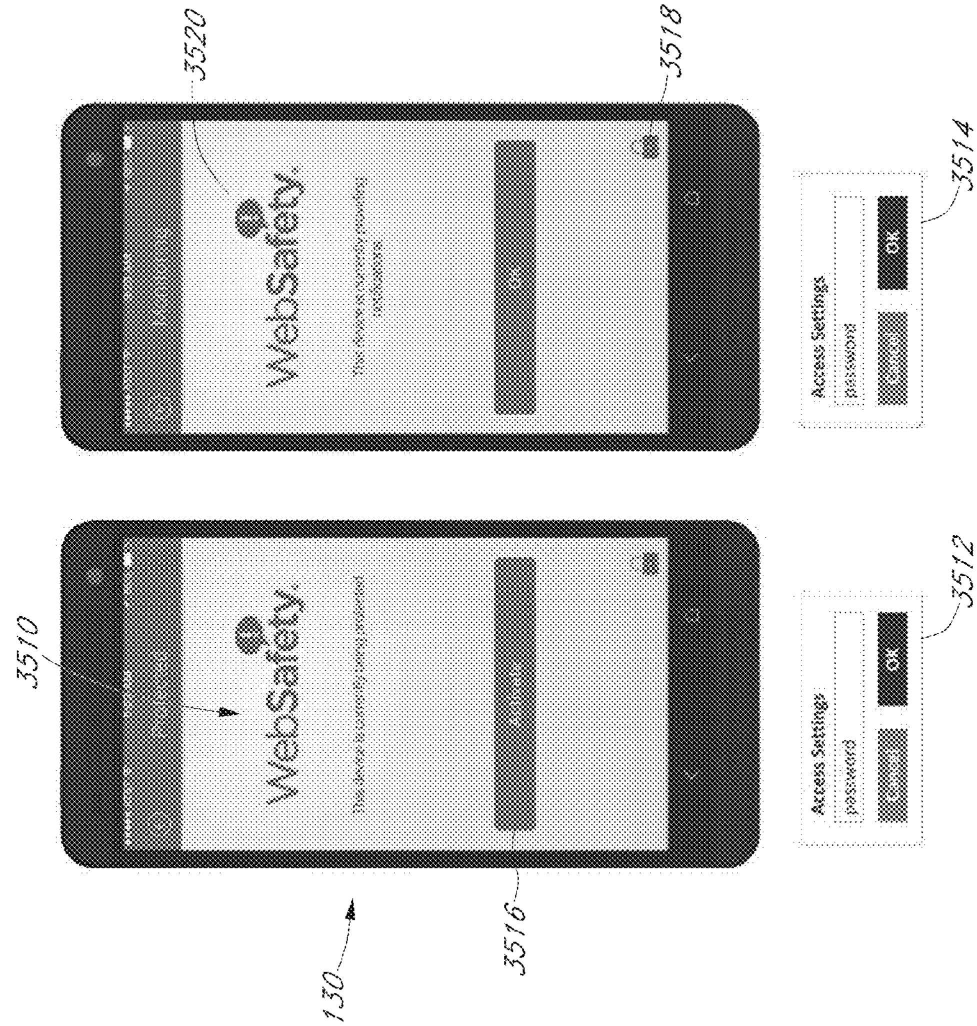
FIG. 35A illustrate an example user interface for activating a safety system on the computing device.
FIG. 35B illustrates an example user interface generated by a safety system 110 indicating status of a safety system on a particular user system 130.

FIG. 35A illustrates an example user interface 3510 for activating the safety system on the computing device. For example, users can activate software including components of the safety system 110 using the active link 3516. In some embodiments, the safety system 110 can include one or more authentication mechanisms for enabling and disabling some or all of the features of the safety system 110 on a user system. Parents can use password authentication 3512 or fingerprint or any other biometric authentication (not shown) to activate the software on the child's user system 130. Parents can also enable or disable, remotely over a network, some or all of the features of the safety system 110 on their child's user system. Accordingly, in some embodiments, the safety system 110 can require authentication from parents on their user system 130 to ensure safety and privacy protection of children. In the event that a parent's user system 130 is lost or stolen, the authentication mechanism provided by the safety system 110 can protect privacy and safety of children. Parents may also be able to remotely disable their own user system 130 which was lost or stolen using the safety system 110. In some embodiments, device status user interfaces may be generated as described herein with respect to Device Status Agent.

FIG. 35B illustrates an example user interface 3520 generated by the safety system 110 indicating status of the safety system 110 on a particular user system 130. The status can indicate that the device is currently providing notifications and/or monitored. To exit or disable safety system 110 on the user system 130, users can select active link 3518 which may prompt authentication mechanism 3514.

FIG. 36 illustrates an example user interface 3630 generated by the safety system 110 indicating that the user system 130 is in curfew mode. As discussed with respect to FIGS. 4, 19, 50A, and 50B, for example, the safety system 110 can disable all or some of the functionalities of a computer device 130 based on customizable curfew settings including curfew time period selected by parents using the safety system 110. The curfew settings can be stored in the data repository 140. The safety system 110 can access curfew settings over the network 102. Accordingly, the safety system 110 can automatically enable and disable curfew mode based on the stored curfew settings. In some embodiments, the safety system 110 enables curfew mode in real time based on a command received from a parent's user system 130. Thus, parents may use the safety system 110 to enable curfew mode instead of taking the phone away from the children.

In some embodiments, the safety system 110 inhibits all of the functionalities of the user system 130 when curfew mode is activated. In some embodiments, the safety system 110 can permit voice calls to a preselected group of individuals including emergency numbers using link 3632 in curfew mode. The safety system 110 can prevent bypassing the curfew screen 3630 by using authentication processes described above. In some embodiments, the safety system 110 can block features of the user system by accessing the boot module of the operating system running on the user system 130. The safety system 110 may also generate notifications when a user (for example child) attempts to bypass the curfew screen 3630. The safety system 110 can transmit the notifications to parent's user system 130.

In some embodiments, the safety system 110 can automatically enable curfew mode when the child is driving. The safety system 110 can determine the speed at which the user system 130 is moving and enable curfew mode when the speed exceeds a threshold. The threshold can be 25 mph.

XXI. Example Dashboard User Interface

FIG. 37 illustrates an embodiment of a dashboard user interface 3700 generated by the safety system 110. This dashboard interface 3700 can include functionality similar to, in addition to, or as alternative to embodiments described herein with respect to FIGS. 10A, and 11, 39, and 41, for example. In some embodiments, the safety system 110 can aggregate monitoring data from multiple sources in one place—a dashboard user interface such as the interface 3700. Thus, parents can efficiently review data regarding their children's smartphone usage, including messages third parties send to their children, by accessing and viewing the dashboard user interface 3700. The safety system 110 can visually sort data in the dashboard user interface 3700 based on one or more criteria. For example, the safety system 110 can display notifications according to a timeline 3701 as illustrated in FIG. 37. The safety system 110 can also highlight relevant portions (for example words like "drunk" or "pregnant") of the notifications. In some embodiments, the safety system 110 can summarize each day's notifications in an alert summary bar 3730. The alert summary bar 3730 may include an indication of how many recent notifications have been generated related to one or more of the following categories, with a number displayed in association with icons representing the source and area of the alerts as follows: application software 3732, SMS 3734, internet (www) 3736, map 3738, and curfew 3740. Many of the views and interfaces illustrated herewith show numbers representing alerts; it can be helpful to set off the number against a visually contrasting background to make it more likely to be noticed and visible to a user.

The timeline 3701 of FIG. 37 is particularly data rich, because it integrates information from various aspects of a safety system 110. It uses icons at the left to identify the source of the various alerts, while still sorting them chronologically. The icons include a clock, designating a curfew action, stacked stylized conversation bubbles to designate an alert sourced to a text message, a stylized grid indicating a new potentially harmful software application was installed, and a stylized globe showing a website was visited. The icons can be selectable and immediately transform the view visible to a user to a more detailed summary of the relevant aspect of the safety system 110. The timeline can continuously or periodically refresh, allowing the newest alerts and information to remain in the view most immediately available to the user, but allowing a user to scroll down for a more complete history, with downward scrolling taking the user farther and farther back through a recorded history of previous alerts and other information. A similar chronological organization can be presented in an image section such as the photos summary 3760. In some embodiments, one or more of the portions 3701, 3742, 3750, and 3760 can be virtually untacked from their currently-illustrated positions and their positions and prominence in the view can be interchangeable. In some embodiments, a similar function can be accomplished by dynamically visually emphasizing one of the four at the left when it is selected, while simultaneously de-emphasizing the other three by displaying them to the right.

The safety system 110 can also generate a location status 3742 of the child and include it in the dashboard interface 3700. For instance, the dashboard interface 3700 can include a map with a location status 3742 of the child's user system. In some embodiment, parents may use the safety system 110 to activate the GPS module in the child's user system remotely to get a better location of the child's user system. The safety system 110 can monitor a status of the child's user system 130, including status of communications module of the device 130, as indicated in the device status portion 3750 of the dashboard interface 3700. The communications module of the device can include data connection, GPS, or NFC. The safety system 110 can poll the device 130 for status of its modules. In some embodiments, a module of the safety system 110 resident on the child's user system 130 (e.g., a plugin 132) can monitor the status of the user system 130 by polling the operating system of the user system 130 or by directly accessing particular hardware or software modules of the user system 130. The safety system 110 can include the status 3750 of the child's user system in the dashboard user interface 3700.

The dashboard user interface 3700 generated by the safety system 110 can also include a photos summary 3760 related to a child. As discussed above, the safety system can mine a child's user system for photos taken, sent or received via the child's user system 130. In some embodiments, the safety system 110 can intercept the photos and/or videos taken from the memory of the user system 130 before they are deleted by applications like Snapchat or by users of the user system. The safety system 110 can also mine through social networking data repositories to retrieve pictures and/or videos related to the child. The safety system 110 can use image recognition or use a child's password to obtain the photos and videos from the child's account. In some embodiments, the corresponding comments relating to the images are also retrieved by the safety system 110. Selecting the photos summary 3760 can change a view focusing on the photos that may be similar to FIG. 40, for example. Comments and other information regarding the photos may be available when the photo is selected in that more focused view. The safety system 110 can group photos retrieved from various sources described above in the photo summary section 3760. In some embodiments, the photos may grouped by relevance to child's safety. For example, the safety system 110 may selective display photos that may seem lewd, or is associated with a troublesome comment, or includes pictures of alcohol, etc. The photos may also be arranged in chronological order, arranged by source, etc.

The dashboard user interface 3700 generated by the safety system 110 can include a contacts summary bar 3720 that can illustrate a group of people who communicate with a user of a user system 130. For instance, the safety system 110 can monitor communications from the user system 130 and via social networking platforms as discussed herein. Based on the monitoring, the safety system 110 can determine a group of people that a child communicates with most frequently using various modes of communications. The safety system 110 can display this group of people with high communication frequency in the contacts summary bar 3720 as illustrated in FIG. 37. The safety system 110 can automatically remove parents or family members from this group of people, in some embodiments. The safety system 110 can retrieve pictures of people in that group for display in the contact summary bar 3720. The pictures may be retrieved from a person's social networking or phone profile (for example, using a designated contact photo). The safety system 110 may also calculate statistics (for example percentage communication) for the group of people as discussed more in detail with respect to FIG. 41.

Parents can also navigate between monitoring multiple children. For example, the safety system 110 can store monitored data for each of the children using respective computer devices in data repository 140. Based on the stored data, the safety system 110 can generate the dashboard user interface 3700. In some embodiments, the safety system 110 can distinguish notifications based on children. For example, parents can select a link 3702 corresponding to a first child or links 3706 and 3710 for second and third children, respectively, to access monitored data for each child. In some embodiments, the safety system 110 can indicate new notifications 3708 by superimposing numbers on icons representing particular children as illustrated in FIG. 37. The notification icon 3708 can indicate a number of new notifications since the dashboard was previously viewed, new notifications, in the last day, new notifications in a preceding amount of time designated by (and adjustable by) the user, etc.

Parents can share information from a dashboard view (or any of the disclosed views) with each other. For example, a screen shot from the parent portal can be automatically e-mailed to a spouse or saved for later reference or proof. When time, place, and activity tracking functions are combined as discussed herein, each child can have a single status indicator showing how the child's current location and activities (for example, phone usage) may or may not currently comply with a comprehensive schedule created by the parent or child, for example. Periods of non-compliance can be tracked and recorded. Children can compete with each other to achieve higher levels of schedule compliance and be rewarded with later curfews or other differences in allowed phone usage. The disclosed systems can automatically arrange and administer such beneficial competition because it tracks usage, timing, and location, as well as controls smart-phone lock-out and other curfew options. Thus, obedience and other desired behavior can be incentivized automatically using the system.

The safety system 110 can also include a sidebar 3770 to access other user interfaces generated by the safety system 110 as discussed with respect to FIG. 10A, for example. In some embodiments, the safety system 110 can generate a sidebar 3770 including an application summary link 3772, SMS summary link 3774; internet summary link 3776; location summary link 3778; curfew summary link 3780; picture summary link 3782; and community features summary link 3784. Parents can select one of the links in the sidebar 3770 to access a user interface corresponding to the selected link.

FIG. 37 is one of various figures illustrating how the disclosed systems, apparatus, and methods can automatically extract and assemble data from complex, moving electronic devices and assemble that data in organized and graphically efficient views. For example, the dashboard view of FIG. 37 can aggregate highly complex and data-rich information for various children (here, Billy, Jenny, and Johnny), and rapidly switch between views for each of the children. A timeline, a map, list of interlocutors, a device status, and a mosaic of images, all viewable at once on the same screen, and almost all of which actually represent live hyperlinks that lead to related webpages, content, and context. Thus, this graphical display allows efficient review and further access and information by a user of a parent portal. The dashboard assembles data in a highly organized and efficient manner, but also acts as a dashboard organizing active control functionality.

Figure 38:
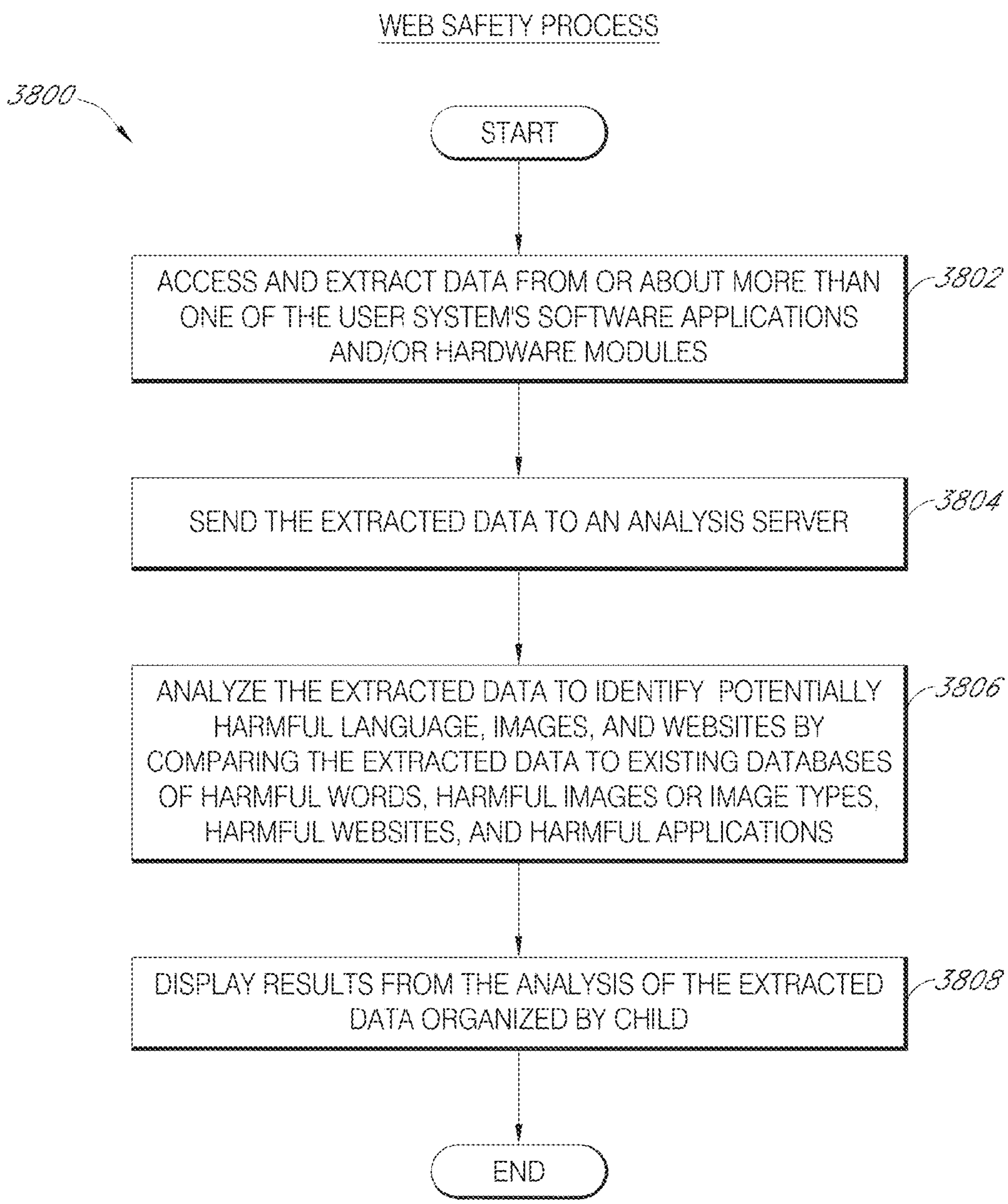
FIG. 38 illustrates an embodiment of a process for generating a dashboard user interface.

FIG. 38 illustrates an embodiment of a process for generating or refreshing a dashboard user interface 3700. As discussed herein, the safety system 110 can access and extract data from or about more than one of the user system's software application and/or hardware modules. The software applications can include a texting application, a social media application, an image application that facilitates transmission or reception of images, and a web browser application. Hardware modules can include location module or communications module or battery. In some embodiments, the extracted data can be sent to an analysis server. The analysis server can identify potentially harmful language, images, and websites by comparing the extracted data to existing databases of harmful words, harmful images or image types, harmful websites, and harmful applications. The generated results from the analysis can be sent to a parent portal for display such as that of FIG. 37.

Figure 39:
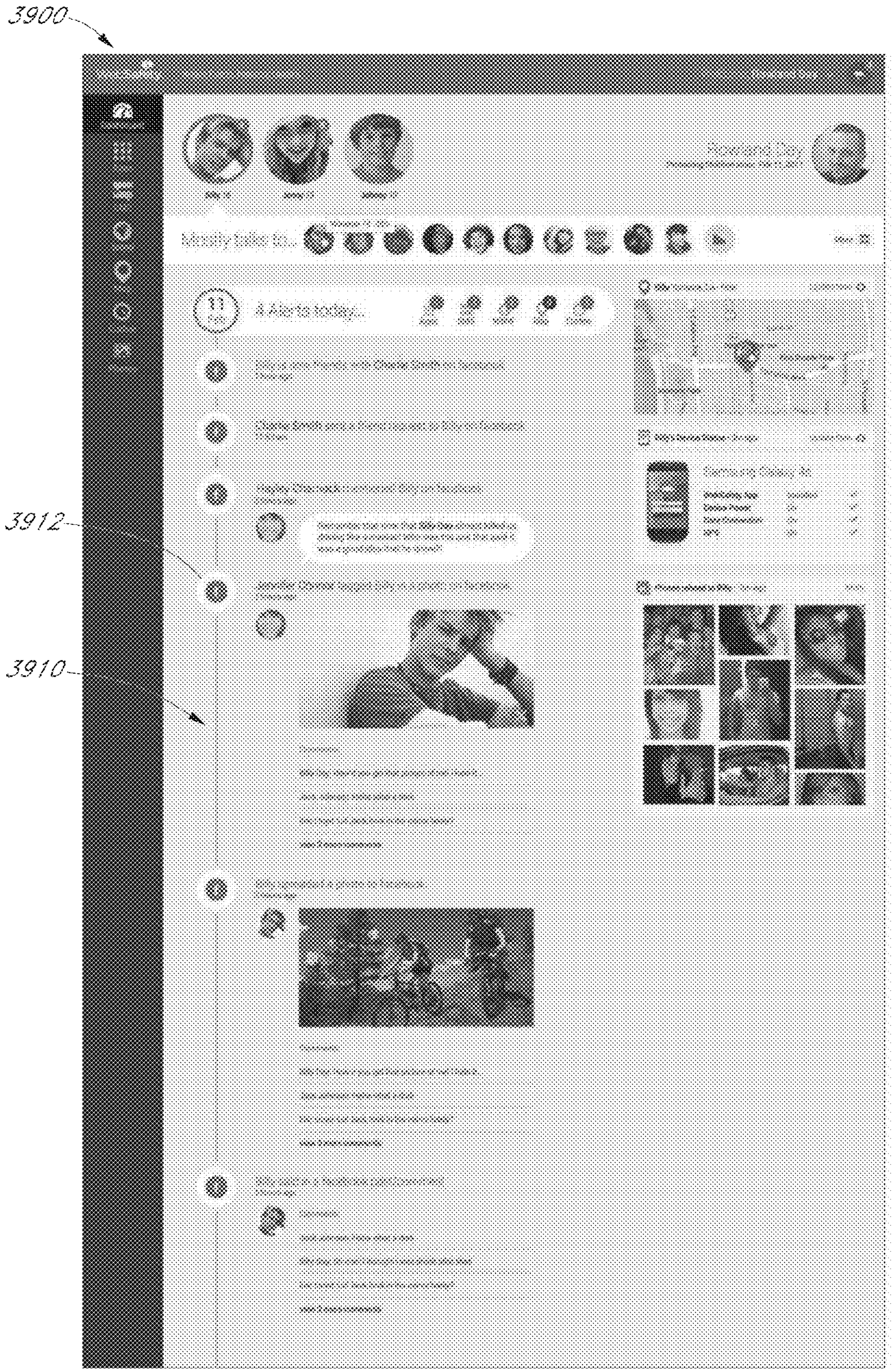
FIG. 39 illustrates another example view of a dashboard user interface.

FIG. 39 illustrates another embodiment of a dashboard user interface 3900 generated by the safety system 110. In the illustrated embodiment, the notifications are limited to Facebook notifications for a particular child ("Billy"). The safety system 110 can enable parents to review notifications corresponding to a particular application software or social networking website. For example, parents can select a particular application from a list of applications as described more in detail with respect to FIGS. 14, and 43-45. Using Facebook as an example, the safety system 110 can generate the dashboard user interface 3900 including Facebook related notifications. The safety system 110 can use aggregated Facebook data for a particular child stored in data repository 140. The icons at the left of the timeline view 3910 (e.g., Facebook icon 3912) can indicate the source of the information displayed. As with other timeline views discussed herein, text can be provided indicating how long it has been since the noted event occurred. A comment can be shown in a conversation bubble, and a photo or other identifier for a person making the comment can also be shown. As discussed herein, the safety system 110 can retrieve information from Facebook through an authentication handshake with Facebook servers and/or API.

Figure 40:
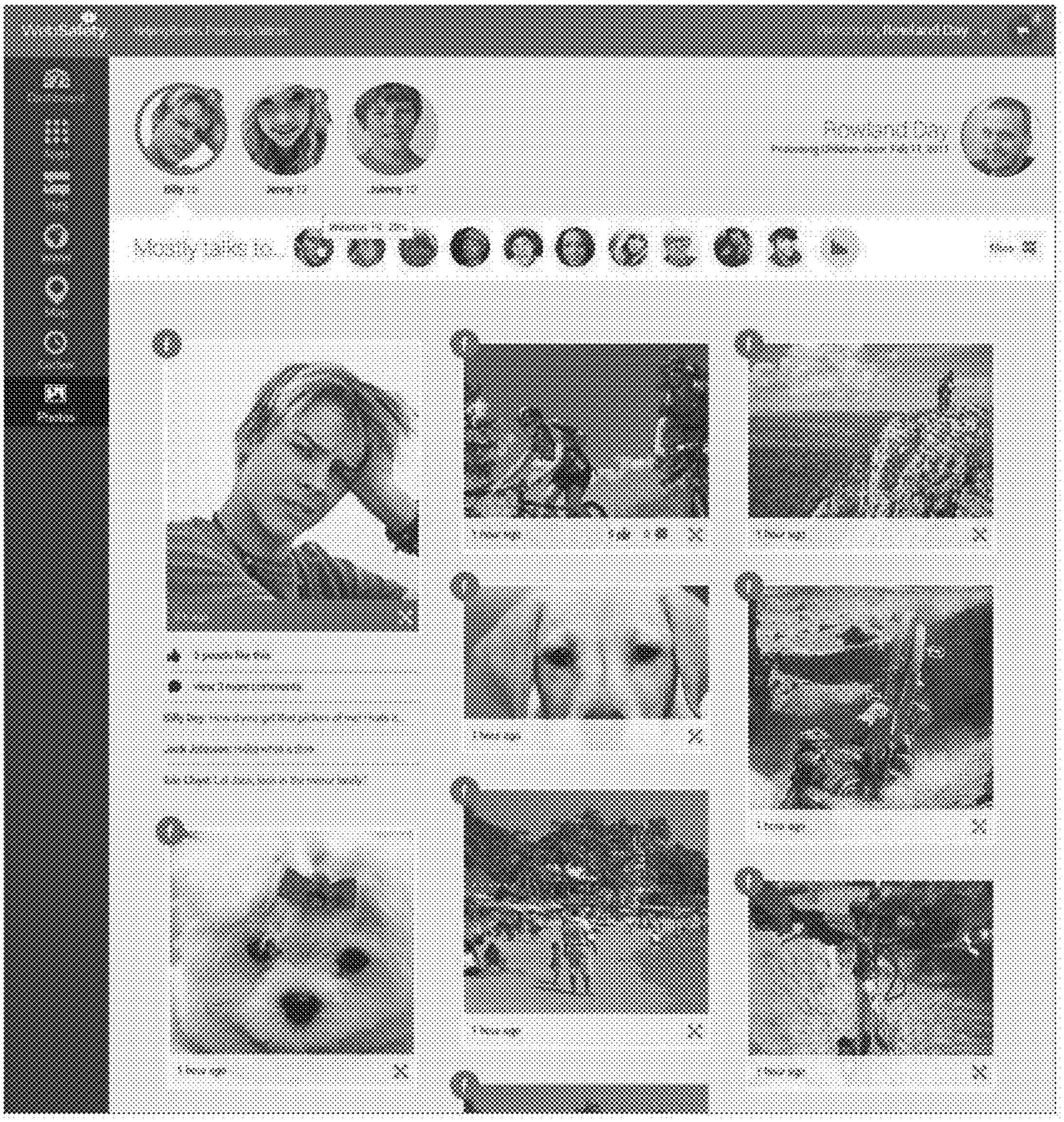
FIG. 40 illustrates a photo/video summary user interface.

FIG. 40 illustrates another embodiment of a photo/video summary user interface 4000 that can be generated by a safety system 110. In the illustrated embodiment, only pictures corresponding to Facebook are illustrated (as indicated here by the Facebook icon associated with each photo), but the safety system 110 can also include photos taken or downloaded on a child's computing devices or received via messaging, or from other social networking sources. Accordingly, parents can quickly browse pictures related to their child in one place. As discussed above, the photos can be organized according to threat relevance, or they can be organized chronologically, sortable by source, etc.

Figure 41:
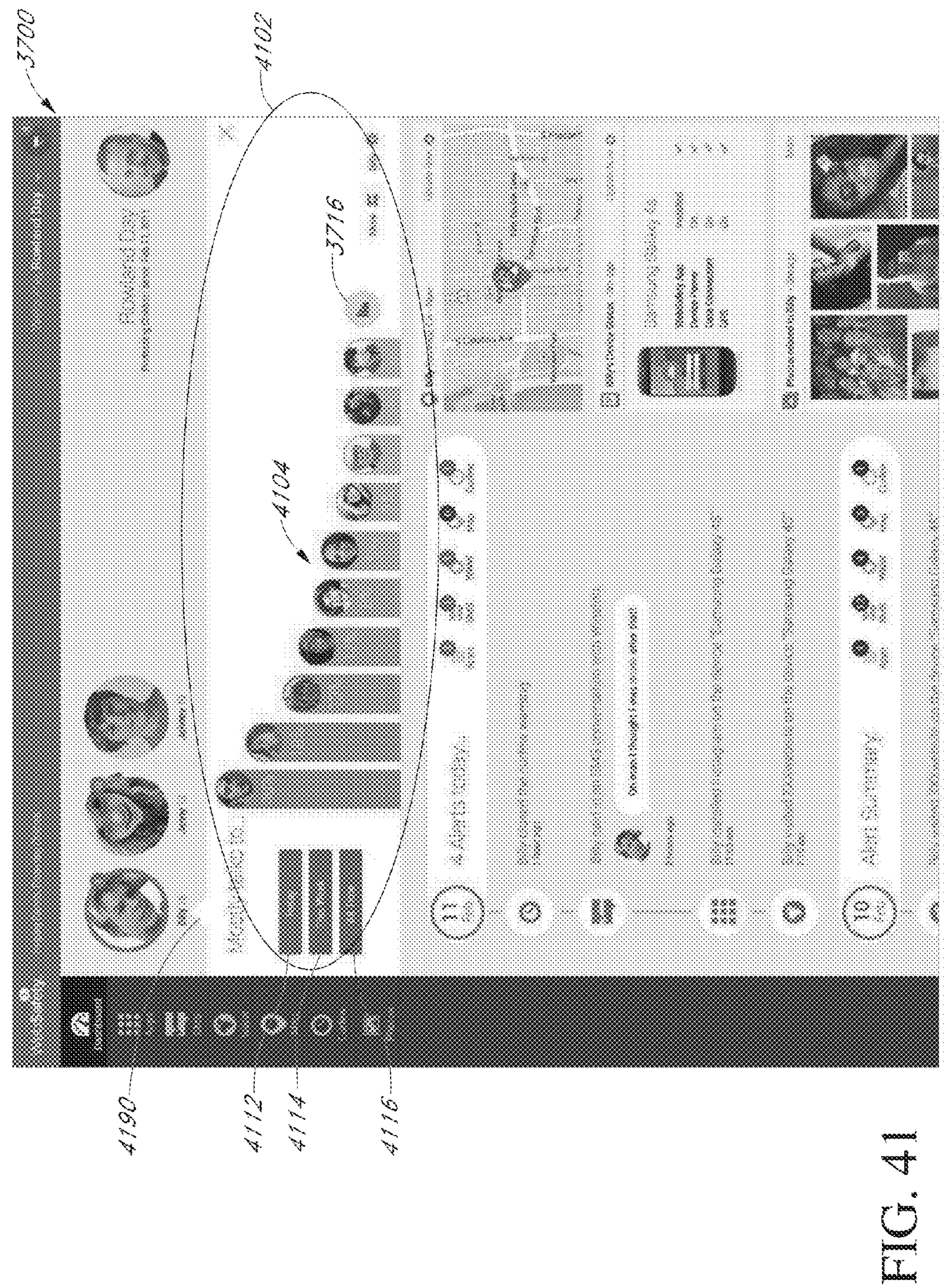
FIG. 41 illustrates a dashboard user interface that includes a contacts summary bar.

FIG. 41 illustrates an example dashboard user interface 3700 generated by the safety system 110 that includes a contacts summary bar 4102 that can display statistics directly on the user interface. The illustrated view of the contacts summary bar 4102 can be selected or otherwise controlled by a user such that the view toggles between that shown here and the more compact view illustrated for the contacts summary bar 3720 in FIG. 37. In the view of FIG. 41, the bar is expanded to show bar graphs indicating the relative frequency of communication with a set of people. This expansion and reduction—toggling between the versions showing in FIGS. 37 and 41—can be accomplished with a specific button or control. For example, the icon 3716 (which includes a stylized bar graph icon) can be selected to change this view. An "X" in the top right corner of the contacts summary bar 4102 can be used to close the expanded view, for example. In some embodiments (and as illustrated in this example), the bars in a bar chart can be capped with a photographic representation of these interlocutors, or with placeholders for such photographs. As discussed above with respect to FIG. 37, the contacts summary bar 4102 can include a group of people in communication with a user of the computing device 130. The safety system 110 can automatically generate graphs and sort this group of people based on the amount of interaction (calculated by number of communications, number and length of communications, or using other methods), including messaging via SMS, Snapchat, Facebook, WhatsApp, phone calls, etc. In some embodiments, the safety system 110 can assign weights to certain types of communication to determine a representative amount of interaction for comparison. For example, a child may send 100 messages per day to a first friend, but may spend half an hour on the phone per day with a second friend. The safety system 110 can appropriately weight the messages with the phone time to compare the time spent by the child with the first friend versus the second friend. Accordingly, parents can easily view a snapshot of who their children mostly interact with using their smart phone. In some embodiments, the user interface 3700 allows a user to select for comparison a subset of communications (for example text messages). Thus, rather than an aggregation of all communications, a visual comparison can be provided indicating with whom a child has the most frequent and/or longest lasting communications by a particular channel—e.g., SMS texts, e-mails, phone calls, etc. The safety system 110 can also allow a parent to select a time frame from which to draw the data for the statistical bar graph comparison (e.g., using the "today" button 4112, the "this week" button 4114, or the "all time" button 4116) as illustrated in FIG. 41. The graphs generated by the safety system 110 can be illustrated in a wide variety of forms. For example, in the illustrated embodiment, the safety system 110 generates a bar graph with each bar 4104 including a face profile of the relevant person (e.g., drawn from one of that person's social networking sites or profiles) and a communication metric (for example 40%, meaning that approximately 40% of Bill's total communications in the relevant time period have been with that person). In some embodiments, the size of the faces can be enlarged proportionally to the number of communications (e.g., as an alternative to including taller bars for the most frequently communicating parties). The example contacts summary bars 3720 and 4102 can both include a visual indication of which child's conversations are being summarized. In FIG. 41, a conversation feature 4190 is illustrated as pointing to the photograph of Billy. This causes the contact summary bar 4102 to resemble a stylized conversation bubble, indicating that Billy is conversing with the people shown. Billy's photo is also set off by a thicker border, providing an example of how a visual display can provide emphasis and draw attention to indicate which of the children's activities are being summarized in the current view.

FIG. 41 (among others) illustrates how the disclosed systems, apparatus, and methods can automatically extract and assemble data from complex, moving electronic devices and assemble that data in organized and graphically efficient views.

Figure 42:
FIG. 42 includes a notification summary user interface generated by a safety system.

FIG. 42 includes a notification summary user interface 4200 generated by the safety system 110. The notification summary user interface 4200 can include a number of notifications sorted according to child and time, with headings for each day as shown.

Figure 43:
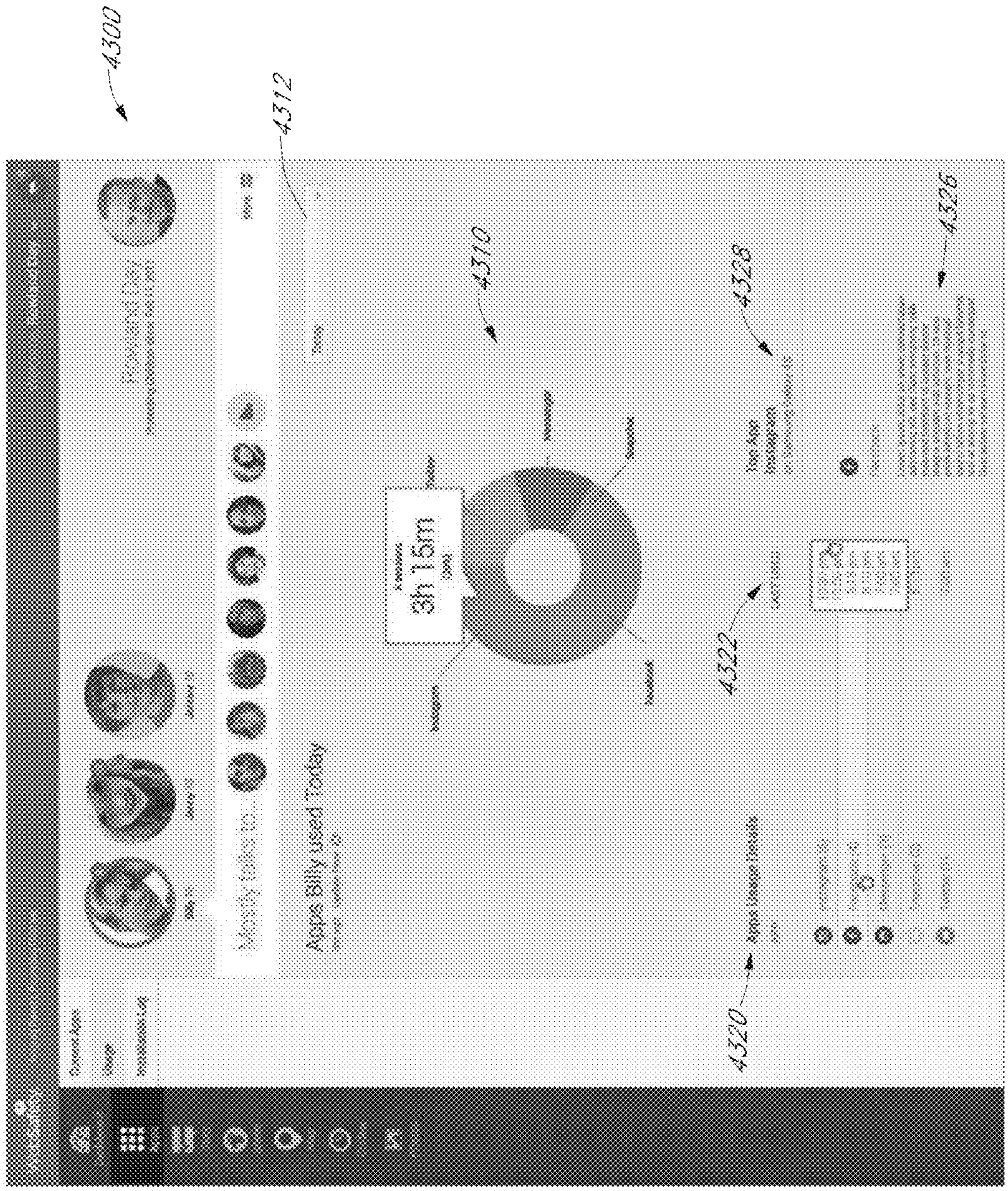
FIG. 43 illustrates an application usage interface.
Figure 44:
FIG. 44 illustrates a current applications interface.
Figure 45:
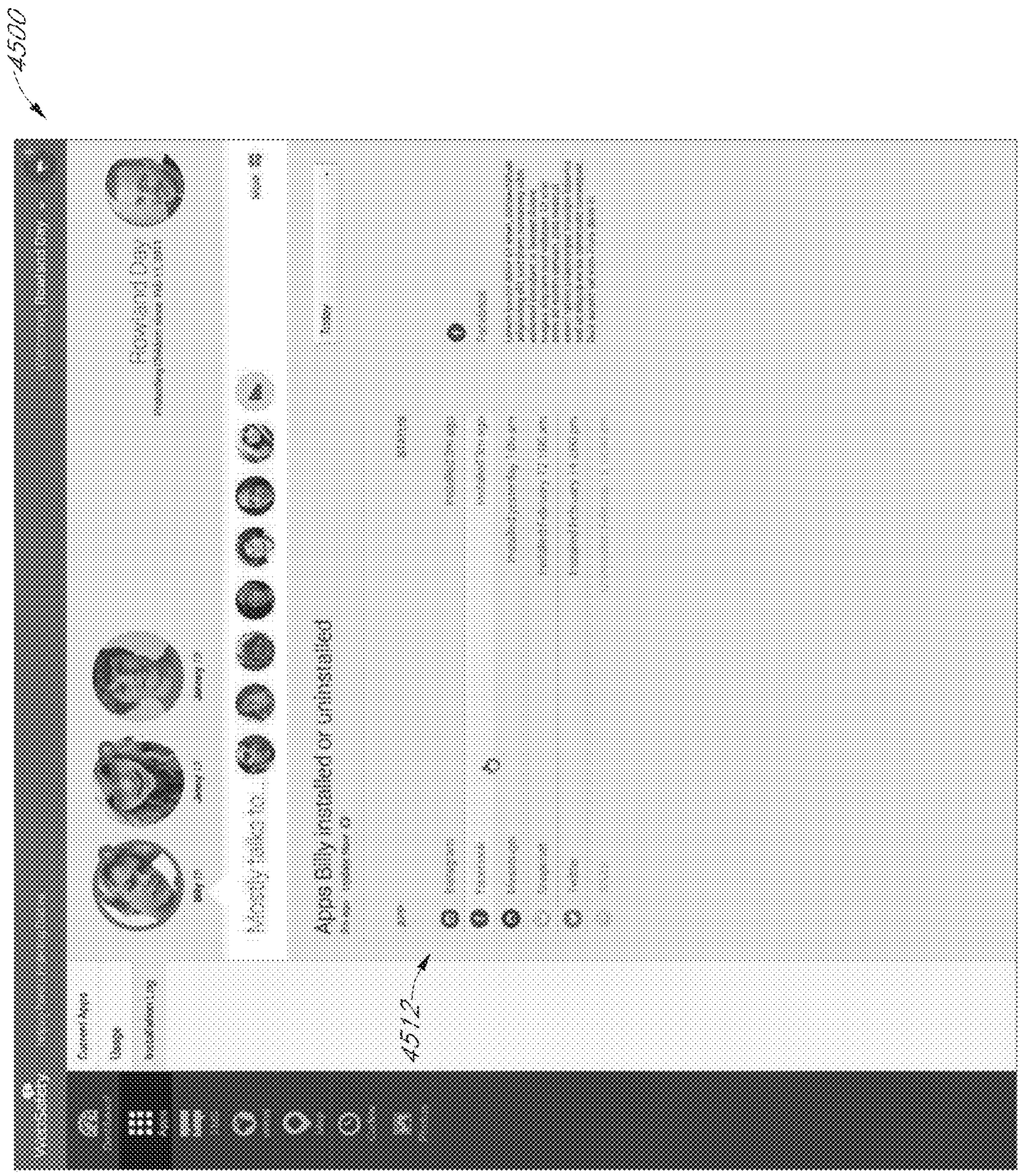
FIG. 45 illustrates an application installations interface.

FIGS. 43-45 illustrate embodiments of application summary user interfaces generated by the safety system 110. For example, FIG. 43 illustrates an application usage interface 4300 including a graph 4310 showing usage statistics of application software on a child's user system 130. The safety system 110 can retrieve statistics stored in a data repository (e.g., user parameters 140 of FIG. 1) based on monitoring as discussed above. In some embodiments, the graph 4310 can include a pie chart as illustrated in FIG. 43. This pie chart or an alternative display showing application usage can also be included on a dashboard view (in place of or in addition to the portions 3742, 3750, and/or 3760 of FIG. 37, for example). The graph 4310 can also include (or be replaced by) a bar chart or other graphs suitable for displaying percentage usage of different software applications. The safety system 110 can monitor application usage based on one or metrics. For instance, the safety system 110 can monitor usage based on tracking the amount of time a particular application is running, open, and/or visible to a user on the display of the user system. Other metrics can include amount of data used or number of messages sent. In some embodiments, applications running in the background or running while a smartphone is in sleep mode can be not included as "used" during that time period; similarly, use can be defined to require that a child has been either actively viewing or interacting with them to count as being "used." The safety system 110 can also provide a time period selector 4312 for parents to review application usage over a particular time period. The safety system 110 can determine an application most frequently used by the child ("Top App" 4328) on the user system 130 in the relevant time period and include it in the generated application usage interface 4300 as shown. The usage interface 4300 can also include an application usage listing 4320 with a last used time 4322 indicating when an application was last accessed. The safety system 110 can retrieve this data stored as part of monitoring the user system 130 in a data repository (e.g., user parameters 140 of FIG. 1). The safety system 110 can also retrieve a stored description 4326 of an application from a data repository (e.g., system parameters 150 of FIG. 1). The stored description 4326 may be automatically obtained based on description from other parents or application store.

FIG. 44 illustrates a current applications interface 4400 generated by the safety system 110. As discussed above, the safety system 110 can identify applications of concern installed on a child's user system 130. In some embodiments, the safety system 110 polls the operating system of the user system 130 to identify installed applications. The safety system 110 can store the applications in the data repository 140. When new applications are installed and existing applications are deleted, the safety system 110 can update the list of applications stored in a data repository (e.g., user parameters 140 of FIG. 1). Further, the safety system 110 can also maintain a list of application software, its ratings, and description in a data repository (e.g., system parameters 150 of FIG. 1). The list can be updated based on community feedback. Using the stored data, the safety system 110 can generate the current applications interface 4400. In some embodiments, the current applications interface 4400 includes a list of "applications of concern" 4412. Further, the safety system 110 can also provide a description 4420 for each of the applications of concern in some embodiments, which may be generally hidden until a particular application or related icon is selected, for example. As illustrated, the safety system 110 can also sort applications between those of concern and others which are also installed on the user system 130, but which may not be known for posing potential danger to children.

FIG. 45 illustrates an application installations interface 4500 generated by the safety system 110. As discussed above, the safety system 110 can track installation and removal of application software on the child's user system 130. Further, the safety system 110 may store the time an application was installed or removed in a data repository (e.g., user parameters 140 of FIG. 1). Based on this stored data, the safety system 110 can generate the application installations interface 4500 including a listing 4512 of applications installed or removed and the corresponding time that the child took that action.

Figure 46:
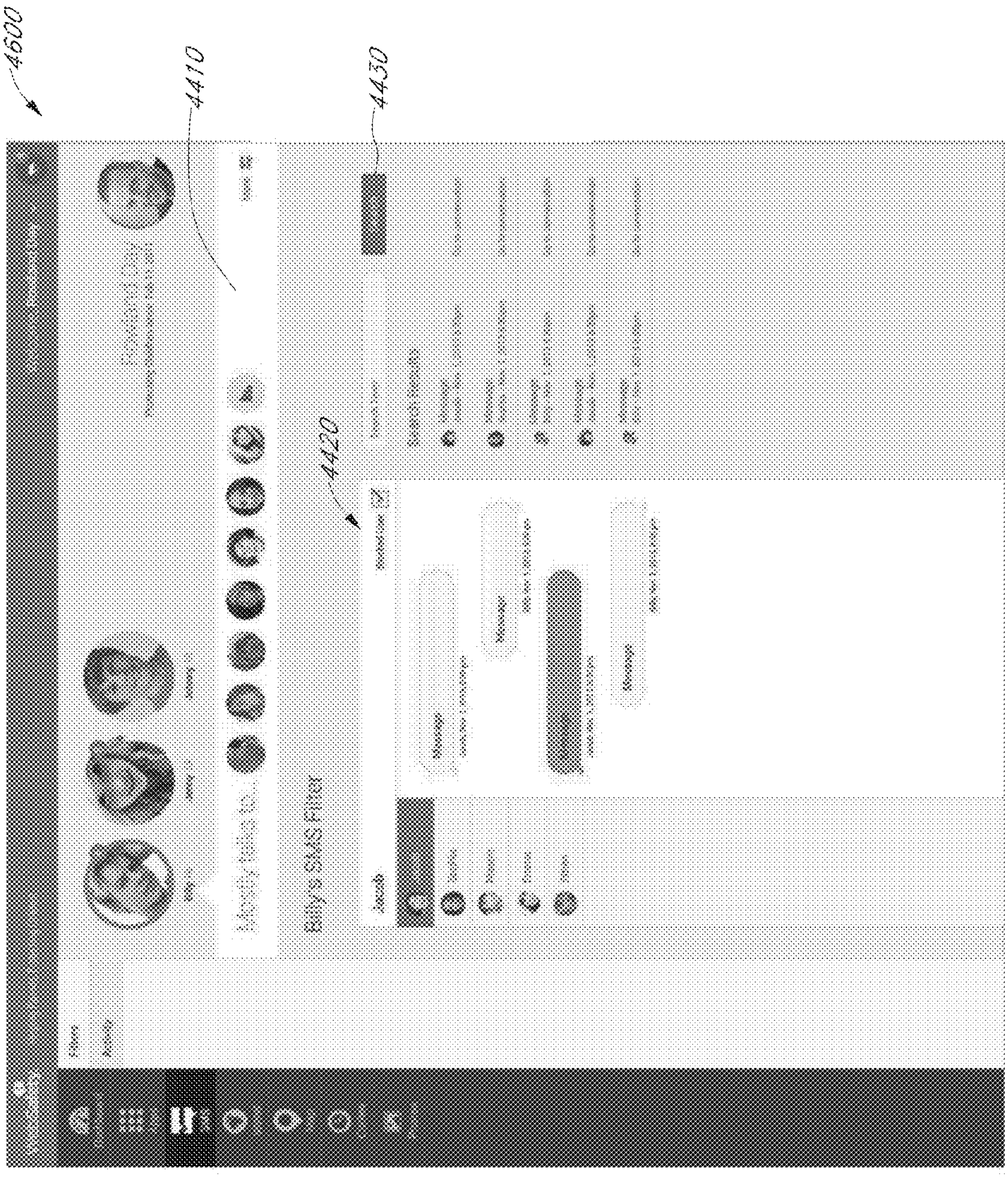
FIG. 46 illustrates an embodiment of an SMS activity interface.

FIG. 46 illustrates an embodiment of an SMS activity interface 4600 generated by safety system 110. This example may provide functionality similar to that discussed with respect to FIG. 16. As discussed with respect to FIGS. 15 and 16, for example, the safety system 110 can monitor and store messaging communications originating from or received at each of the child's user systems 130. In some embodiments, the analysis module of the safety system 110 can identify messages of concern as discussed above. The safety system 110 can aggregate messages of concern based on the child and the contact person. In the illustrated SMS activity interface 4600, messages from Billy to Jacob are shown as per a user's selection. While all messages related to a contact may be included in the SMS activity interface 4600, the safety system 110 can sort through the messages to include only messages of concern. Further, words of concerns may be highlighted by the safety system 110 in the messages. In some embodiments, the safety system can include a blocked indicator 4420 to show whether a particular contact related to the message is blocked. Parents may select a contact for blocking using the indicator 4420. The safety system 110 can intercept messages from blocked contacts and may not show the blocked messages to the child until reviewed by parents. In some instances, the safety system 110 can automatically block messages based on content and display it in the SMS activity interface 4600 for parental review. In some embodiments, the safety system 110 can automatically block the contact such that messages cannot be received or sent to the contact based on detecting content of concern in messages. The safety system 110 can also detect if the number of the blocked contact or a method of communication with the blocked contact has changed. Accordingly, the safety system 110 can prevent blocked contacts or users from circumventing the system. The safety system 110 can track if a message belongs to the same contact previously blocked based on continuity of conversation, the contact's phone ID (for example mail account, MAC address, etc.).

In some embodiments, the safety system 110 may modify the contact summary bar 4410 included in the SMS activity interface 4600. For example, the safety system 110 may organize and sort contacts in the bar 4410 based solely on SMS instead of other modes of communications discussed above with respect to FIG. 37. The safety system 110 can also include search toolbar 4430 to enable parents to search through messages communicated via the child's user system 130.

Figure 47A:
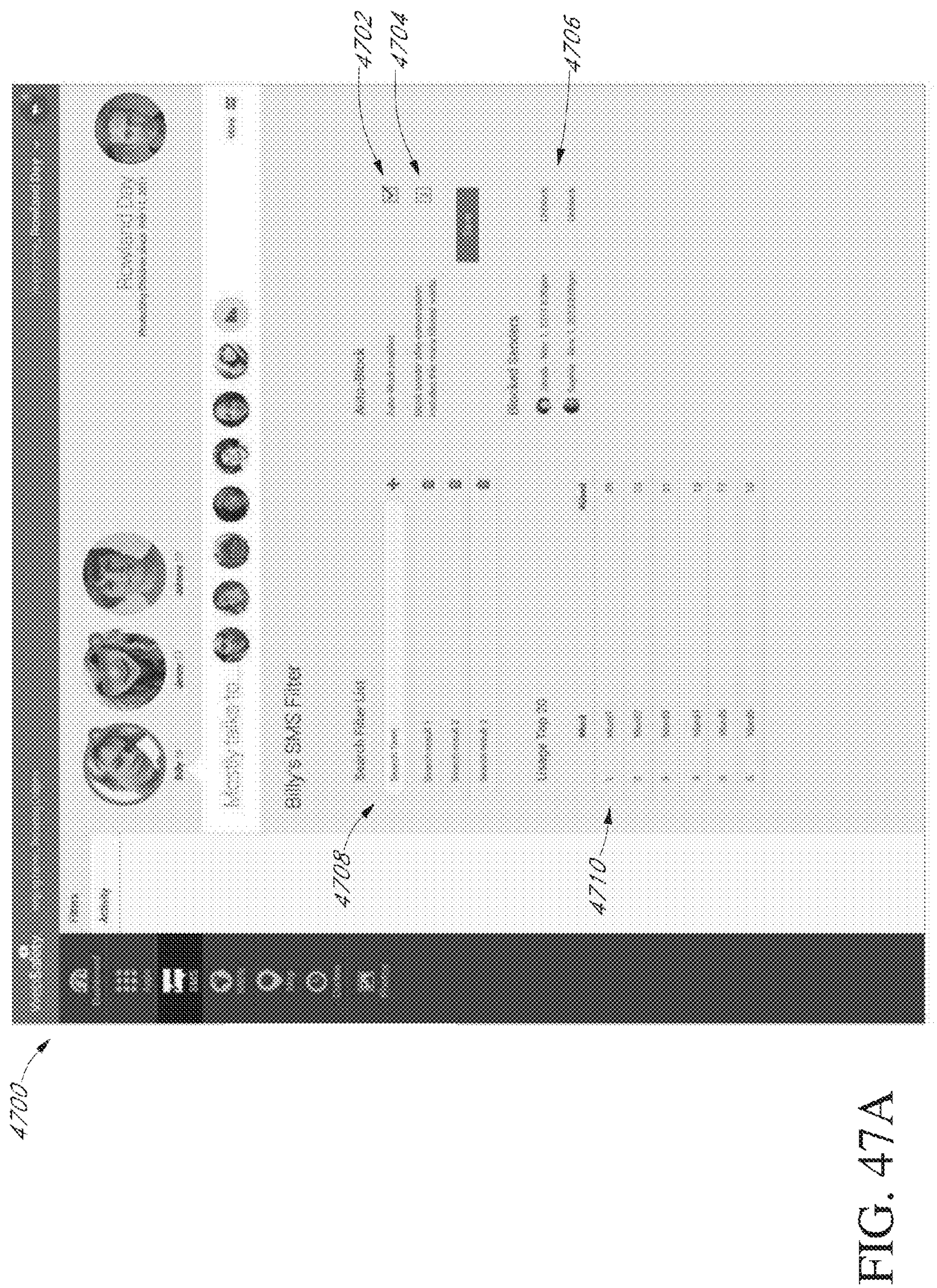
FIG. 47A illustrates an embodiment of an SMS filters interface.
Figure 47B:
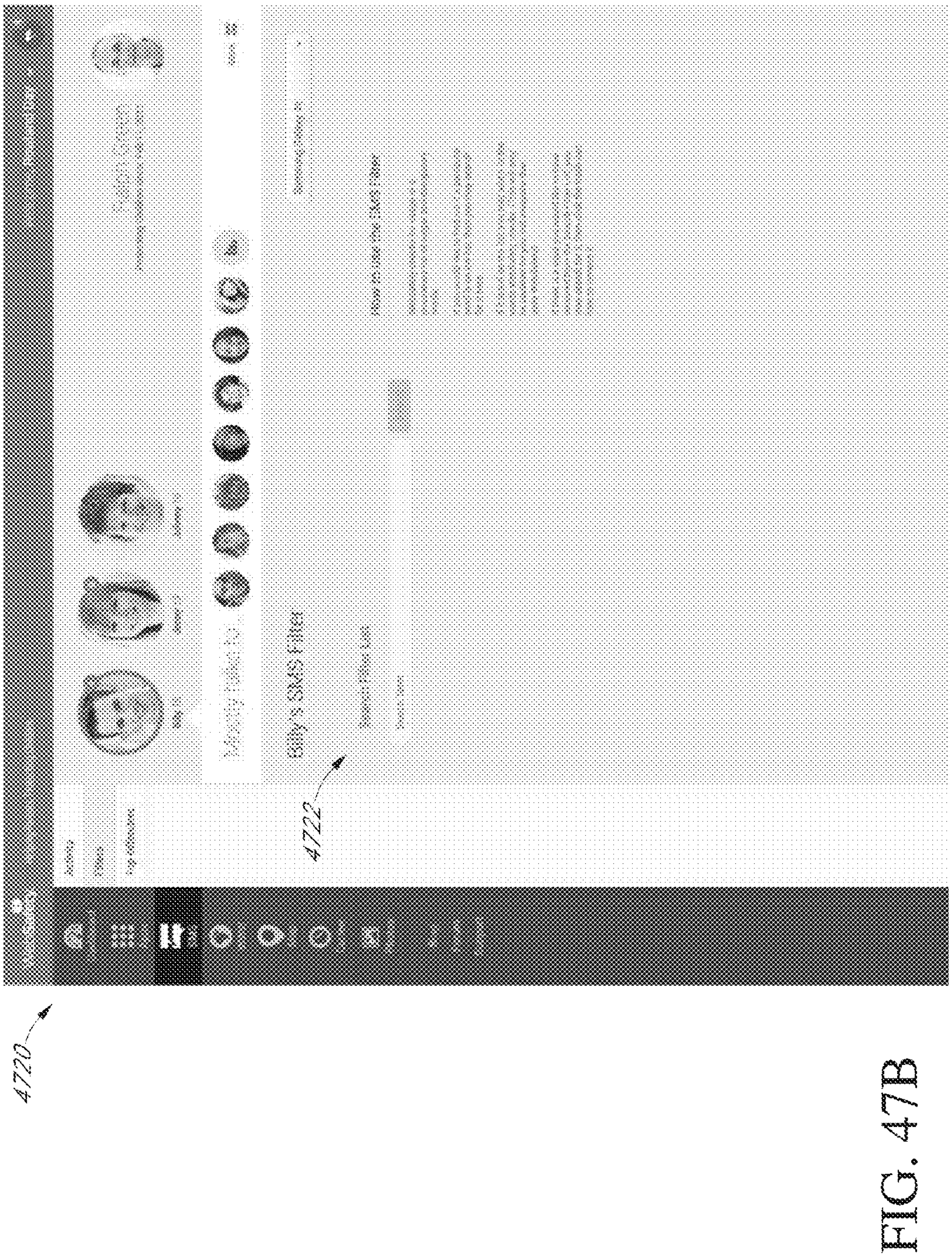
FIG. 47B illustrates another embodiment of an SMS filters interface.
Figure 47C:
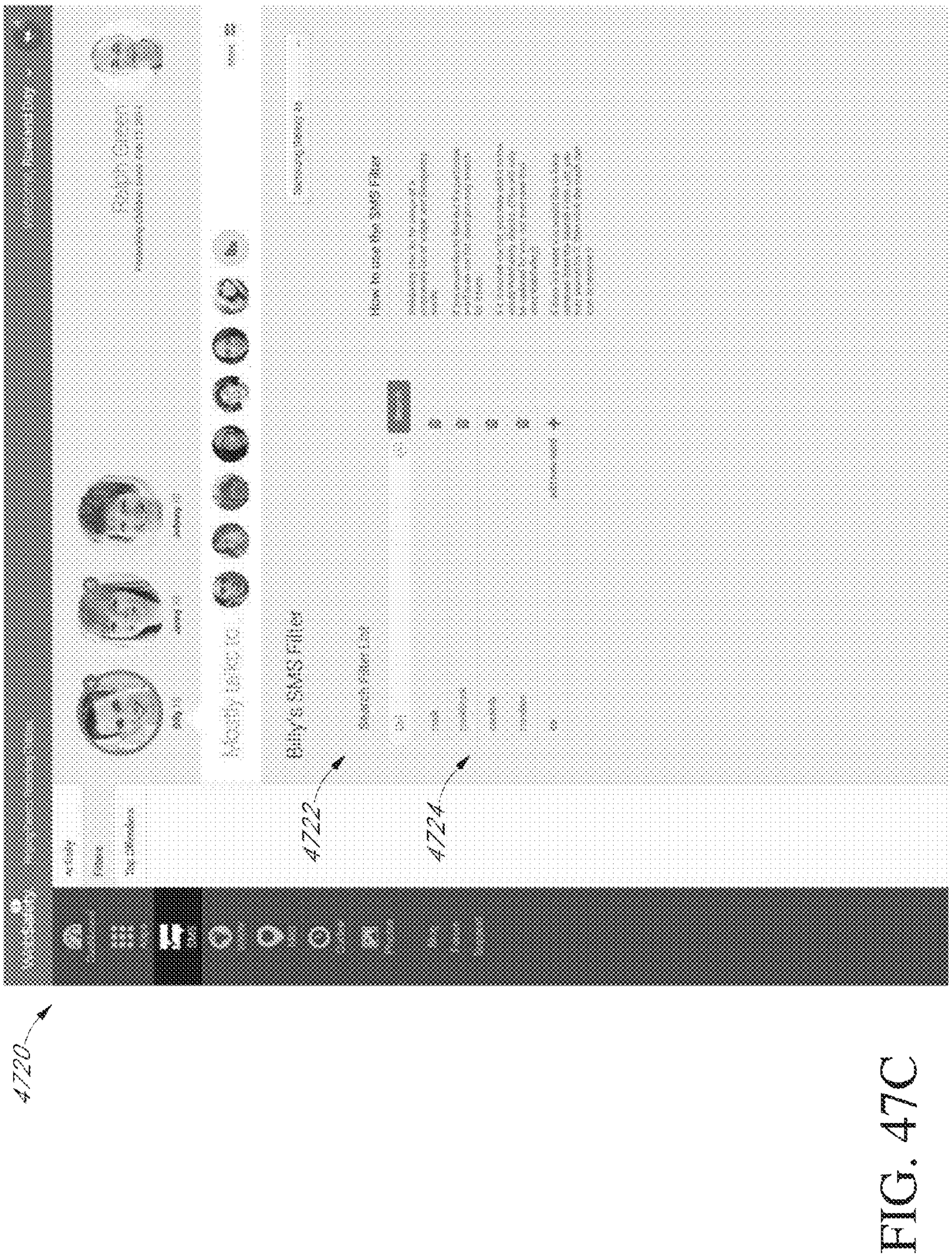
FIG. 47C illustrates search filters in the embodiment of SMS filters interface shown in FIG. 47B.
Figure 47D:
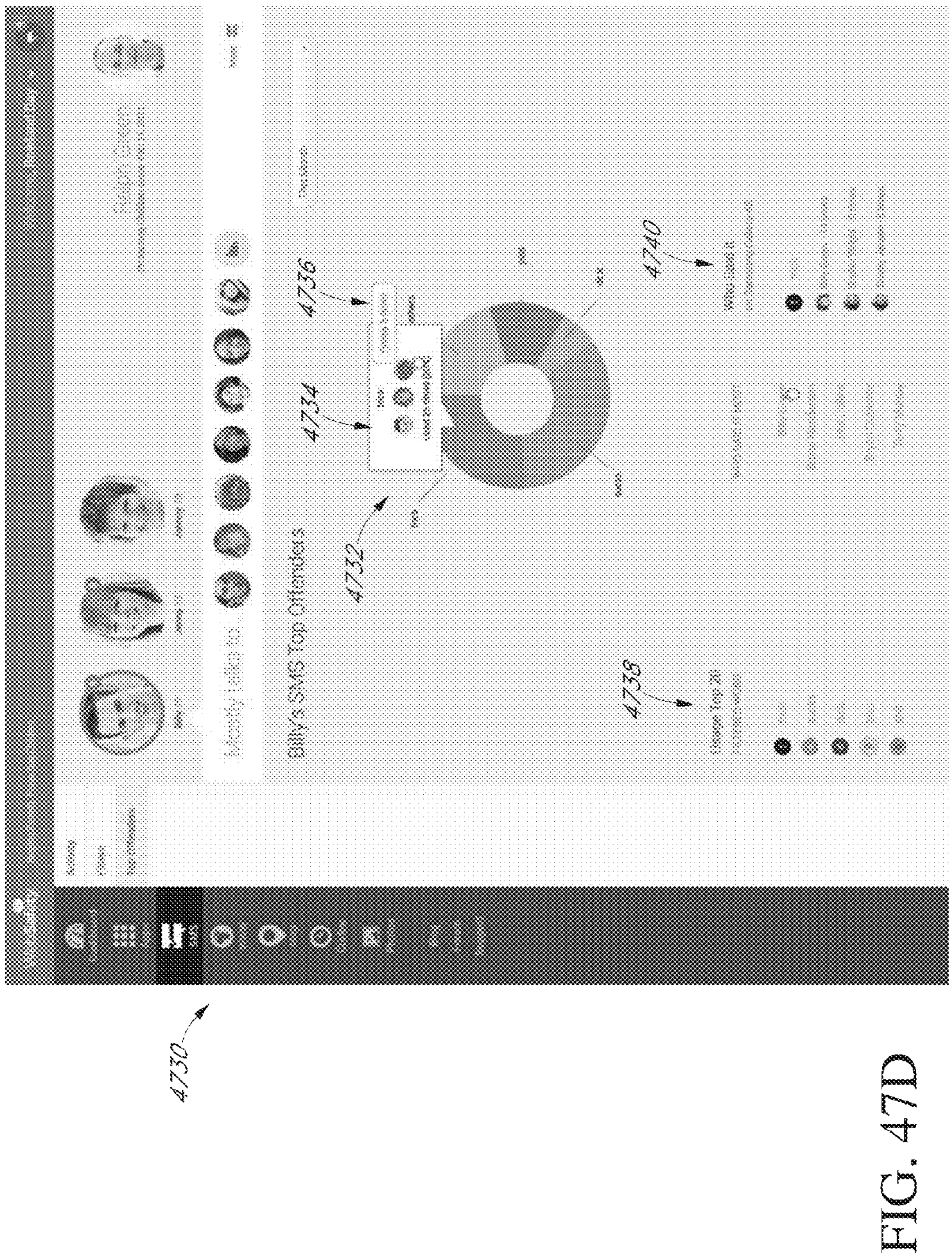
FIG. 47D illustrates an embodiment of an SMS analytics interface.

FIG. 47A illustrates an SMS filters interface 4700 generated by safety system 110. This example may provide functionality similar to that discussed with respect to FIG. 15. Parents can use the SMS filters interface 4700 to manage messaging communications (for example SMS) from their child's user system 130. As discussed above, the safety system 110 can auto block certain messages and contacts. In some embodiments, parents can modify auto block settings 4702 and 4704 via the SMS filters interface 4700. For example, parents can select a number of words of concern (or filtered words) 4704 before a contact is automatically blocked. The safety system 110 can include a list of blocked senders 4706 in the SMS filters interface 4700. FIG. 47B illustrates another embodiment of an SMS filters interface 4720 generated by safety system 110. The SMS filters interface 4720 can include a search filter list control 4722 to review whether a particular word is being monitored or filtered. As discussed, users can add words to the filtered words list stored in data store 140. FIG. 47C shows that, in one embodiment, when a user begins typing a particular word, the safety system 110 can retrieve words from the filter list similar to the typed word. Accordingly, the user can identify the words in the filter list based on their input. If the word is not in the filtered list, the user can add their inputted word into the filtered list. The safety system 110 can store the new word and include it in monitoring past and future communications.

FIG. 47C illustrates an embodiment of an SMS analytics interface 4730 generated by the safety system 110. The SMS analytics interface 4730 can generate overall summary based on SMS communications sent and/or received by one or more user systems 130 belonging to respective children. The SMS analytics interface 4730 can enable parents to visually identify SMS offenders and SMS related issues with respect to their children. For example, the safety system 110 can identify word usage frequency from the filtered list. In the illustrated embodiment, the top 20 words that are used in SMS communications from the filtered list are shown in a listing 4738. In some embodiments, the listing 4738 is sorted by usage frequency of words in the filter list. The listing 4738 may identify a user associated with the word. For example, the listing 4738 may identify the user who has received and/or sent the offensive word with the highest frequency compared to other users. The listing 4738 may also include an icon identifying the source of the word. For example, the icon can include a symbol or color corresponding to one of the applications, such as Facebook, SMS, etc. In some embodiments, when a particular word is selected from the list 4738, the safety system 110 can show additional details 4740 related to the selected word. A word can be selected based on clicking on it or hovering over it. Additional details 4740 can include a listing of users associated the selected word and the corresponding frequency of usage. In addition to the listing 4738 and details 4740, the safety system 110 can generate a graphical summary 4732 to visually organize SMS summary. In one embodiment, the graphical summary 4732 is a pie chart illustrating a distribution of offensive word usage frequency. In the illustrated example, "sucks" is the most frequently used offensive word in the SMS communications, which may include sent and/or received SMS messages. The safety system 110 can generate additional details 4734 when a particular word or a graphic element corresponding to the word is selected. As discussed above, selection may be a function of a click or a touch input or hovering over the area of interest. As shown, the additional details 4734 can visually show children associated with the selected offensive word. In the illustrated embodiment, the safety system 110 shows a pictorial representation of Billy, Jenny, and Johnny for being associated with the offensive word "frick." The safety system 110 can show a graphic 4736 when Johnny is selected. The graphic can indicate that Johnny used the offensive word "frick" 5 times. The safety system 110 can enable customized analysis of SMS data. For example, in some embodiments, parents may be able to generate graphs 4732 based on selecting one or more of the following factors: sent messages, received messages, one or more children, time period, etc.

In some embodiments, the safety system 110 can enable parents to define their own custom rules 4708 for filtering messages. For instance, parents can select certain words (for example "drunk") or terms and connectors ("drunk" near "driving"). The safety system 110 can use these custom rules to filter messages. The safety system 110 can also track word usages and include a listing of most used words in a list 4710 as illustrated. The safety system 110 can employ image recognition or optical character recognition to prevent contacts from using picture in messages to avoid bypassing filters.

Figure 48:
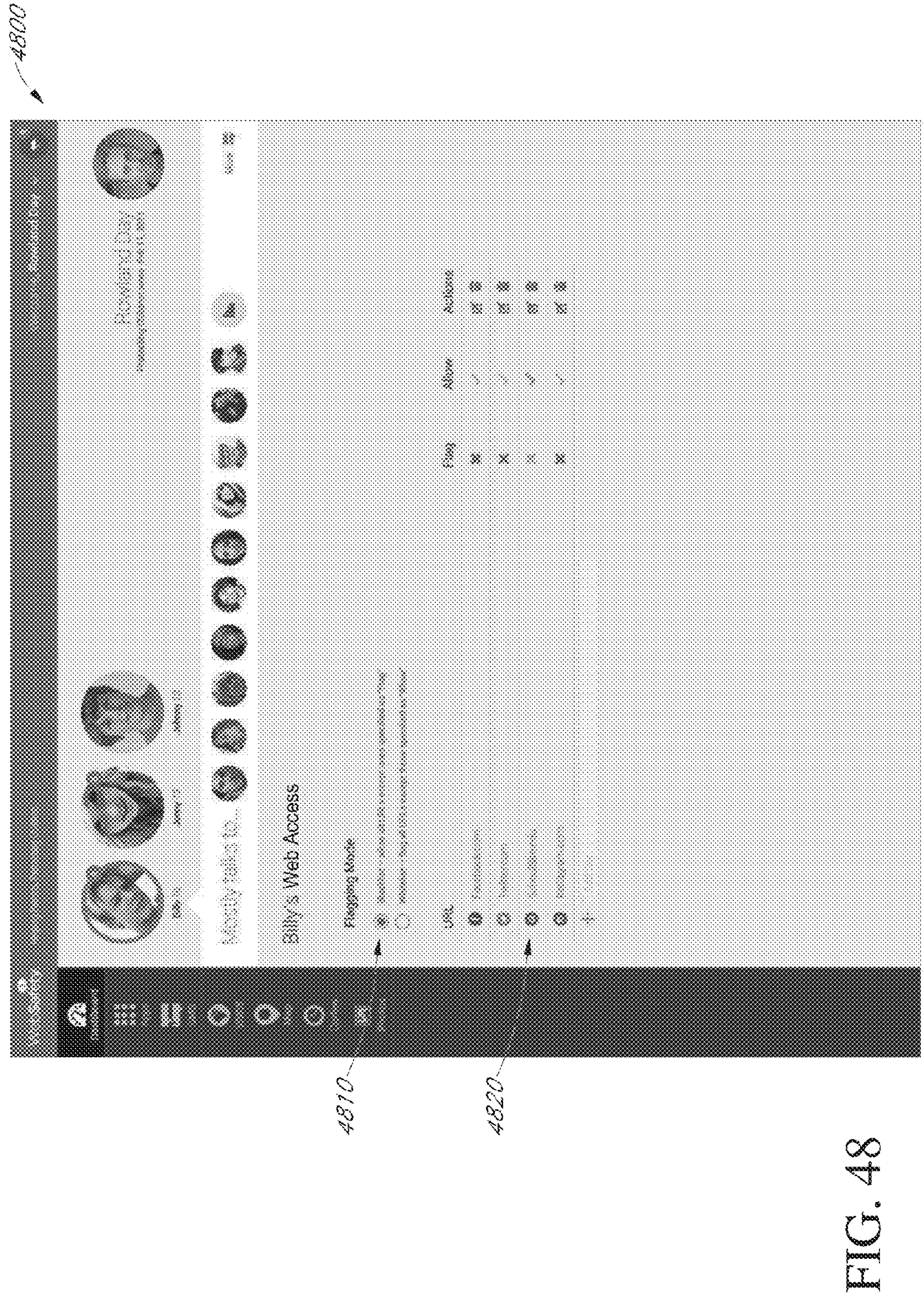
FIG. 48 illustrates a web access interface.

FIG. 48 illustrates a web access interface 4800 generated by safety system 110. This example may provide functionality similar to that discussed with respect to FIG. 17. The web access interface 4800 can provide parents options to control which websites can be accessed on child's user systems 130. For example, parents can select a flagging mode 4810. Based on the selected flagging mode, the safety system 110 can block a list of problem websites and/or flag these list of problem websites. The safety system 110 can allow parents to input the list of problem websites as illustrated at 4820. In some embodiments, the safety system 110 can automatically suggest problem websites based on collaborative feedback from users.

Figure 49A:
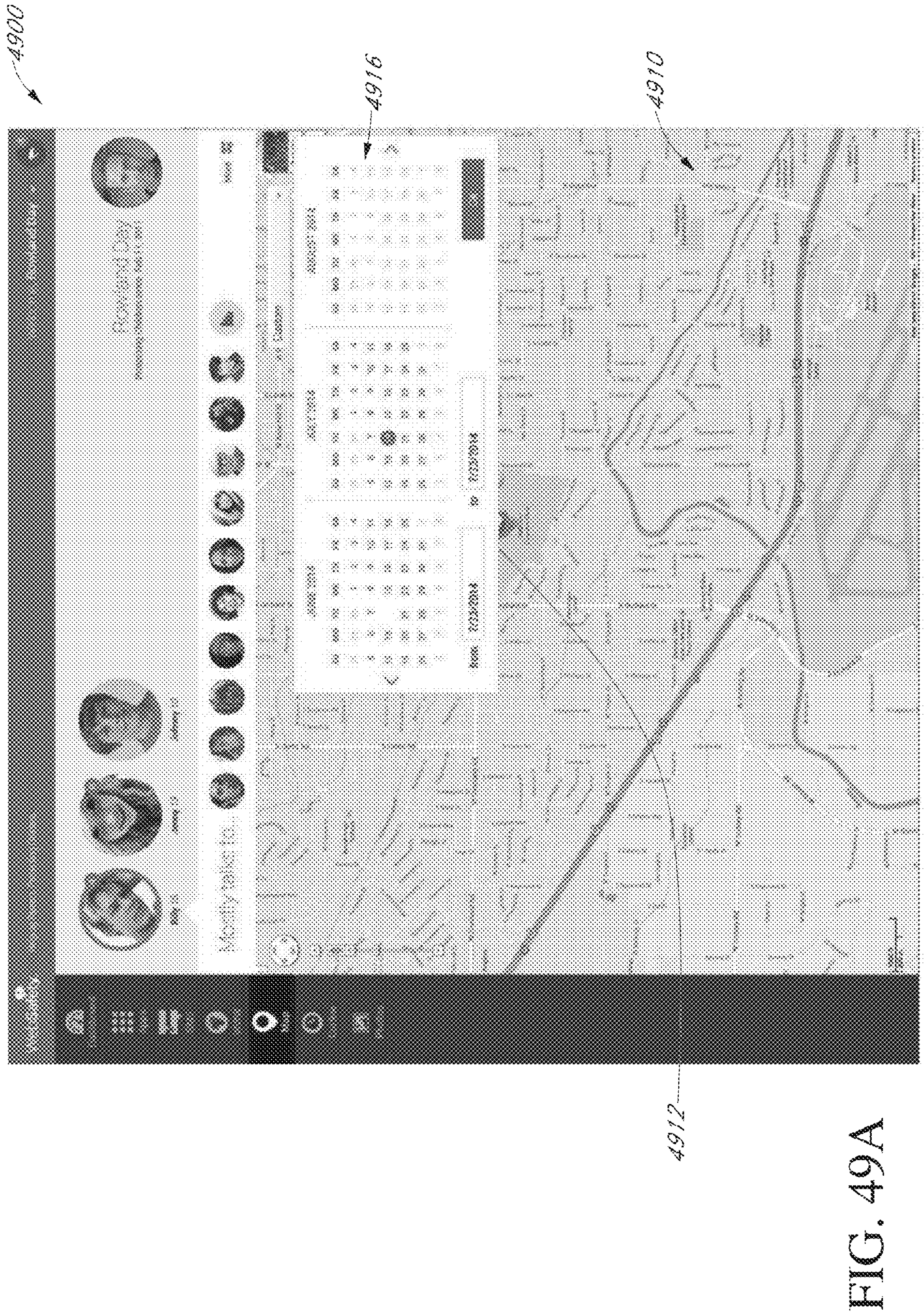
FIG. 49A illustrates an embodiment of a location interface.

FIG. 49A illustrates an embodiment of a location user interface 4900 generated by the safety system 110. The example of FIG. 49 may provide functionality similar to that discussed with respect to FIGS. 18 and 33. The location user interface 4900 can provide parents with a visual notification of where their children's user systems 130 are currently located and where they have been in the past. In some embodiments, the safety system 110 can generate a map 4910 to display the location information 4912 of the respective user systems. In some instances, the safety system 110 can show all the user systems belonging to each of the children on one map 4910. The safety system 110 can include landmarks on the map 4910. Landmarks can include school, home, a circle with a radius of preset distance from home or school. In some embodiments, the safety system 110 can also display most frequently visited locations on the map 4910. The safety system 110 may also include a search bar 4914 that can allow a parent to lookup location history of the child's user system. A geographic movement pattern (comprising a tracing of a route, for example) can be graphically disassociated from the underlying map and compared to other movement patterns—e.g., by superposition and/or juxtaposition, holding map size generally constant between data sets, etc.—to assist a user with review and comparison.

Figure 49B:
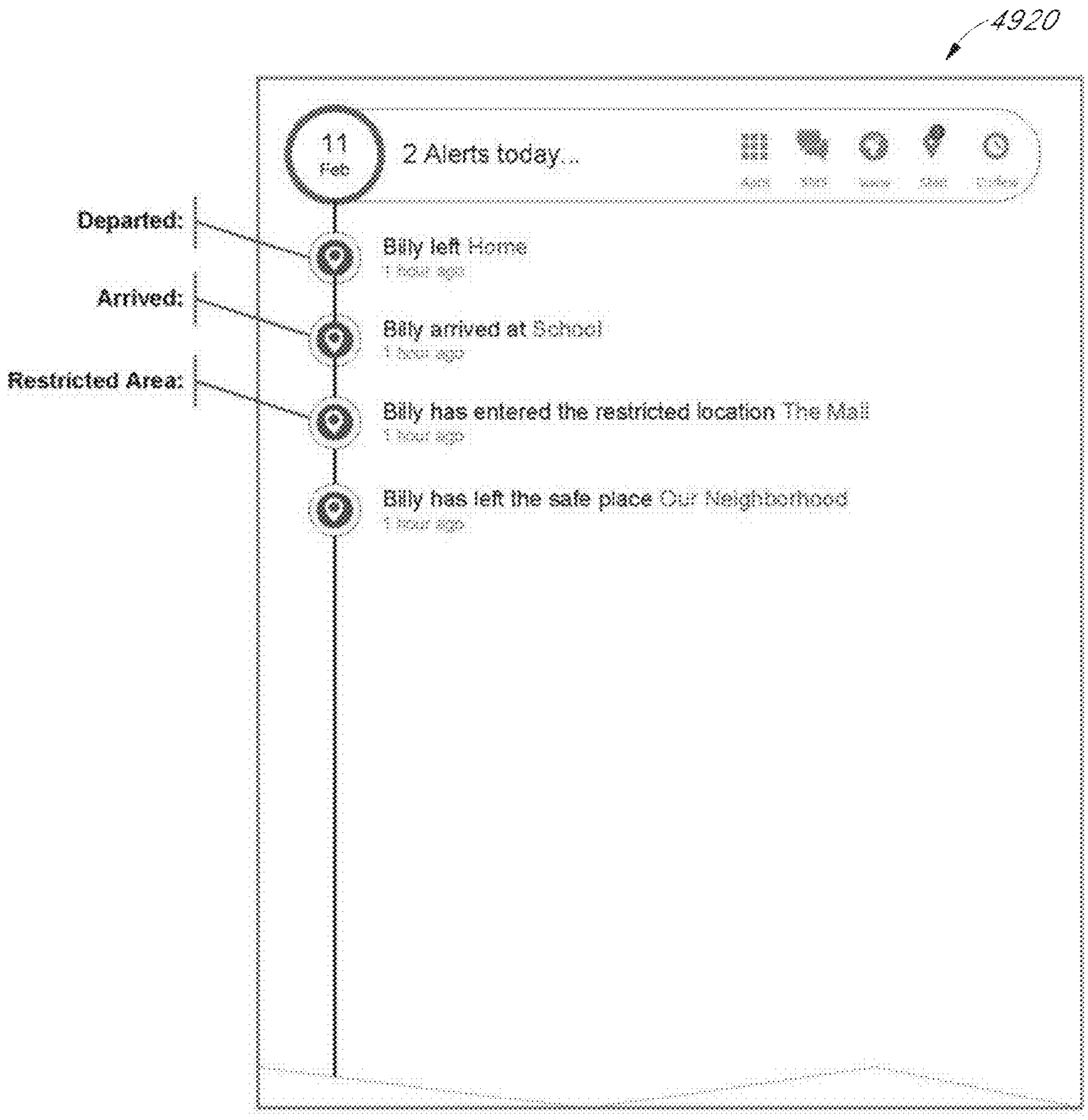
FIG. 49B illustrates an embodiment of a location history interface.

FIG. 49B illustrates location history data 4920 generated by the safety system 110. In some embodiments, the location history data 4920 can be included in the dashboard described above. The location history data 4920 may also be shown in a separate window or separately from other notifications. In the illustrated example, the location history 4920 shows location updates of Billy's phone. The location history 4920 may also show other devices belonging to either Billy or other children. The location history 4920 may be sorted according to a chronological order. In some embodiments, the location history 4920 may be sorted according to priority of alert which may depend on a determination by the safety system whether the location might be deviating from the norm. Each location notification may identify a child, an event, and a place or geofence associated with the event. For example, the illustrated example shows that "Billy left Home", "Billy arrived at School", "Billy has entered restricted location 'The Mall', and "Billy has left the safe place 'Our Neighborhood.'" The locations identified in the notifications may include places or geofences. For example, places may include "home", "school" and the "mall" while geofences may include "our neighborhood".

Figure 49C:
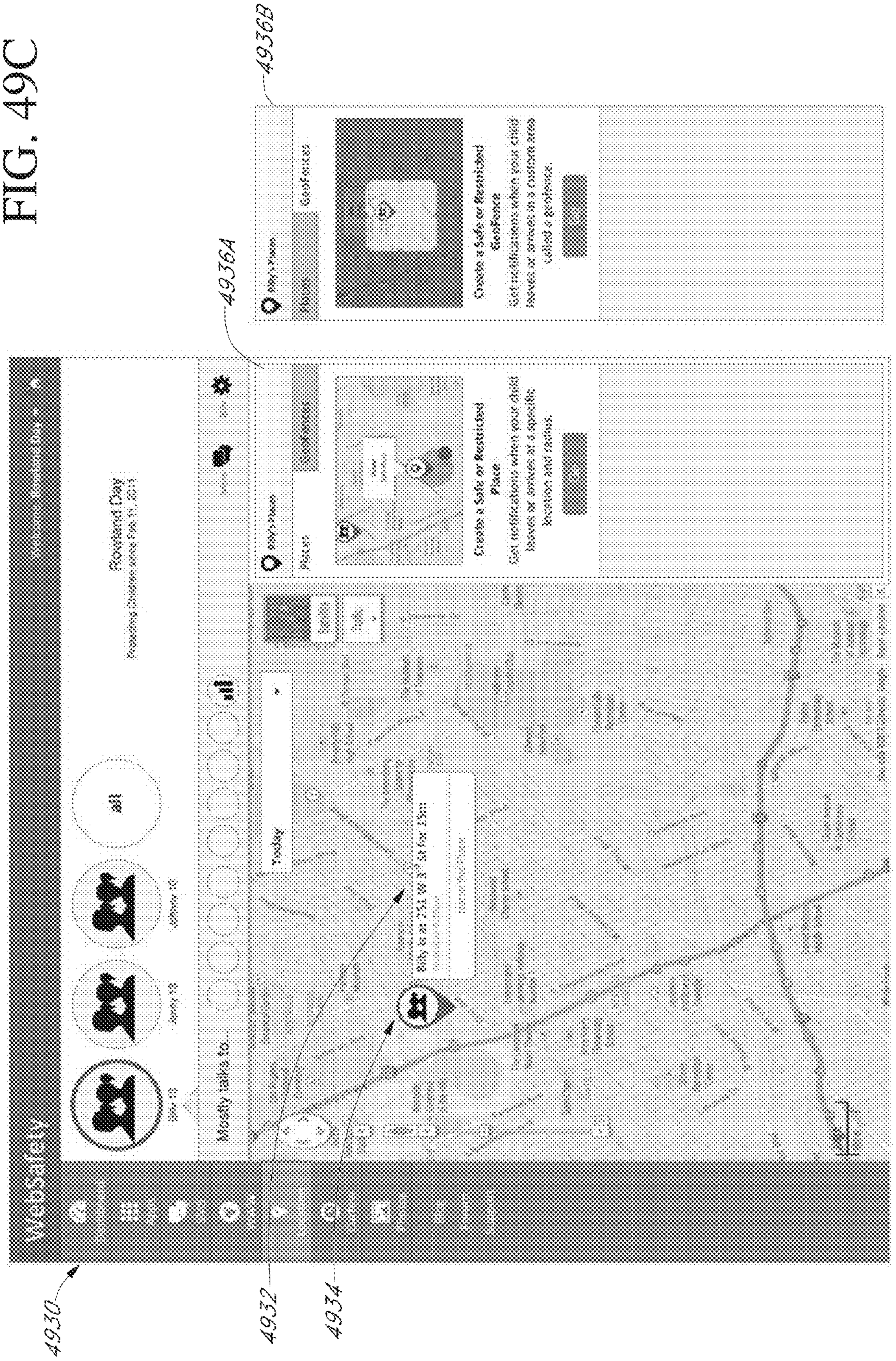
FIG. 49C-49I illustrate embodiments of location tracking interfaces.

FIG. 49C illustrates an embodiment of an interface 4930 for selecting and storing places and/or geofences using the safety system 110. The places and geofences created can be unique to a user or applied among multiple users. In an embodiment, a parent can select a place using control 4936A as shown more in detail with respect to FIG. 49F. Further, a parent can create a geofence using control 4936B as shown more in detail with respect to FIG. 49G. In some embodiments, the safety system 110 can provide a map in the interface 4930. As discussed above, the safety system 110 can visually display a location 4934 of a user system 130 on the map provided in the interface 4930. In the illustrated example, Billy's phone is located at 4934 on the map which may correspond to an address or a known location or one of the stored places. Known locations can include malls, restaurants, schools, friend's houses, dentist, doctor's office, etc. The safety system 110 can store known locations based on user input and/or third party data sources. The safety system 110 can display an address or known location 4932 along with the location 4934 of Billy's device. Further, the safety system 110 can enable users to save current location as one of the places for future recognition. In some embodiments, the safety system 110 can also include a timeline search as described with respect to FIG. 49D.

Figure 49D:
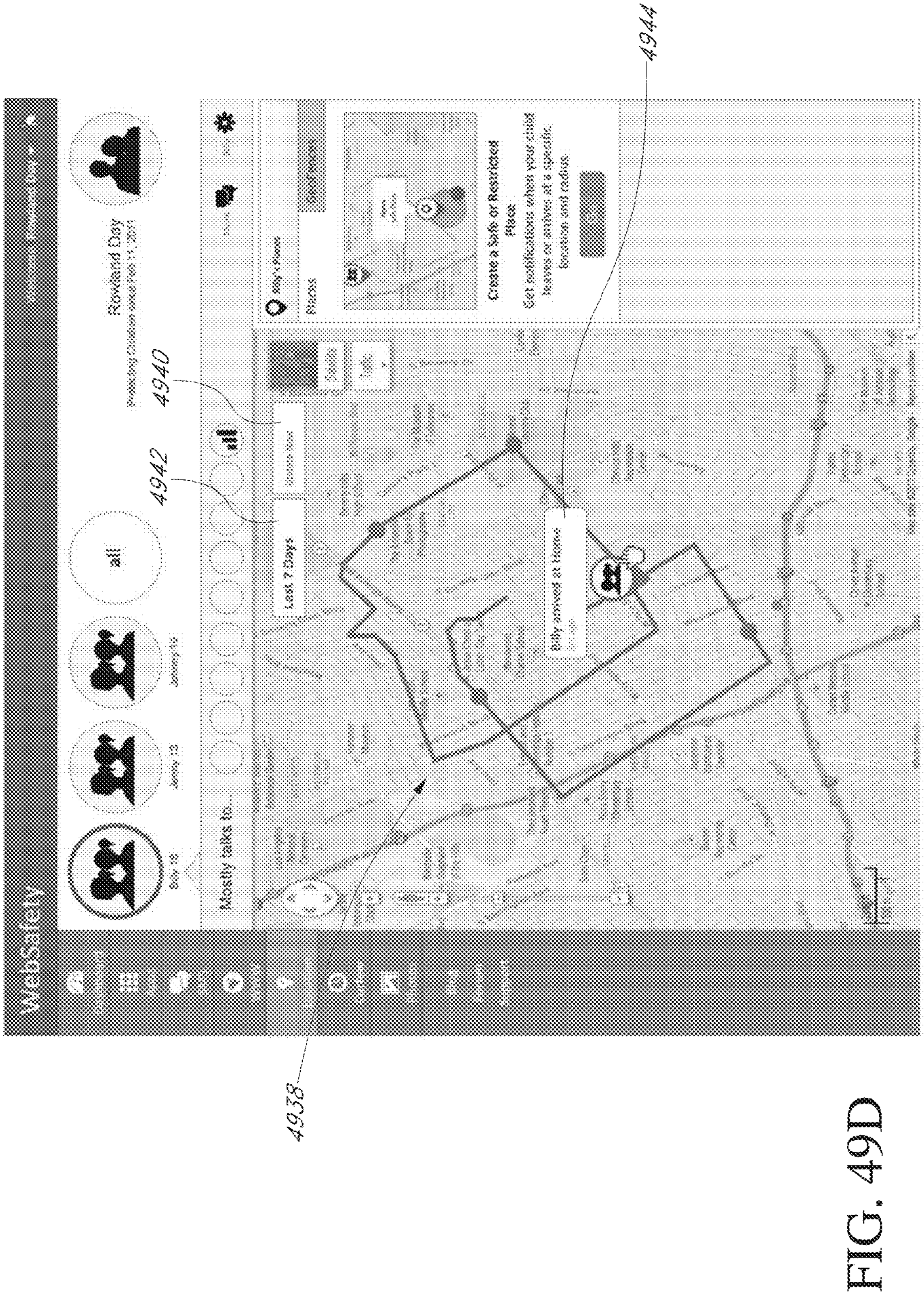
Figure 49E:
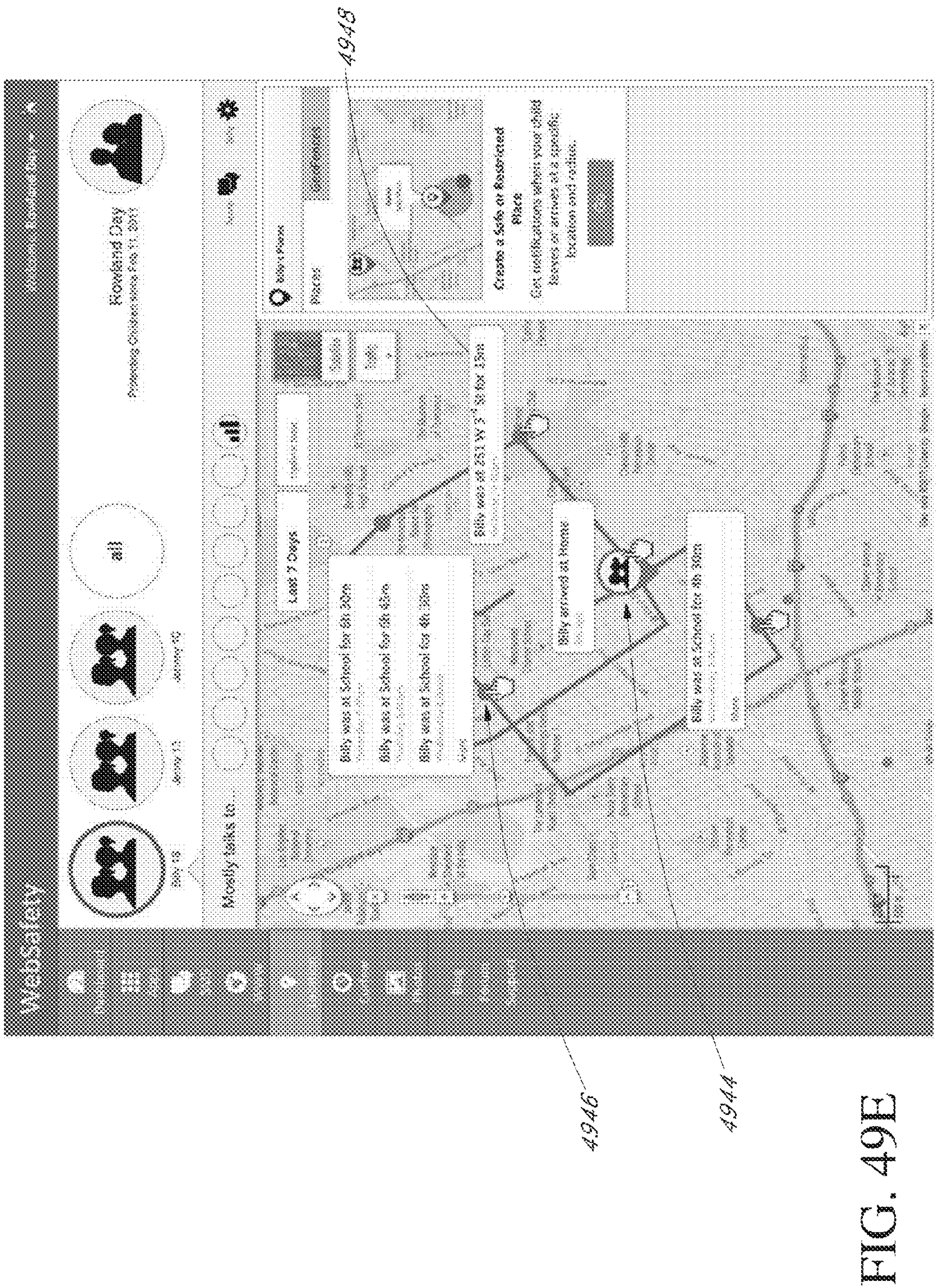

The safety system 110 can enable parents to track location of children over time using a timeline search control 4942 shown in FIG. 49D. In the illustrated example, the last 7 days are selected for timeline search. The active link 4942 can enable parents to select any time period. Based on the selection of a time period, the safety system 110 can retrieve stored location data about a particular user system 130 from the data repository 140 for the selected time period. In some embodiment, the safety system 110 can generate visual indications 4938 on the map based on the retrieved data. The visual indications 4938 may show a path of transit of the user device 130 over the selected time period. In some embodiments, the visual indications 4938 can show only places of interest and discard transit information. The safety system 110 can also highlight certain locations 4946 and 4944 in the visual indication 4938, as shown in FIG. 49E. The safety system 110 can also indicate a period of time that a user system 130 was at a particular location. The safety system 110 can automatically identify in the visual indications 4938, particular locations (4944 and 4946) where the user system was stationary (with respect to the boundary of that location) for at least a predetermined time period. In one embodiment, the predetermined time period is 15 minutes. In some embodiments, the predetermined time period can be more than 15 minutes or less than 15 minutes. For example, the predetermined time period can be 30 minutes or 1 hour. As discussed above, the safety system 110 can store places like homes and school. Accordingly, the safety system 110 can illustrate on the map stored places. Further, the safety system 110 can also show on the map new locations (for example, "Billy was at 251 W 3$^{rd}$ St for 15 m"). Accordingly, parents can get a visual snapshot of their children's whereabouts over a time period and identify places that their children are frequently visiting. For example, parents can identify trends such as Billy was at school for a shorter duration than normal hours on Wednesday (as shown in the figure). In another example, parents can review a new location—251 W 3$^{rd}$ St that Billy stopped over for 15 minutes.

Figure 49F:
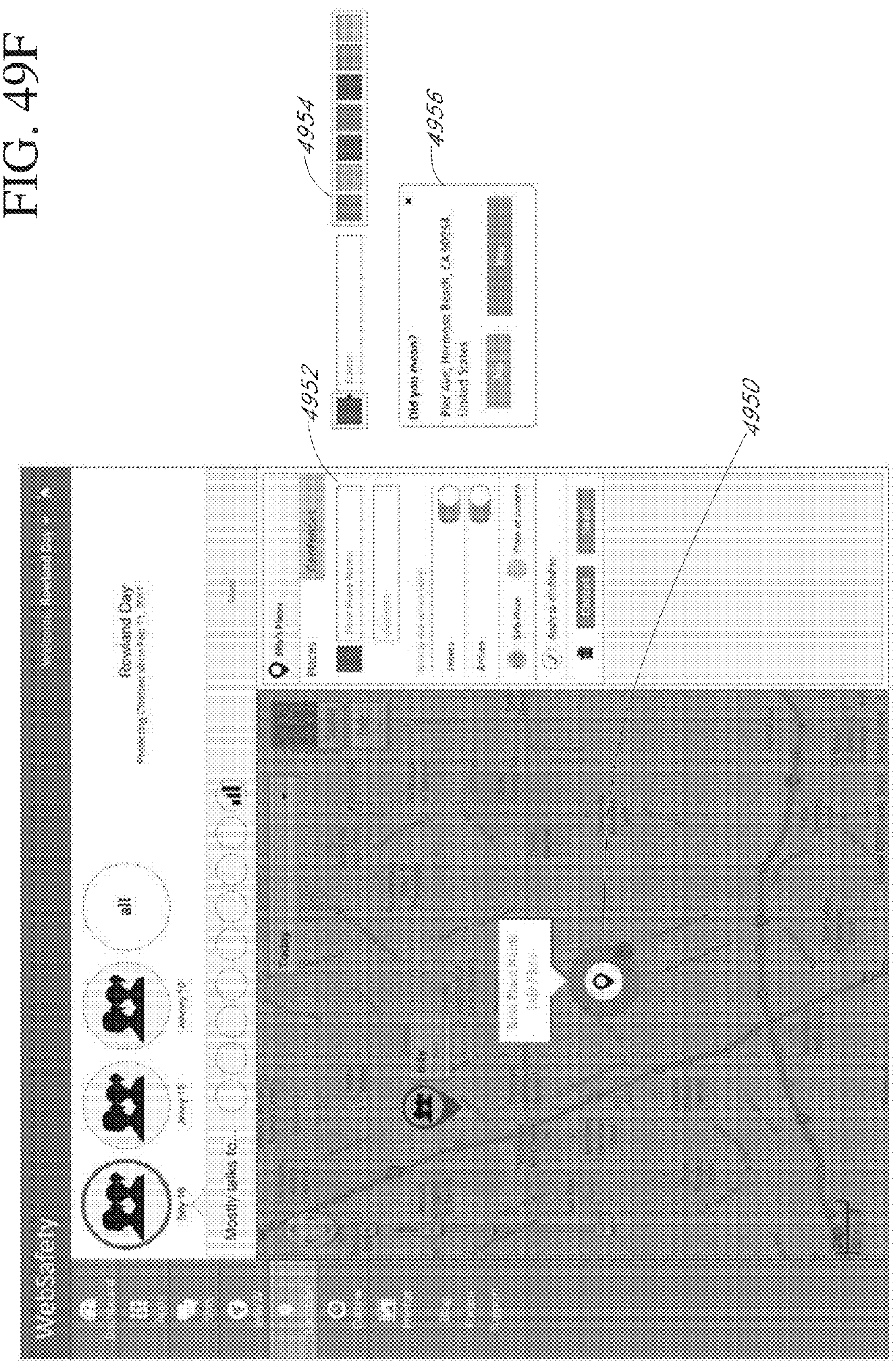

FIG. 49F illustrates an example for using the interface 4930 to identify and store a new place. For example, parents can select a control 4952 to add a new place. Parents can enter a name of the place, select whether the place is a safe place or a place for concern, or select whether to apply the place for a particular child or all the children. Further, parents can select notification settings for safety system 110 for when to generate alerts with respect to the new place. For example, in some embodiments, parents can select to generate notifications when the child's user system 130 enters and/or leaves the newly added place. The geographical location of the place can be selected by entering an address in the control 4952 or selecting a location 4950 on the map. The safety system 110 can also suggest locations 4946 based on the user's input via text or map. Parents can also select a color 4954 or other identification symbol for the newly added place. The safety system 110 can also include in the map predetermined locations such as stores or restaurants or any other places of interest. Parents can select one of these predetermined locations as a stored place.

Figure 49G:
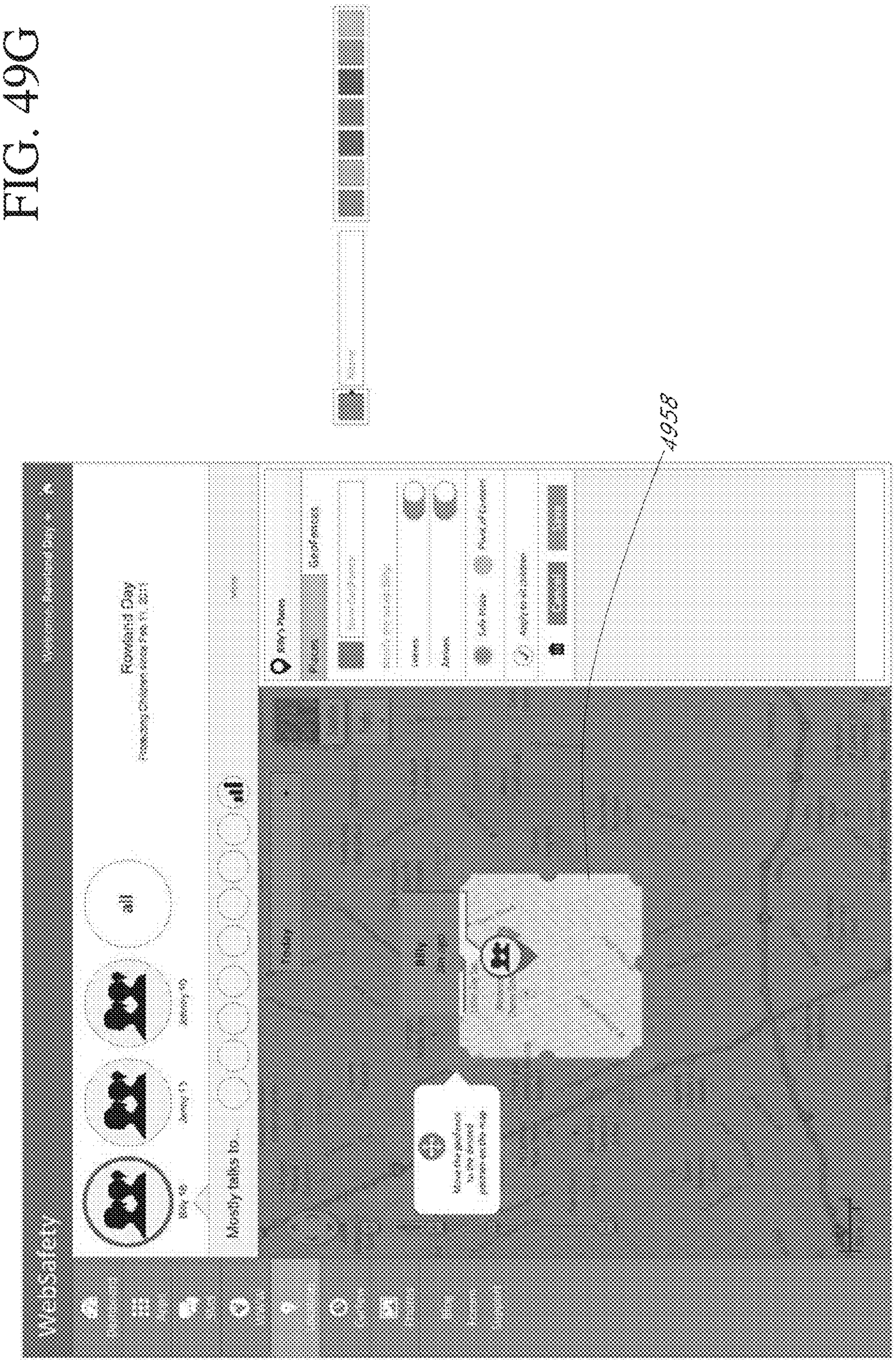

FIG. 49G illustrates an example for using the interface 4930 to add or modify geofences. A geofence can indicate a bounded area on a map. Parents can select a particular shape 4958 based on their desired preferences for a particular geofence. For example, parents may create a neighborhood geofence as a safe place and select alerts for whenever a user device crosses a boundary of the geofence. In some embodiments, parents may draw any shape on the map to create a geofence. In the illustrated embodiment, parents can drag points on a shape 4958 to create the geofence. Further, the safety system 110 can enable parents to drag points of the shape to automatically snap on to streets or intersections displayed on the map. In the illustrated embodiment, the shape 4958 can include eight points that can be dragged to create a geofence. Furthermore, the position of the shape 4958 corresponding to a geofence can also be moved on the map. Parents can assign a name, color, or symbol to identify the geofence. The name, color, or symbol may be used by the safety system 110 in the notifications. Parents can also select when they would like to be notified for the created geofence. For example, the safety system 110 can provide options for parents to enable notifications when the user system 130 enters and/or leaves the geofence. The safety system 110 can also enable parents to apply the geofence to some or all of their children as illustrated in FIG. 49G. Further, the geofence can be associated as a safe place or a place of concern. Based on the selection, the safety system 110 can modify its notifications with respect to the geofence.

Figure 49H:
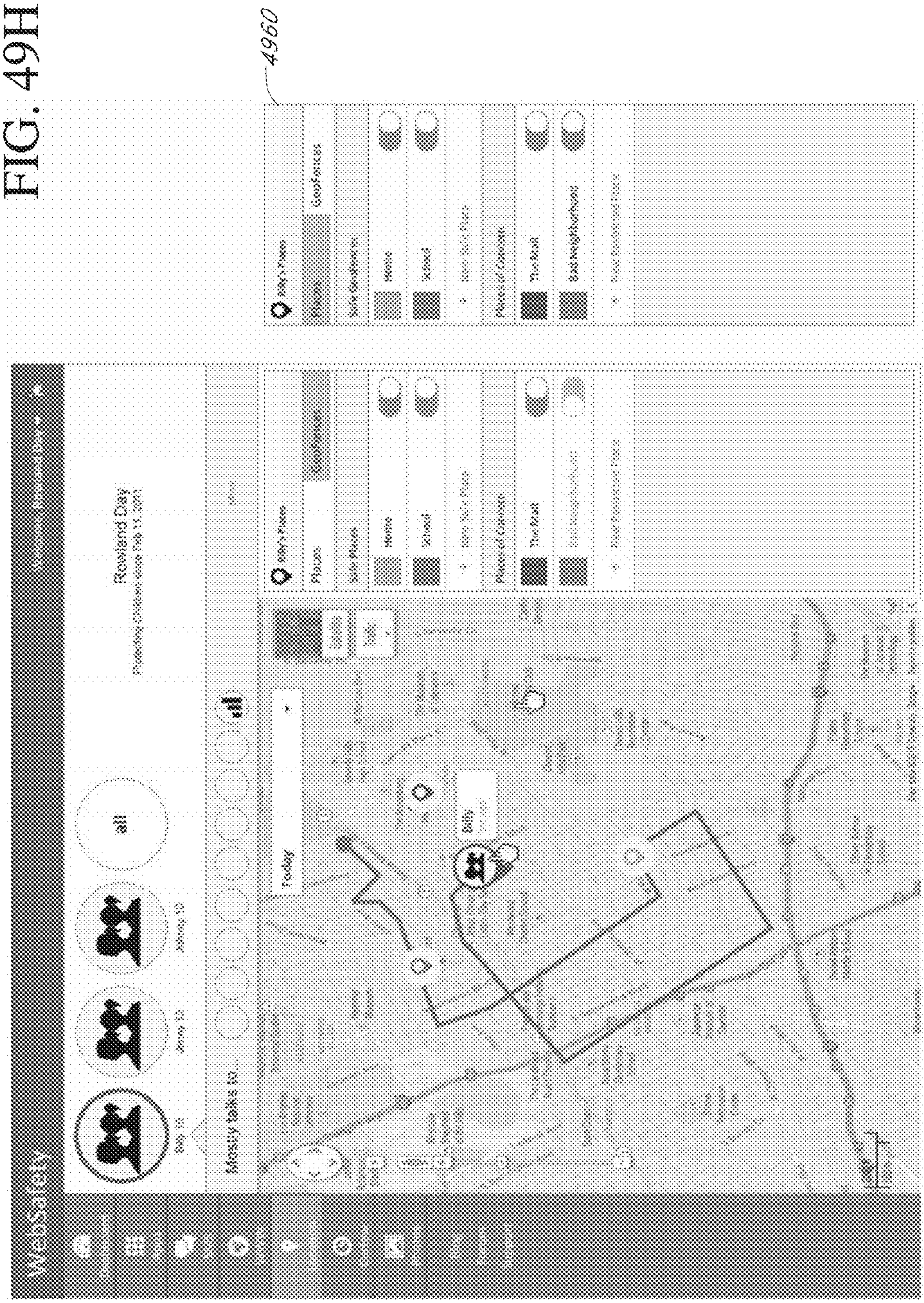
Figure 49I:
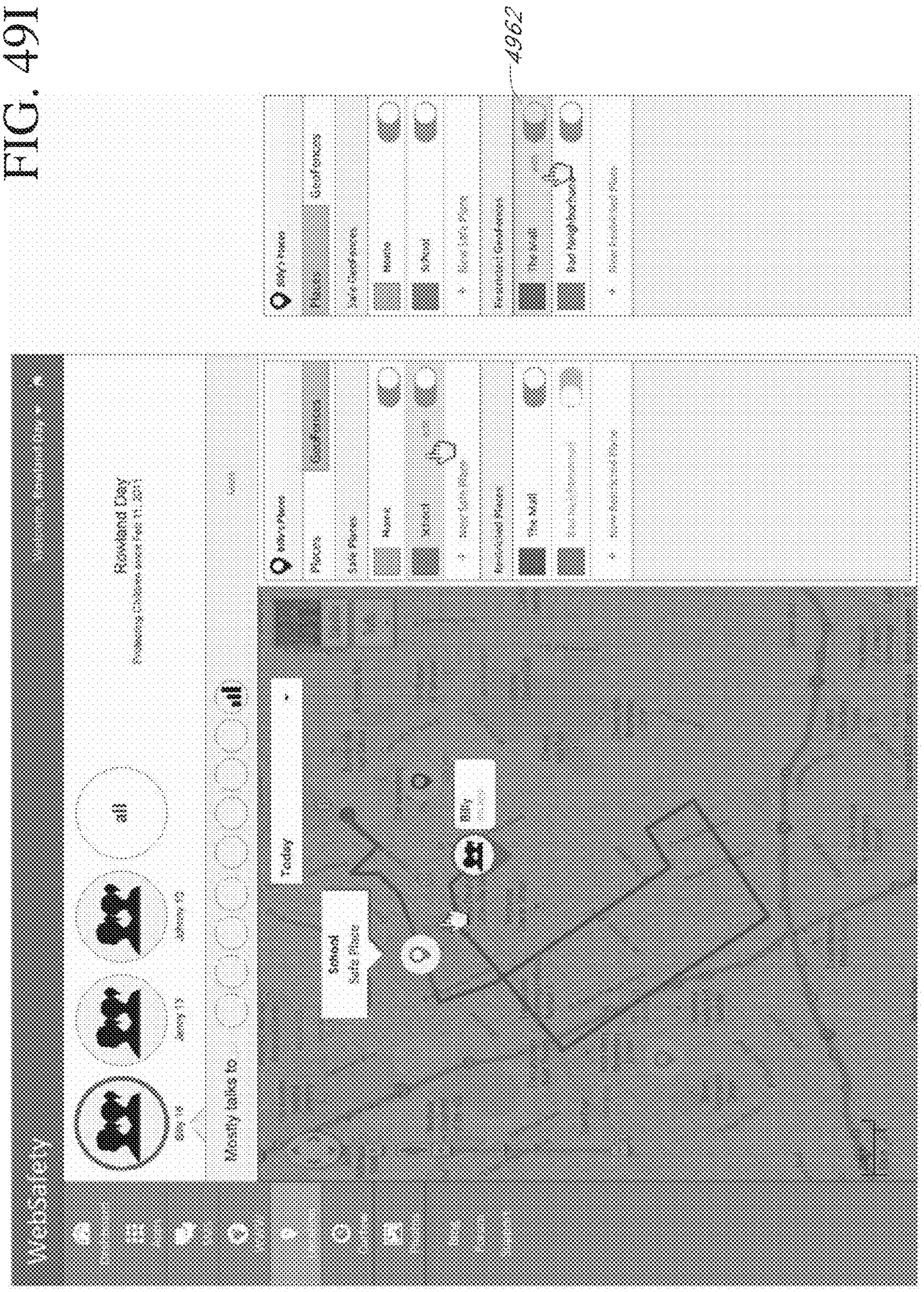

FIG. 49H shows a list of geofences and places 4960 added by parents using the interface 4930. Further, parents can selectively turn on and off notifications corresponding to the selected geofence or places as shown in the figure. The illustrated figure also shows a path of the child's user system 130 for the particular day including stops and the last location. The known stops can be displayed on the map as shown in FIG. 49I. In some embodiments, parents can select whether to show a particular place or geofence by selecting an active control 4962. Active controls can include links, hyperlinks, buttons, check box, etc.

FIG. 50A illustrates an embodiment of a curfew user interface 5000 generated by the safety system 110. The example of FIG. 50A may provide functionality similar to that discussed with respect to FIG. 19. The curfew user interface 5000 can enable parents to select curfew settings for their children's user systems 130. The curfew settings 5010 can include day and time when a particular set of curfew rules may be activated by the safety system 110. In the example of FIG. 50A, the curfew settings rules are preselected to completely disable the user system except for some phone services as discussed above. Accordingly, parents can select times of day to enable and disable curfew to prevent children from using their user systems 130 during school, after bedtime, homework time, etc.

FIG. 50B illustrates another embodiment of a curfew user interface 5050 generated by the safety system 110. As shown by the pictures of Billy, Jenny, and Johnny in this view, their parents have been using the disclosed systems, resulting in improved attitudes and demeanors in their profile photos. In the curfew user interface 5050, parents can select virtual slider control knobs 5014, displayed above each day column, to enable curfew settings on or off for that day of the week. Further, parents may be able to select time slots of restrictions by clicking anywhere on the calendar to create new boxes. Resizable boxes 5020 are illustrated superimposed on a calendar view 5024. Parents can also move and drag boxes, and/or the borders and edges of boxes, to adjust the timing and/or duration of the restricted use periods or curfews. Parents may find it efficient to use the curfew user interface 5050 in some instances on a touch screen computing device. Similar interfaces can be used for other settings and interactions with a safety system 110. For example, resizable, moveable shapes, superimposed on a map, for example, can be used for setting geographic restrictions, geo-fencing, etc.

As discussed herein, the safety system 110 can apply curfew settings automatically based on locations, places, or geofences. For example, entry into a safe zone or getting out of curfew time may automatically reactivate some of the functionality of the user system 130.

Figure 51:
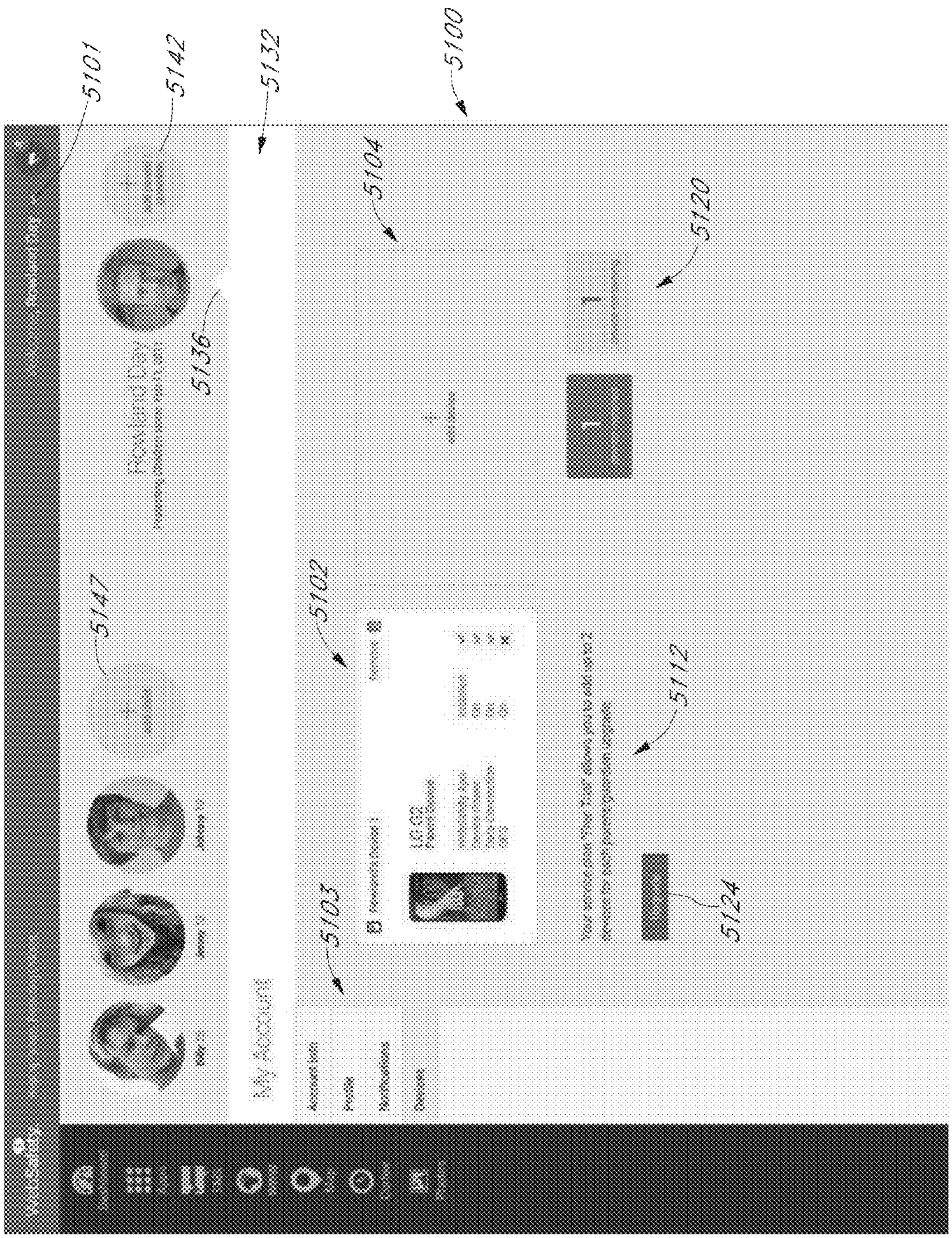
FIG. 51 illustrates an embodiment of a master account user interface.

FIG. 51 illustrates an interactive "devices" screen 5100 of an account user interface generated by a safety system 110. This screen can be generated by or associated with the account management module 120 of FIG. 1.

Account settings interactive screens, such as FIG. 51, can be accessed using a control associated with the "Welcome, Rowland Day" dropdown menu indicator 5101, which can initiate a menu showing a "log out" control or a "my account" control. The "my account" control (not shown) can be selected and result in various settings pages, accessible by the tabs 5103. As illustrated here, the "my account" bar 5132 can include a pointer 5136 indicating that the current account is that of the example parent, Rowland Day (protecting children since Feb. 11, 2011). An additional parent or guardian can be added using the add parent button 5142 and an additional child can be added using the add child button 5147.

The tabs 5103 can include, for example, an "account info" tab, a "profile" tab, a "notifications" tab, and a "devices" tab. The devices screen 5100 can be accessed by selecting the device tab, and this screen can include an existing device box 5102 showing details of devices already added (and allowing for their removal), as well as administrative tools to register additional controller user systems 130 (e.g., user systems 130 used by parents) with the safety system 110. The safety system 110 can add a registered controller user system 130 as one of the devices to send notifications to regarding child user systems 130 using the add device control 5104. For example, both parents can receive updates from children's user system 130 once their devices are registered with the safety system. Subscription plan information can be included at 5112, a devices installed and remaining dialogue 5120 can be provided, and an "upgrade" button 5124 can allow a user to increase the number of registered devices.

Figure 52:
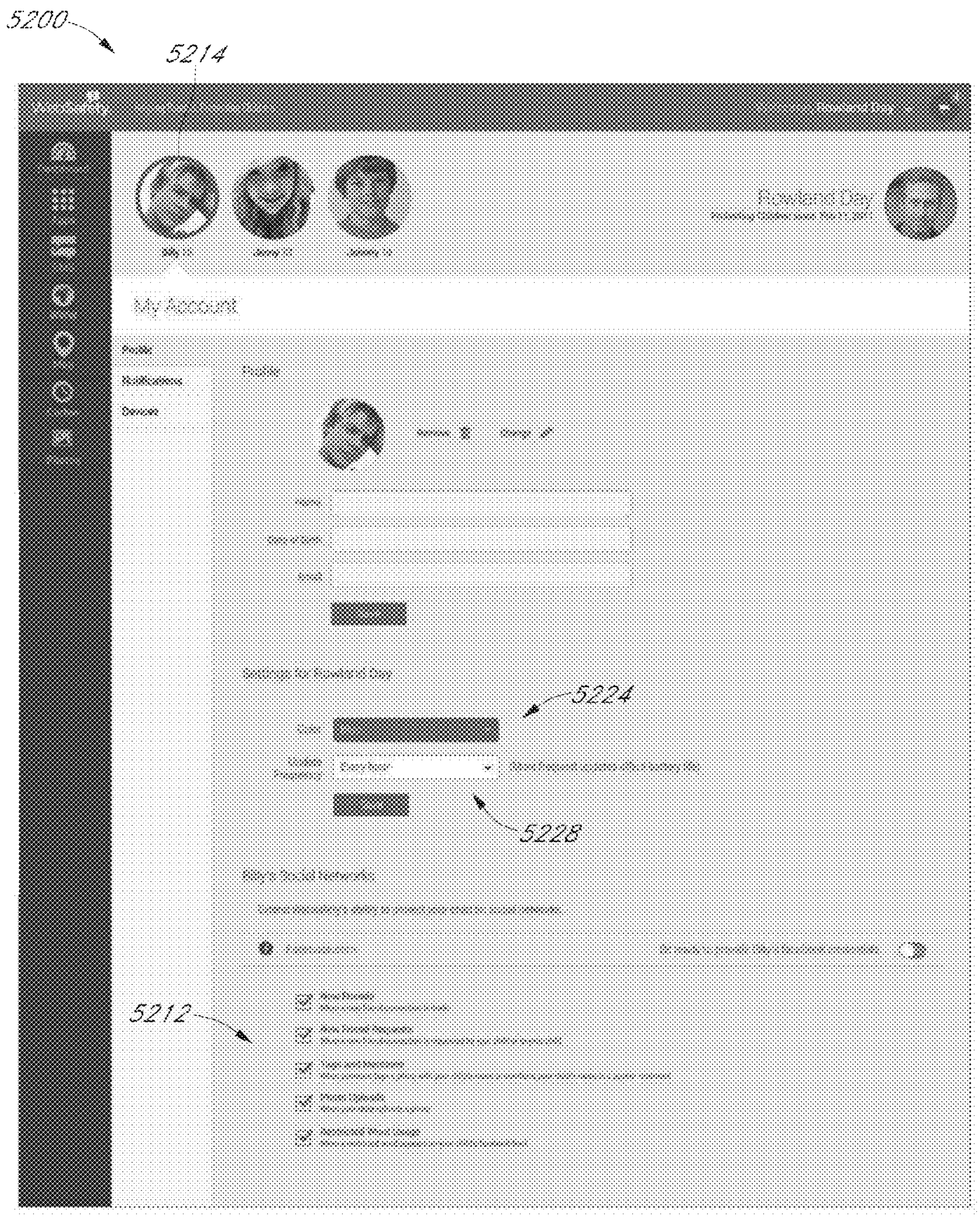
FIG. 52 illustrates another embodiment of an account user interface.

When Billy's identifier 5214 is selected from an account management screen (e.g., the screen shown in FIG. 51), rather than navigate to a dashboard view for Billy (e.g., the view shown in FIG. 37), the safety system 110 can display a subset of interactive account screens associated with Billy and settings for monitoring and protection of Billy's device, as shown in FIG. 52. In contrast with the example shown in FIG. 51 (which shows settings for an example parent), the tabs available for an example child, Billy, are "profile," "notifications," and "devices"—but not "account info." Similar to the example shown in FIG. 51, a "devices" tab can be available for initiating a link or viewing an existing link with Billy's device(s). As illustrated, setting up a child device can include a snapshot showing devices that have been installed (e.g., by installing on safety system plugin 132 on the devices 130). Such a snapshot can indicate the name of the child, the name of their device, whether or not a plugin or app has been installed on the device, whether the device is powered on, whether it has a data connection, and whether a GPS function is on. This same snapshot can include a control that allows a parent to remove the device from the parent's account.

FIG. 52 illustrates an example interactive "profile" screen 5200 for Billy. This view can be generated by or associated with the account management module 120 of FIG. 1. The "profile" screen 5200 can enable parents to customize monitoring settings for their children's user systems 130. The settings may include update frequency which can be balanced with battery life of the user system 130. In some instances, the safety system 110 can send an alert of low battery of one of the child's user system 130 to a parent's user system. Based on the low battery alert, the parents may use safety system 110 to disable some of the modules of child's user system 130. In some embodiments, the safety system 110 can activate curfew mode on child's user system 130 with a low battery status. The account user interface 5200 may also enable parents to input a child's credentials so that the safety system 110 can use the credentials to monitor social networking portals. As discussed above, the safety system 110 can also monitor social networking portals without requiring credentials by intercepting via the operating system of the user system 130.

Figure 53:
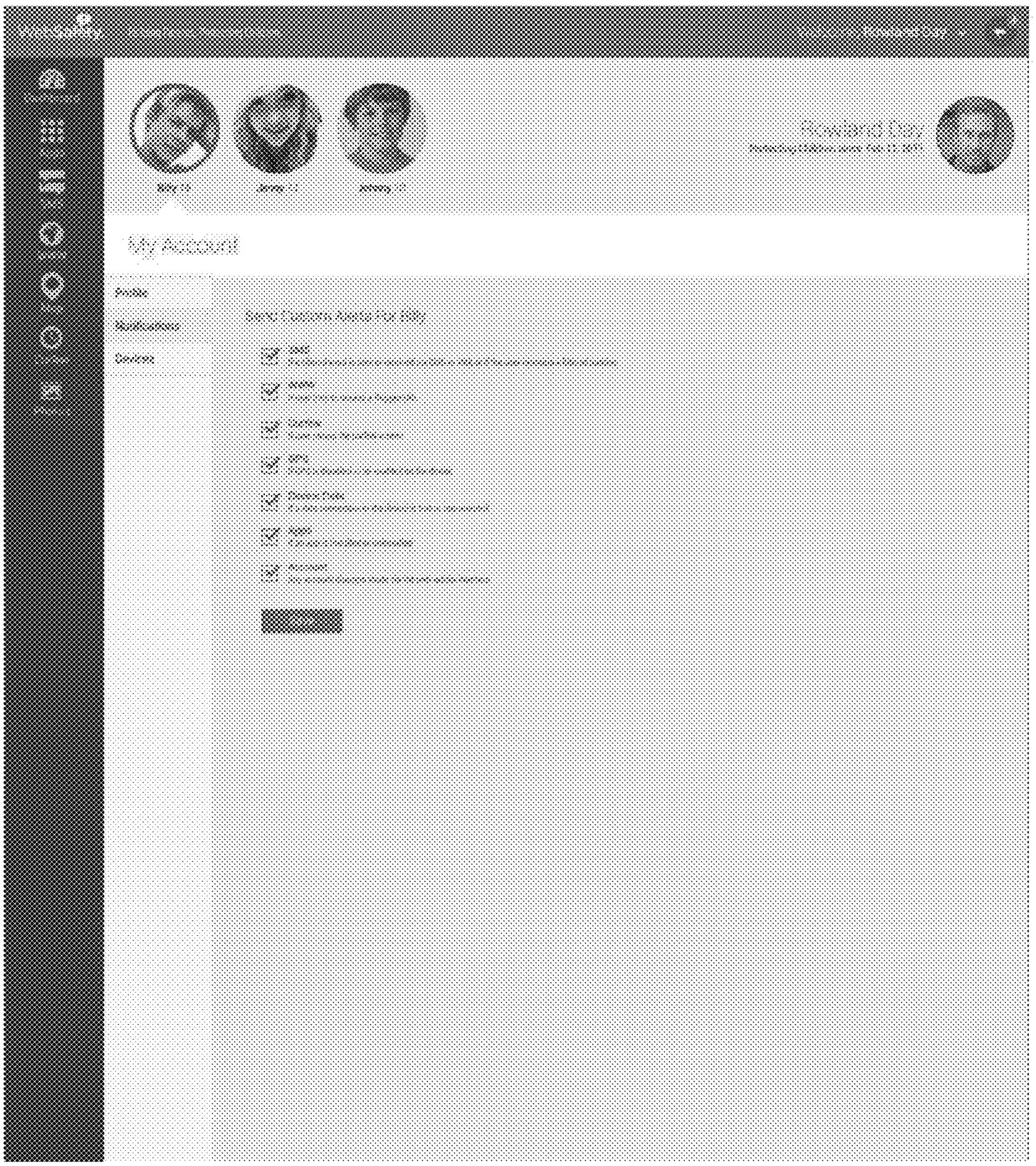
FIG. 53 illustrates another embodiment of an account user interface.

Setting up a child device can be initiated on that child's mobile device as illustrated in FIG. 32. As illustrated in FIG. 52, the process can also include initiating settings for that child (e.g., using a color control 5224 to select a color for items viewed relating to that child in a parent interface, using an update control 5228 to select an "update frequency" for that child, etc.) Selecting or designating an update frequency can include interacting with a control 5228 that comprises selecting from a drop-down list comprising various intervals—e.g., 5, 10, 15, or 30 minutes, 1 hour, 2 hours, etc. The more frequent the updates, the more rapid battery resources are used, which can affect battery life of a mobile device. Setting up a child device can further include social network settings 5212 associating a child's social networks with a safety system 110, which can include gathering log in information as a child logs in to a social network site. As indicated at 5212, settings can be used to selecting which notifications to receive regarding that child from a social network (in this case, Facebook). FIG. 53 illustrates an interactive "notifications" screen 5300. This interactive screen is also associated with Billy, as shown. The account user interface 5300 further enables parents to customize what type of alerts do they want to receive from safety system 110 related to their child's user systems. As shown in the example of FIG. 53, a user interface can include user controls by which a parent can select one or more of the following options for which notifications to receive: SMS (if a filtered word is sent or received via SMS or MM, or if the user contacts a filtered number; WWW (if user tries to access a flagged URL); Curfew (if a user closes the curfew screen); GPS (if GPS is disabled or re-enabled on the device); Device Data (if a data connection to the device is lost or reconnected); Apps (if an app is installed or uninstalled); Account (if any account changes are made via the web admin interface). FIGS. 21 and 34 show example interfaces that can be used for these or similar purposes, in particular when a user desires to update or change the settings provided when initially setting up a child device as described here with respect to FIG. 53.

XXII. Computing Systems

A number of computing systems have been described throughout this disclosure. The descriptions of these systems are not intended to limit the teachings or applicability of this disclosure. For example, the user systems and described herein can generally include any computing device(s), such as desktops, laptops, video game platforms, television set-top boxes, televisions (for example, internet TVs), computerized appliances, and wireless mobile devices (for example smart phones, PDAs, tablets, or the like), to name a few.

Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

In some embodiments, the safety system 110 described above may operate with mobile computing systems using Android OS. As discussed above, the Android OS may provide software libraries to access and/or control the mobile systems. For example, the safety system 110 can include an Apps Agent, which may use one or more of Android's classes for at least one of the following operations: retrieve a list of installed apps, retrieve a list of uninstalled apps, and track usage of currently installed apps. The Apps Agent may use one or more of the following classes: AppsAgentService, AppsIconService, AppsInstallService, AppsUninstallService, AppsUsageService, AppsUsageSyncService, ProtectedActivity, AppModel, PackageIntentReceiver, or AppsLoader. The Apps Agent can run at specific intervals based on a Frequency Agent Service. The App Agent can check for the history of apps installation from Android's Package Manager and then check it against the currently synced apps from the server, if it is not synced then, the App Agent may then check if the app is currently installed to classify it as installed or uninstalled. If an app is already synced to the server, the Apps agent may check for the difference (in time) of the app's launch until it closed.

The safety system 110 can also include a Curfew Agent, which may use one or more of Android's classes for at least one of the following operations: retrieve current date/time, and lock phone. The Curfew Agent may use one or more of the following classes: CurfewAgentService, ProtectedActivity, Curfew, CurfewManager, or StaticCurfewManager. The Curfew Agent can retrieve current date and time. The Curfew Agent can runs at specific intervals based on Frequency Agent Service. The Curfew Agent can retrieve a list of preidentified curfew time from the server and then check it against the current date and time of the device. If the current date and time retrieved from the server matches the device's current date and time, the Curfew Agent can lock the device and set the lock's password the current websafety account logged into the device.

The safety system 110 can also include a Device Status Agent, which may use one or more of Android's classes for at least one of the following operations: retrieve device's power state, retrieve device's connection type (WiFi or cellular) and status, retrieve device's GPS status, and retrieve installation state of the safety system on the mobile device. The Device Status Agent may use one or more of the following classes: DeviceStatusAgentService, ProtectedActivity, BootCompleteReceiver, NetworkChangeReceiver, or ShutDownReceiver.

The safety system 110 can also include a Location Agent, which may use one or more of Android's classes for at least retrieving device's geographical location. The Location Agent can runs at specific intervals based on Frequency Agent Service. The Location Agent can checks for the current device's location if a location provider is available (GPS or Mobile). If a location provider is available, it can then sends the device's current location to the server. The Location Agent may use one or more of the following classes: FuseLocationAgentService, LocationAgentService, ProtectedActivity, and GP SLocationChangeReciever.

The safety system 110 can also include an SMS agent, which may use one or more of Android's classes for at least retrieving device's SMS threads and messages. The SMS agent can runs at specific intervals based on Frequency Agent Service. In one embodiment, the SMS agent can checks for unsynced message threads from the last 6 hours. If the message thread is not synced yet, it may flag it as unsyned and sends the thread details (message thread id, messages, thread sender, and thread receiver) to the server. Otherwise, if a thread is already synced, the SMS Agent may then check if there are new messages within the thread and sync it to the server per thread accordingly. The SMS Agent may use an SMSAgentService class.

The safety system 110 can also include a WWW Agent, which may use one or more of Android's classes for at least retrieving device's browsing history. The WWW Agent can runs at specific intervals based on Frequency Agent Service. The WWW Agent can retrieves the device's browsing history since the last query and send it to the server. The WWW Agent may use one or more of the following classes: WWWAgentService or Bookmark.

The safety system 110 can also include a Frequency Agent Service, which may use one or more Android's classes for at least retrieving the frequency of services server synchronization rate. For instance, the Frequency Agent Service can retrieve parent set update frequency from the dashboard. The Frequency Agent Service can use UpdateFrequencyAgentService.

Further, the processing of the various components of the illustrated systems can be distributed across multiple machines, networks, and other computing resources. In addition, two or more components of a system can be combined into fewer components. For example, the various systems illustrated can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (for example, physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (for example, ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Embodiments of the disclosed systems and methods may be used and/or implemented with local and/or remote devices, components, and/or modules. The term "remote" may include devices, components, and/or modules not stored locally, for example, not accessible via a local bus. Thus, a remote device may include a device which is physically located in the same room and connected via a device such as a switch or a local area network. In other situations, a remote device may also be located in a separate geographic area, such as, for example, in a different location, building, city, country, and so forth.

Methods and processes described herein may be embodied in, and partially or fully automated via, software code modules executed by one or more general and/or special purpose physical computing systems. The word "module" refers to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

In certain embodiments, code modules may be implemented and/or stored in any type of computer-readable medium or other computer storage device (for example, hard disks, RAM, ROM, flash memory, etc.). Computer-readable media include non-transitory computer-readable media such as magnetic storage, optical storage (for example, CD-ROMs or DVDs), semiconductor storage, etc. In some systems, data (and/or metadata) input to the system, data generated by the system, and/or data used by the system can be stored in any type of computer data repository, such as a relational database and/or flat file system. Any of the systems, methods, and processes described herein may include an interface configured to permit interaction with other systems, components, programs, and so forth.

Although sometimes described by partitioning functionality of the overall system into modules for ease of explanation, it is to be understood, that one or more modules may operate as a single unit. Conversely, a single module may comprise one or more subcomponents that are distributed throughout one or more locations. Further, the communication between the modules may occur in a variety of ways, such as hardware implementations (for example, over a network, serial interface, parallel interface, or internal bus), software implementations (for example, database, DDE, passing variables), firmware implementations, a combination of hardware and software, etc.

XXIII. Terminology and Conclusion

Conditional language used herein, such as, among others, "can," "might," "may," "for example," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment. Accordingly, no feature or group of features is necessary or indispensable to each embodiment.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A system and apparatus for allowing parents to view and track smart phone activities of their children, the system and apparatus comprising:

one or more child software modules, a module installed on each child's smart phone, each child software module configured to:

access and extract data from or about more than one of the smart phone's other software applications, including at least two of the following: a texting application, a social media application, an image application that facilitates transmission or reception of images, and a web browser application; and send the extracted data to an analysis server;

the analysis server, configured to:

identify potentially harmful language, images, and websites by comparing the extracted data to existing databases of harmful words, harmful images or image types, harmful websites, and harmful applications;

automatically identify patterns in the potentially harmful language, images, and websites for which helpful works of authorship have previously been created and stored in an electronic library; and provide immediate access to those works of authorship to parents by transmitting an electronic copy thereof or a link thereto to a parent portal for display adjacent to a warning based on harmful content that underlies those patterns of harmful content; and the parent portal configured to:

receive results from the analysis server;

display the results organized by child;

provide both generalized smart phone usage data for each child and visual warnings when harmful results have been found by the analysis server, along with specific underlying data that triggered the warning; and provide an interface for receiving input from a parent, the input comprising:

selections of which child's data to view; and selections of which types and how much of the data and analysis results to view for each child.

2. The system and apparatus of claim 1, wherein each child software module is further configured to access and extract data sufficient to allow the analysis server to report which new applications are downloaded to each child's smart phone, and that information is automatically recorded in a computer memory and displayed promptly through the parent portal.

3. The system and apparatus of claim 2, wherein each child software module is further configured to access and extract data sufficient to allow the analysis server to report each of the following:

which websites were visited using each child's smart phone; and content and timing of each child's posts to social networks;

and that information is automatically recorded in a computer memory and displayed promptly through the parent portal.

4. The system and apparatus of claim 1 wherein each child software module is further configured to access and extract data sufficient to allow the analysis server to report each of the following:

a location of the smart phone at periodic intervals throughout the day; and usage of the smart phone that occurs outside of geographic constraints that can be set through the parent portal;

and that location and usage information is automatically recorded in a computer memory and displayed promptly through the parent portal.

5. The system and apparatus of claim 4, wherein an embedded map feature visible in the parent portal indicates where each child has traveled during the day and provides a warning if the child leaves a given geographical radius.

6. The system and apparatus of claim 1, wherein each child software module is further configured to access and extract data sufficient to allow the analysis server to report usage of the smart phone that occurs during curfew periods, and that information is automatically recorded in a computer memory and displayed promptly through the parent portal.

7. The system and apparatus of claim 1, wherein for each child, the parent portal is configured to display following information on a same daily feed screen:

identities of people with whom that child communicates most often, including a visual indication ranking those people by frequency or amount of communication;

a daily feed of the child's activities, organized chronologically, the child's activities comprising:

any smart phone applications downloaded;

content of any SMS text messages sent or received;

identity of any websites visited;

content of any social network posts created, viewed, or sent; and a visual warning of each of the following, incorporated into the daily feed:
cursing or bullying terms;
questionable website visits; and
breaking curfew.

8. The system and apparatus of claim 7, wherein for each child, the parent portal is further configured to display following information on a same current applications screen: a list of all applications currently installed on that child's phone, a visual warning identifying applications that are identified as potentially harmful based on information in the analysis server, and a description of functions of each of the applications in the list.

9. The system and apparatus of claim 8, wherein for each child, the parent portal is further configured to display the following information on a same usage screen: a color chart indicating which applications were used by the child that day, and how much time was spent using those applications.

10. The system and apparatus of claim 7, wherein for each child, the parent portal is further configured to display the following:
text messages sent and received, with curse words and bullying terms highlighted;
a list of most commonly used curse words and bullying terms; and
an interface allowing a user of the parent portal to control if text conversations should be flagged automatically, and how many curse words or bullying terms should be allowed before a flag is automatically applied.

11. The system and apparatus of claim 1, wherein for each child, the parent portal is further configured to display following web access information and controls:
a whitelist mode that triggers warnings if the child visits any website domain that is not listed as specifically allowed; or
a blacklist mode that triggers warnings for only website domains that that are flagged by a user of the parent portal or by the existing database of harmful websites accessible from the analysis server.

12. The system and apparatus of claim 1, further including a curfew feature comprising:
a control interface in the parent portal configured to allow a user of the parent portal to select restricted times that a child's smart phone may not be used; and
an active restriction feature in the child software module configured to completely disable the child smart phone during the restricted times, except for emergency phone calls.

13. The system and apparatus of claim 1, wherein the parent portal is further configured provide an interface for receiving input from a parent, the input comprising selections of which types of harmful material should be identified, and what level of scrutiny to apply in determining harmful material.

14. The system and apparatus of claim 13, further comprising a computer that periodically analyzes the selections from many parents regarding types of harmful material and level of scrutiny, analyzes those selections statistically, and incorporates statistical results in setting default settings and recommendations for future users.

15. A computing system configured to access one or more databases in substantially real-time in response to input from a parent provided in an interactive user interface in order to determine information related to a user system and provide the determined information to the parent in the interactive user interface, the computing system comprising:
a network interface coupled to a data network for receiving and transmitting one or more packet flows;
a computer processor; and
a non-transitory computer readable storage medium storing program instructions configured for execution by the non-transitory computer processor in order to cause the computing system to:
access data from or about more than one of a smart phone's software applications, including at least two of the following: a texting application, a social media application, an image application that facilitates transmission or reception of images, and a web browser application; and
identify potentially harmful language, images, and websites by comparing the accessed data to existing databases of harmful words, harmful images or image types, harmful websites, and harmful applications;
automatically identify patterns from the identified potentially harmful language, images, and websites for which helpful works of authorship have previously been created and stored in an electronic library;
display results organized by child on a computing device;
display generalized smart phone usage data for each child and visual warnings when harmful results have been found, along with specific underlying data that triggered the warning on the computing device;
display an electronic copy of at least one of the works of authorship or a link thereto, the electronic copy thereof or the link being associated with a warning based on the pattern on the computing device;
display an indication of a first controlled device associated with a first child of the parent, wherein the indication of the first controlled device is selectable by the parent in order to initiate analysis of a usage pattern of the first controlled device and provide results of the analysis to the parent in substantially real-time;
provide an interface for receiving input from a parent, the input comprising:
selections of which child's data to view; and
selections of which types and how much of the data and analysis results to view for each child;
receive an identification of a selection by the parent of a second controlled device associated with a second child of the parent in the interactive user interface;
access a database storing analysis data for the second controlled device associated with the second child of the parent;
update user interface data such that the interactive user interface includes indications of at least a subset of determined high frequency contacts; and transmit the updated user interface data to the computing device.

16. A non-transitory computer storage medium having stored thereon a computer program, the computer program including executable instructions that instruct one or more analysis servers to at least:
identify a smart phone associated with a child, the smart phone comprising one or more software modules configured to:
access and extract data from or about more than one of the smart phone's other software applications, including at least two of the following: a texting application, a social media application, an image application that facilitates transmission or reception of images, and a web browser application; and send the extracted data to the analysis server;

automatically identify patterns in the potentially harmful language, images, and websites for which helpful works of authorship have previously been created and stored in an electronic library;

provide immediate access to those works of authorship to parents by transmitting an electronic copy thereof or a link thereto to a parent portal for display adjacent to a warning based on harmful content that underlies those patterns of harmful content; and generate user interface data for the parent portal, the parent portal configured to:

receive results from the analysis server;

display the results organized by child;

provide both generalized smart phone usage data for each child and visual warnings when harmful results have been found by the analysis server, along with access to specific underlying data that triggered the warning; and provide an interface for receiving input from a parent, the input comprising:

selections of which child's data to view; and selections of which types and how much of the data and analysis results to view for each child.

17. A method for allowing parents to view and track smart phone activities of their children, the method comprising:

identifying a smart phone associated with a child;

accessing and extracting data from or about more than one of the smart phone's other software applications, including at least two of the following: a texting application, a social media application, an image application that facilitates transmission or reception of images, and a web browser application;

sending the extracted data to one or more analysis servers;

identifying potentially harmful language, images, and websites by comparing the extracted data to existing databases of harmful words, harmful images or image types, harmful websites, and harmful applications;

automatically identifying patterns in the potentially harmful language, images, and websites for which helpful works of authorship have previously been created and stored in an electronic library;

providing immediate access to those works of authorship to parents by transmitting an electronic copy thereof or a link thereto to a parent portal for display adjacent to a warning based on harmful content that underlies those patterns of harmful content;

receiving analysis results corresponding to the extracted data from the one or more analysis servers;

displaying the analysis results organized by child on the parent portal;

providing on the parent portal both generalized smart phone usage data for each child and visual warnings when potentially harmful language, images, and website have been identified, along with access to specific underlying data that triggered the warning;

providing an interface for receiving input from a parent, the input comprising:

selections of which child's data to view; and selections of which types and how much of the specific underlying data and the analysis results to view for each child.

* * * * *